(12) United States Patent
Asterjadhi et al.

(10) Patent No.: US 11,051,246 B2
(45) Date of Patent: Jun. 29, 2021

(54) ADDRESSING FOR WAKE-UP RADIO (WUR) FRAMES IN WUR DEVICE COMMUNICATIONS

(71) Applicant: QUALCOMM Incorporated, San Diego, CA (US)

(72) Inventors: Alfred Asterjadhi, San Diego, CA (US); George Cherian, San Diego, CA (US); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 17 days.

(21) Appl. No.: 16/275,576

(22) Filed: Feb. 14, 2019

(65) Prior Publication Data
US 2019/0268847 A1 Aug. 29, 2019

Related U.S. Application Data

(60) Provisional application No. 62/636,779, filed on Feb. 28, 2018, provisional application No. 62/635,523, filed on Feb. 26, 2018.

(51) Int. Cl.
*H04W 56/00* (2009.01)
*H04W 52/02* (2009.01)
(Continued)

(52) U.S. Cl.
CPC ..... *H04W 52/0216* (2013.01); *H04L 61/1541* (2013.01); *H04W 52/028* (2013.01); *H04W 52/0229* (2013.01); *H04W 72/0446* (2013.01)

(58) Field of Classification Search
CPC ......... H04W 52/0216; H04W 52/0229; H04W 52/028; H04W 72/0446
(Continued)

(56) References Cited

U.S. PATENT DOCUMENTS

2013/0142124 A1 6/2013 Abraham et al.
2013/0142184 A1* 6/2013 Wang .................. H04L 1/0033
370/338
(Continued)

OTHER PUBLICATIONS

Asterjadhi A., et al., "Considerations on WUR Frame Format", IEEE Draft; Nov. 17, 1004-04-00BA-Considerations-on-WUR-Frame-Format, IEEE-SA Mentor, Piscataway, NJ USA, vol. 802. 11ba, No. 4, Sep. 19, 2017 (Sep. 19, 2017), pp. 1-26, XP068121997, Retrieved from the Internet: URL: https://mentor.ieee.org/802.11/dcn/17/11-17-1004-04-00ba-considerations-on-wur-frame-format. pptx , [retrieved on Sep. 19, 2017], Slides 4-11.
(Continued)

*Primary Examiner* — Sai Ming Chan
(74) *Attorney, Agent, or Firm* — Kevin T. Cheatham

(57) ABSTRACT

Methods, systems, and devices for wireless communications are described. An access point (AP) may identify receiving wireless devices for which to send a wake-up radio (WUR) frame. The AP may obtain a basic service set identifier (BSSID) for the AP that is associated with (or intends to be associated with) the receiving wireless devices, the BSSID being known by the receiving wireless devices. The AP may perform a hashing function to the BSSID to obtain a hashed BSSID. The AP may use a first portion of the hashed BSSID as a first identifier. The AP may generate the WUR frame for transmission with an address identifier field that includes either the first identifier or a second identifier. The second identifier nay be based at least in part on the first identifier. The AP may transmit the WUR frame to the receiving wireless devices.

28 Claims, 26 Drawing Sheets

(51) Int. Cl.
*H04W 72/04* (2009.01)
*H04L 29/12* (2006.01)
(58) Field of Classification Search
USPC .......................................... 370/311
See application file for complete search history.

(56) References Cited

U.S. PATENT DOCUMENTS

2016/0192301 A1* 6/2016 Sampath ............... H04W 56/00
370/338
2019/0082390 A1* 3/2019 Azizi ................... H04L 5/0053
2019/0174413 A1* 6/2019 Huang .................. H04W 48/12
2019/0223101 A1* 7/2019 Li ......................... H04W 76/11

OTHER PUBLICATIONS

International Search Report and Written Opinion—PCT/US2019/018304—ISA/EPO—dated May 15, 2019.

* cited by examiner

ADDRESSING FOR WAKE-UP RADIO (WUR) FRAMES IN WUR DEVICE COMMUNICATIONS

The present Application for Patent claims the benefit of U.S. Provisional Patent Application No. 62/636,779 by Asterjadhi, et al., entitled "Systems, Methods, and Apparatus For Implementing Wake-Up Radio (WUR) Device Communications," filed Feb. 28, 2018, and to U.S. Provisional Application No. 62/635,523 by Asterjadhi, et al., entitled "Systems, Methods, and Apparatus For Implementing Wakeup Radio (WUR) Device Communications filed Feb. 26, 2018, assigned to the assignee hereof, and expressly incorporated herein.

BACKGROUND

Field of the Disclosure

The following relates generally to wireless communications, and more specifically to addressing for wake-up radio (WUR) frames in WUR device communications.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices.

As use of wireless networks increases, power constraints of wireless devices may become increasingly critical. Some devices may include a plurality of radios: zero or more "main" radios used for general communications and data transfer on the wireless networks and a secondary or WUR for wake-up communications. In some cases, the WUR may be the only radio of the device. The WUR may provide for communications when the main radio is in a power saving mode, as waking the WUR periodically to monitor communications on the wireless network may be more energy efficient than waking the main radio. Improved systems, methods, and devices for communicating over wireless networks with WUR devices are desired.

SUMMARY

The described techniques relate to improved methods, systems, devices, or apparatuses that support addressing for wake-up radio (WUR) frames in WUR device communications. Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

A method of wireless communications is described. The method may include identifying one or more receiving wireless devices for which to send a WUR frame, obtaining a basic service set identifier (BSSID) for the access point, the BSSID being known by the one or more receiving wireless devices, performing a hashing function to the BSSID to obtain a hashed BSSID, using a first portion of the hashed BSSID as a first identifier, generating the WUR frame for transmission with an address identifier field that includes either the first identifier or a second identifier, where the second identifier is based on the first identifier, and transmitting the WUR frame to the one or more receiving wireless devices.

An apparatus for wireless communications is described. The apparatus may include a processor, memory in electronic communication with the processor, and instructions stored in the memory. The instructions may be executable by the processor to cause the apparatus to identify one or more receiving wireless devices for which to send a WUR frame, obtain a BSSID for the access point, the BSSID being known by the one or more receiving wireless devices, perform a hashing function to the BSSID to obtain a hashed BSSID, use a first portion of the hashed BSSID as a first identifier, generate the WUR frame for transmission with an address identifier field that includes either the first identifier or a second identifier, where the second identifier is based on the first identifier, and transmit the WUR frame to the one or more receiving wireless devices.

Another apparatus for wireless communications is described. The apparatus may include means for identifying one or more receiving wireless devices for which to send a WUR frame, obtaining a BSSID for the access point, the BSSID being known by the one or more receiving wireless devices, performing a hashing function to the BSSID to obtain a hashed BSSID, using a first portion of the hashed BSSID as a first identifier, generating the WUR frame for transmission with an address identifier field that includes either the first identifier or a second identifier, where the second identifier is based on the first identifier, and transmitting the WUR frame to the one or more receiving wireless devices.

A non-transitory computer-readable medium storing code for wireless communications is described. The code may include instructions executable by a processor to identify one or more receiving wireless devices for which to send a WUR frame, obtain a BSSID for the access point, the BSSID being known by the one or more receiving wireless devices, perform a hashing function to the BSSID to obtain a hashed BSSID, use a first portion of the hashed BSSID as a first identifier, generate the WUR frame for transmission with an address identifier field that includes either the first identifier or a second identifier, where the second identifier is based on the first identifier, and transmit the WUR frame to the one or more receiving wireless devices.

In some examples of the method, apparatuses, and non-transitory computer-readable medium described herein, performing the hashing function to the BSSID may include operations, features, means, or instructions for calculating a cyclic redundancy check (CRC) over the BSSID to obtain the hashed BSSID.

In some examples of the method, apparatuses, and non-transitory computer-readable medium described herein, a polynomial associated with the CRC over the BSSID may be a same polynomial as a polynomial used for a CRC computation for a transmission over a first radio transceiver different from a second radio transceiver used for transmitting the WUR frame.

In some examples of the method, apparatuses, and non-transitory computer-readable medium described herein, the first portion of the hashed BSSID includes a least significant bit portion of the hashed BSSID.

In some examples of the method, apparatuses, and non-transitory computer-readable medium described herein, a length of the hashed BSSID may be 32 bits and a length of the first portion may be 12 bits.

Some examples of the method, apparatuses, and non-transitory computer-readable medium described herein may further include operations, features, means, or instructions for using a second portion of the hashed BSSID as a third identifier, and calculating a CRC over a set of calculation fields that includes a field with the third identifier to obtain a CRC value.

In some examples of the method, apparatuses, and non-transitory computer-readable medium described herein, the set of calculation fields includes the first or second identifier in the address identifier field.

In some examples of the method, apparatuses, and non-transitory computer-readable medium described herein, generating the WUR frame for transmission may include operations, features, means, or instructions for generating the WUR frame for transmission with the CRC value in a frame check sequence (FCS) field of the WUR frame.

In some examples of the method, apparatuses, and non-transitory computer-readable medium described herein, generating the WUR frame for transmission may include operations, features, means, or instructions for generating the WUR frame for transmission without the third identifier explicitly included in a field of the WUR frame.

In some examples of the method, apparatuses, and non-transitory computer-readable medium described herein, the second portion of the hashed BSSID includes a most significant bit portion of the hashed BSSID and a length of the second portion may be 16 bits.

Some examples of the method, apparatuses, and non-transitory computer-readable medium described herein may further include operations, features, means, or instructions for using a second portion of the hashed BSSID as a third identifier, and calculating a message integrity check (MIC) over a set of calculation fields that includes a field with the third identifier to obtain a MIC value.

Some examples of the method, apparatuses, and non-transitory computer-readable medium described herein may further include operations, features, means, or instructions for calculating the second identifier using the first identifier and an association identifier of a receiving device of the one or more receiving wireless devices.

In some examples of the method, apparatuses, and non-transitory computer-readable medium described herein, calculating the second identifier may include operations, features, means, or instructions for performing a modulo operation on a summation of the first identifier and the association identifier of the receiving device.

Some examples of the method, apparatuses, and non-transitory computer-readable medium described herein may further include operations, features, means, or instructions for calculating the second identifier using the first identifier and a value that may be greater than or equal to a number of basic service sets available to the one or more receiving wireless devices.

In some examples of the method, apparatuses, and non-transitory computer-readable medium described herein, calculating the second identifier may include operations, features, means, or instructions for performing a modulo operation on a summation of the first identifier and the number of basic service sets available to the one or more receiving wireless devices.

In some examples of the method, apparatuses, and non-transitory computer-readable medium described herein, the number of basic service sets may be a maximum number of basic service sets identified in a traffic indication map (TIM).

Some examples of the method, apparatuses, and non-transitory computer-readable medium described herein may further include operations, features, means, or instructions for calculating the second identifier using the first identifier and a value greater than a highest association identifier of a receiving wireless device of the one or more receiving wireless devices.

In some examples of the method, apparatuses, and non-transitory computer-readable medium described herein, calculating the second identifier may include operations, features, means, or instructions for performing a modulo operation on a summation of the first identifier and the value.

Some examples of the method, apparatuses, and non-transitory computer-readable medium described herein may further include operations, features, means, or instructions for calculating the second identifier using the first identifier and an indication of a non-transmitted BSSID.

In some examples of the method, apparatuses, and non-transitory computer-readable medium described herein, generating the WUR frame for transmission may include operations, features, means, or instructions for generating a broadcast WUR frame for transmission with the first identifier in the address identifier field.

In some examples of the method, apparatuses, and non-transitory computer-readable medium described herein, generating the WUR frame for transmission may include operations, features, means, or instructions for generating a variable-length WUR frame for transmission with the second identifier in the address identifier field and a set of identifiers, each identifier of the set of identifiers associated a corresponding receiving wireless device of the one or more receiving wireless devices.

In some examples of the method, apparatuses, and non-transitory computer-readable medium described herein, each identifier of the set of identifiers may be listed in an order within the variable-length WUR frame.

Figure 1:
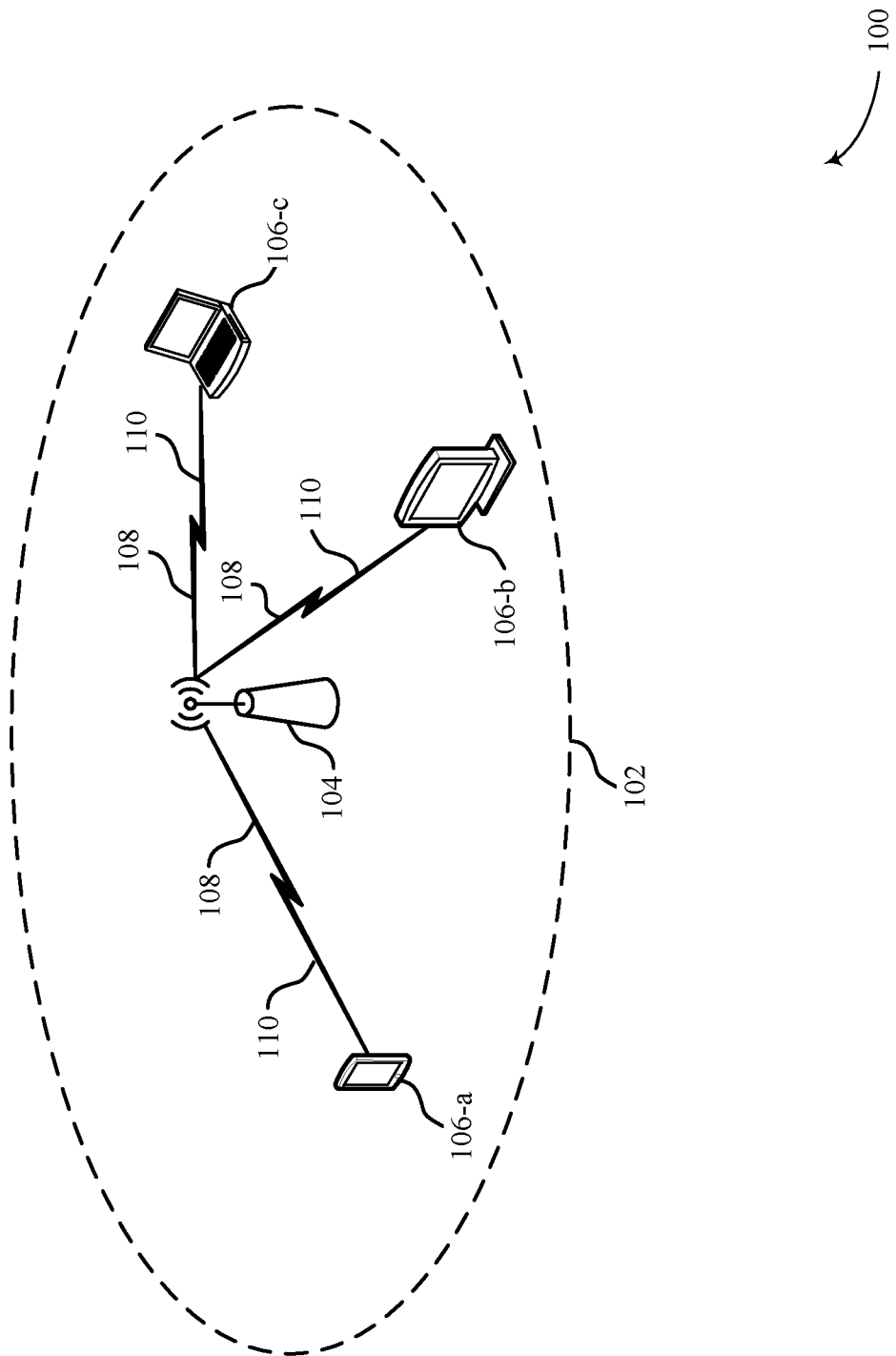
FIG. 1 illustrates an example of a system for wireless communications that supports addressing for wake-up radio (WUR) frames in WUR device communications in accordance with aspects of the present disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented, or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a station (STA) serves as a user of the WLAN. For example, a STA may be a laptop computer, a personal digital assistant (PDA), a mobile phone, a watch, etc. In an example, a STA connects to an AP via a WiFi (e.g., IEEE 802.11 protocol) compliant wireless link to obtain general connectivity to the Internet or to other wide area networks. In some implementations a STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point ("AP") or an access terminal.

An AP may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Aspects of the disclosure are initially described in the context of a wireless communications system. Aspects of the disclosure are further illustrated by and described with reference to apparatus diagrams, system diagrams, and flowcharts that relate to addressing for WUR frames in WUR device communications.

FIG. 1 is a diagram of an exemplary wireless communication system 100 in which aspects of the present disclosure may be employed. The wireless communication system 100 may operate pursuant to a wireless standard, for example a high-efficiency (HE) 802.11 standard, high throughput (HT) 802.11 standard, a very high throughput (VHT) standard, or any other wireless communication standard. The wireless communication system 100 may include an AP 104, which communicates with STAs 106 (referring generally to the STAs 106A-106C).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. This communication link may be established via a single-input-single-output (SISO), multiple-input-single-output (MISO), single-input-multiple-output (SIMO), or a multiple-input-multiple output (MIMO) system.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network (for example TDLS, WiFi-Direct) between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN). In some aspects, the STA 106 may already be associated with AP 104 and may periodically monitor the communications from the AP 104 for communications directed to the STA 106.

In some implementations, one or more of the STAs 106 of the BSA 102 may include a plurality of radios. For example, these STAs may include a "main" radio that is used to perform communications within wireless communication system 100 and the low power radio or "wake-up radio (WUR)" that is used to monitor for "wake-up" or similar low power communications from the AP 104 when the STA 106 is in a low power or power saving mode. In some implementations, the STAs 106 may only include the WUR radio. In some implementations the STA may include more than one main radio, each of which may operate in different bands (e.g., 2.4, 5, 6, 18, 60 GHz etc.) or with different wireless technologies (LTE, Bluetooth, 802.11) The STAs 106 including the WUR radio may be designated as WUR STAs. The WUR may be a transmitter and/or receiver circuit with minimal capabilities (e.g., minimal compatibility with communication frequencies and speeds) for communication over the communication system 100. In some implementations, the WUR may include fewer features than the main radio, for example lack of advanced encoder/decoder capabilities, etc. Accordingly, the WUR may be lower in cost than the main radio and may also consume less power than the main radio when in operation. Thus, the WUR may be used to monitor for communications to the STA more efficiently than using the main radio of the STA. In certain cases, the WUR radio may be operating in a different channel/band compared to the one or more main radios. The WUR may be configured to receive instructions from the AP 104 (or other devices broadcasting on the wireless communication system 100). These instructions may include instructions to "wake-up" the main radio and/or perform other actions that do not require activation of the main radio.

In some examples, the AP 104 and/or the STAs 106 may be configured to generate various WUR communications for WUR devices. For example, the AP 104 and/or the STAs 106 may be configured to synchronize devices based on a WUR Beacon transmission. Additionally, or alternatively, the AP 104 and/or the STAs 106 may transmit unicast WUR messages to wake up a single WUR STA or multicast/broadcast WUR messages to wake up multiple or all WUR STAs. The AP 104 and/or the STAs 106 be configured to generate and transmit WUR Beacon frames/messages, WUR control frames/messages, etc. Similarly, the WUR STAs may be configured to perform various operations based on the received WUR communications. For example, the WUR STAs may synchronize based on WUR Beacon reception that includes timing information, wake up based on an individual or multicast/broadcast wakeup message, activate lights or perform actions, etc.

WUR communications may be generally based on typical IEEE802.11 communication structures. For example, communication frames may include preambles, addressing information, control information, and frame check information. However, the IEEE802.11 communication structures may be customized for WUR communication (e.g., WUR PPDUs) in order to reduce and/or minimize overhead and maintain signaling of essential information to enable various operations. In some implementations, the WUR PPDUs may provide flexibility for a wide range of use cases and scenarios.

Figure 2:
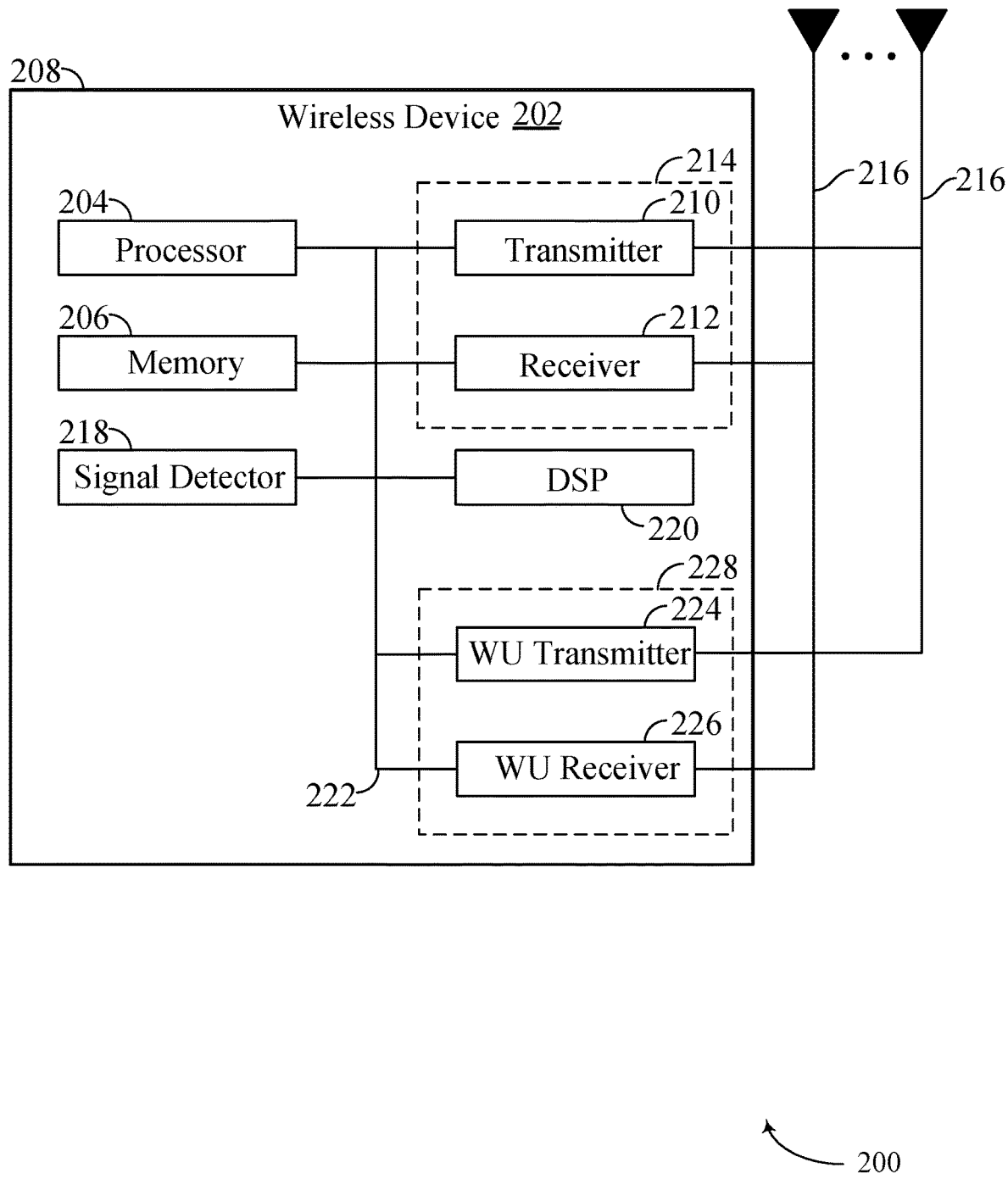
FIG. 2 illustrates an example of a various components that may be utilized in a wireless device that supports addressing for WUR frames in WUR device communications in accordance with aspects of the present disclosure.

FIG. 2 illustrates an example of a various components that may be utilized in a wireless device that supports addressing for WUR frames in WUR device communications in accordance with aspects of the present disclosure. In some examples, the wireless device 200 may implement aspects of wireless communication system 100. The wireless device 202 is an example of a device that may be configured to implement the various methods described herein. The wireless device 202 may implement a WUR AP or a WUR STA. In some implementations, the wireless device 202 may implement an AP 104 or a STA 106.

The wireless device 202 may include a processor 204 which controls operation of the wireless device 202. The processor 204 may also be referred to as a central processing unit (CPU). Memory 206, which may include both read-only memory (ROM) and random-access memory (RAM), provides instructions and data to the processor 204. A portion of the memory 206 may also include non-volatile random-access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location and/or device. The transmitter 210 and receiver 212 may be combined into a transceiver 214. A single or a plurality of transceiver antennas 216 may be attached to the housing 208 and electrically coupled to the transceiver 214. The wireless device 202 may also include multiple transmitters (e.g., WUR transmitter 224), multiple receivers (e.g., WUR receiver 226), and multiple transceivers (e.g., WUR transceiver 228).

The wireless device 202 may also include a signal detector 218 that may be used in an effort to detect and quantify the level of signals received by the transceiver 214 or the transceiver 228. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component (not shown) and a wireless LAN (WLAN) modem (not shown). The WLAN modem may provide for communications using one or more WiFi technologies, such as any of the IEEE 802.11 protocol standards.

The various components of the wireless device 202 may be coupled together by a bus system 222, which may include a power bus, a control signal bus, and a status signal bus in addition to a data bus.

Certain aspects of the present disclosure support transmitting an uplink (UL) signal or a downlink (DL) signal between one or more STAs, WUR STAs, APs, and WUR APs. In some examples, the signals may be transmitted in a multi-user MIMO (MU-MIMO) system. Alternatively, the signals may be transmitted in a multi-user FDMA (MU-FDMA) or similar FDMA system. In some aspects, these signals may be transmitted using one or more of the transmitter 210 and the WUR transmitter 224.

In some examples, the WUR transmitter 224, the WUR receiver 226, and/or the WUR transceiver 228 may be configured to communicate with limited or minimal power consumption. Accordingly, the WUR transmitter 224, the WUR receiver 226, and/or the WUR transceiver 228 may be limited to operation at specific frequencies and/or bandwidths. For example, the WUR transmitter 224, the WUR receiver 226, and/or the WUR transceiver 228 may be configured to operation at one of 900 MHz, 2.4 GHz, and/or 5.0 GHz, 6 GHz, 18 Ghz and/or 60 GHz frequency bands at speeds of 62.5 Kbps and/or 250 Kbps, although not limited to these frequencies or speeds. In some implementations, the WUR devices may be limited to operation in heavy utilized the industrial, scientific, and medical (ISM) radio bands. Based on such speeds and limitations transmitting even a limited number of bytes would require significant amount of time, as an example transmitting seven (7) bytes of information may utilize ~1 ms transmission time assuming a speed of 62.5 kbps.

Furthermore, the WUR devices (e.g., WUR APs and WUR STAB) may be configured such that the corresponding radio systems operate in one of four states at any given time. For example, in a first state, both the WUR transceiver 228 and the transceiver 214 are off. In a second state, the WUR transceiver 228 is on while the transceiver 214 is off In a third state, the WUR transceiver 228 is off while the transceiver 214 is on. In a fourth state both are on. And the number of states may increase proportionally with the number of main radios which may be greater than one. The WUR transmitter 224, the WUR receiver 226, and/or the WUR transceiver 228 and the transceiver 210, the receiver 212, and the transceiver 214 may share the same one or more antennas 216 and may operate in the same band or may operate in separate bands. Accordingly, the corresponding WUR components and "main radio" components may be configured to operate only one at a time so that only WUR communications or main radio communications are being transmitted/received at any given moment. In some examples, when the device 202 includes multiple antennas 216 coupled to the WUR transmitter 224, the WUR receiver 226, and/or the WUR transceiver 228 and the transmitter 210, the receiver 212, and the transceiver 214, the processor 204 may be configured to dedicate one or more antennas 216 to the WUR transmitter 224, the WUR receiver 226, and/or the WUR transceiver 228 and one or more of the remaining 216 antennas to the transmitter 210, the receiver 212, and the transceiver 214 to allow simultaneous WUR and main channel communications. The STA may also turn off the WUR radio and allocate all antennas to the main radio.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Additionally, additional components not illustrated in FIG. 2 may be included in any of the devices 202.

The wireless device 202 may comprise an AP 104, a STA 106, an AP 204, and/or a STA 206, and may be used to transmit and/or receive communications. That is, either AP 104, STA 106, AP 204, or STA 206 may serve as transmitter or receiver devices. Certain aspects contemplate signal detector 318 being used by software running on memory 306 and processor 304 to detect the presence of a transmitter or receiver.

Figure 3:
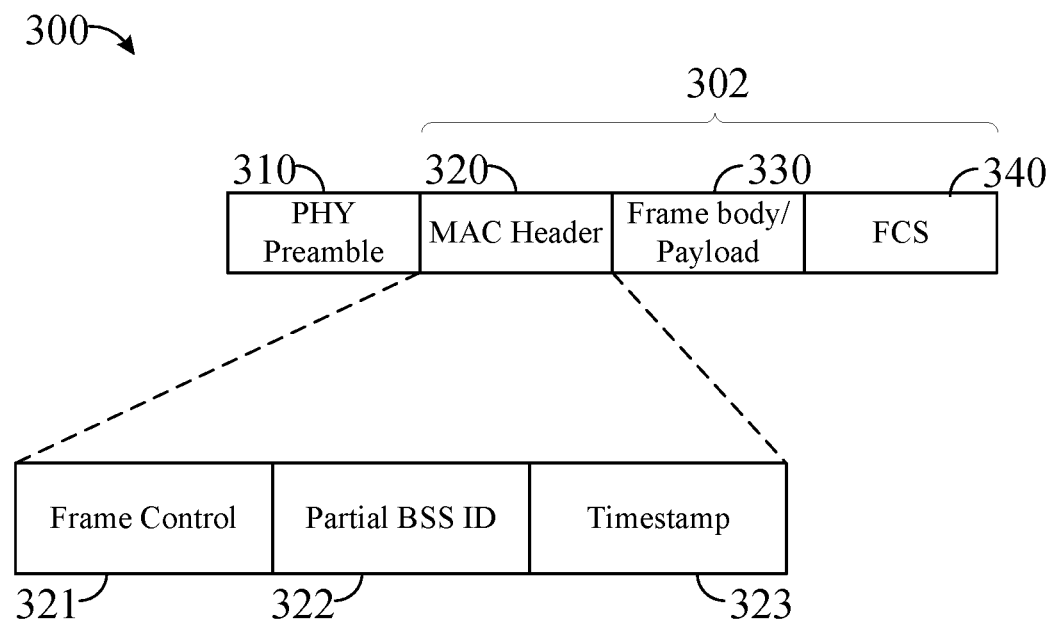
FIG. 3 illustrates an example of a structure of a physical layer data unit (PPDU) for communicating with a WUR device in WUR device communications in accordance with aspects of the present disclosure.

FIG. 3 illustrates an example of a structure of a physical layer data unit (PPDU) for communicating with a WUR device in WUR device communications in accordance with aspects of the present disclosure. In some examples, PPDU 300 may be used for communicating with WUR device 202 (FIG. 2). The four portions of the PPDU 300 illustrated are a PHY Preamble 310 portion, media access control (MAC) header 320 portion, a payload or frame body portion 330 (payload or frame body portion 330 may be used interchangeably), and a frame check sequence (FCS) 340 portion. The PHY preamble 310 is a portion of the PPDU 300 preamble that contains information for decoding the one or more physical layer service data unit (PSDU) or MAC protocol data unit (MPDU) 302 contained in the PPDU 300. More than one PSDUs or MPDUs may be contained in a PPDU that is sent in MU mode (e.g., using OFDMA multiplexing techniques). The MPDU 302 of the PPDU 300 may include one or more of a MAC header 320, payload or frame body portion 330, and FCS 340. The MAC header 320 may include one or more common fields that are present in all WUR frames or PPDUs 300. The payload or frame body portion 330 may include one or more frame type specific fields that may be present in select PPDUs 300 (e.g., based on the type of PPDU 300). In some examples, the payload or frame body portion 330 may be optional in the PPDU 300, for example, based on a type of the WUR frame or based on an indication contained in the WUR frame. In some examples, the FCS 340 may be used to detect if the MPDU 302 contains any errors or if the MPDU 302 is generated from an access point of an overlapping BSS. The FCS 340 may include cyclic redundancy check (CRC) or message integrity check (MIC) depending on the type of PPDU 300 received (e.g., the CRC may be present if the frame is not secure, and the MIC may be present if the frame is secured). The FCS 340 may be 8 bits, 16 bits, or any other number of bits in length and may contain one or more bits of a CRC-8, CRC-16, or CRC-32. For example, when communicated with unprotected frames, the FCS 340 may carry a CRC having a length of 8 bits, 16 bits, 24 bits, or 32 bits. In some examples, the FCS 340 may have a variable length. For example, the size of the FCS 340 may depend on whether the WUR frame is protected or not (e.g., whether or not the WUR frame contains CRC or MIC). In some examples, the size of the FCS 340 may depend on the type of the WUR frame. In certain examples, the MAC header 320 and the FCS 340 constitute a minimal WUR frame format and are present in all WUR frames, including reserved types. In some examples, the FCS 340 may include a MIC, which may be computed in a manner similar to the CRC as described herein. According, the CRC as described herein may be replaced with the MIC.

A size of the FCS 340 may directly impact a probability of false alarms generated by the corresponding MPDU 302. For example, a smaller FCS size may cause or result in a STA 106 receiving the frame containing the FCS 340 and the MPDU 302 to mistakenly interpret the MPDU 302 as being directed to the STA 106 even if the MPDU 302 contains an error or is generated by an AP 104 from an overlapping BSS. However, an FCS 340 having a smaller size (e.g., smaller number of bits) than a larger FCS 340 may create or cause smaller (or reduced or less) overhead as compared to the larger FCS 340 (e.g., larger number of bits). The smaller or reduced overhead may be beneficial for short frames (e.g., constant length frames). For example, a smallest possible MPDU 302 may have a length of 32 bits (4 Bytes) (e.g., a constant length WUR frame), as will be discussed in further detail below. In some other examples, the MPDU 302 may be up to 12 or 30 Bytes in length (e.g., a variable-length WUR frame), as will be discussed in further detail below. The FCS 340 length may be in addition to the MPDU 302 length. For example, when the WUR frame includes the FCS 340 with a length of 8 bits and the MPDU 302 with a length of 32 bits, the FCS 340 may make up 20% of the overhead. In contrast, the WUR frame that includes the MPDU 302 having the 12 Byte length and the FCS 340 of an 8-bit length, the FCS 340 makes up only 8.3% of the overhead of the WUR frame. Accordingly, in some examples, where the overhead is of greater concern than potential false alarms, a shorter FCS 340 may be implemented. Where overhead is of less concern than potential false alarms, a longer FCS 340 may be implemented.

In some examples, the CRC may utilize a polynomial generator that generates one or more polynomials for the CRC. For example, the polynomial generator may generate a 32-bit polynomial. In certain examples, the 32-bit polynomial is used for the CRC to provide baseline MPDU protection. In such an example, the generator polynomial may be identified by Equation 1 below:

$$G(x)=x^{32}+x^{26}+x^{23}+x^{22}+x^{16}+x^{12}+x^{11}+x^{10}+x^{8}+x^{7}+x^{5}+x^{4}+x^{2}\pm x+1 \quad \text{Equation 1:}$$

In some examples, the polynomial generator may generate a 16-bit polynomial. In certain examples, the 16-bit polynomial is used for the CRC of a SIG field of a DSSS PHY. In such an example, the generator polynomial may be identified by Equation 2 below:

$$G(x)=x^{16}+x^{12}+x^{5}+1 \quad \text{Equation 2:}$$

In some examples, the polynomial generator may generate an 8-bit polynomial. In certain examples, the 8-bit polynomial is used for the CRC of an MPDU delimiter. In such an example, the generator polynomial may be identified by Equation 3 below:

$$G(x)=x^{8}+x^{2}+x+1 \quad \text{Equation 3:}$$

Since the WUR radio may be a secondary radio used to wake up or activate a main or primary radio, in some examples, the polynomial used by the WUR radio may be the same as the polynomial used by the main or primary radio. By using the same polynomial between the WUR radio and the main or primary radio, overall costs and complexity of design may be reduced. Any of the 8-, 16-, or 32-bit polynomials may be implemented, where a higher degree polynomial better protection against false positives caused by the CRC. The higher degree also requires the FCS 340 to be longer (e.g., creating increased overhead and utilizing increased memory).

Various options may provide for reducing overhead while implementing higher degree polynomial protections. For example, in some examples, only a portion of the calculated CRC may be transmitted or included in the FCS 340, thereby allowing use of a higher degree CRC polynomial without a correspondingly high overhead. In certain examples, the FCS 340 may have a length of 8 bits and include only 8 bits of a calculated CRC-16 (e.g., including only the 8 most significant bits (MSBs) or 8 least significant bits (LSBs) and excluding the remaining 8 bits of the CRC-16. Similarly, in other examples, the FCS 340 may have a length of 8 bits and include only 8 bits of a calculated CRC-32, may have a length of 16 bits and include only 16 bits of a calculated CRC-32, may have a length of 16 bits and include only 16 bits of a calculated CRC-16, may have a length of 8 bits and include 8 bits of a calculated CRC-8, etc. Accordingly, a STA 106 receiving the WUR frame may perform the frame check based on the CRC bits transmitted in the FCS 340, which may be less than the calculated bits.

In a first example, a constant length WUR frame may include an FCS 340 of 8-bit length and a variable-length WUR frame may include an FCS 340 of 8-bit length with an additional 8 bits of the CRC-16 contained in the frame body 330 (e.g., as the last 8 bits of the frame body 330). For the constant length frame, the WUR frame may be short and sensitive to overhead as compared to the variable-length frame, where the WUR frame is longer and less sensitive or susceptible to increased overhead. While the CRC-16 is described as being used for the WUR frames, any of the CRC polynomials described herein may be used. However, if the polynomial degree is less than the FCS 340 length (e.g., the FCS 340 length is 16 bits for the CRC-8), then a repletion or padding can be applied to the CRC included in the FCS 340. By such repletion, the calculated bits of the CRC may be repeated in the FCS 340 having a length greater than the CRC calculated bits.

For the constant length WUR frame, the 8 bits of the FCS 340 may carry the 8 MSBs of the CRC-16, while the 8 LSBs of the CRC-16 may be omitted from transmission. Accordingly, a receiver receiving the constant length WUR frame may only perform a frame check on the received 8 bits. For the variable-length WUR frame, the 8 LSBs that are omitted from the FCS 340 may instead be included or carried in the frame body 330. Accordingly, the receiver receiving the variable-length WUR frame may perform the frame check on the received 16 bits. Therefore, more protection is provided to longer frames (e.g., the variable-length WUR frames.

Note that in this example, the calculated fields (e.g., the fields that the CRC is protecting) include all fields of the WUR frame up to but not including the FCS 340 itself.

In a second example, the 8 bit FCS 340 of the variable-length WUR frame may protect a portion of the MPDU 302 that is the same as what the FCS 340 protects in the constant length WUR frame (e.g., everything except for the frame body 330), and the 8 bits of the CRC included in the frame body 330 may protect contents of the frame body 330 excluding the portion of the frame body 330 comprising the remainder of the CRC-16 (e.g., the frame body 330 length minus 8 bits used for the CRC-16 remainder).

As depicted in FIG. 3, the MAC header 320 may include one or more of the three separate fields: a frame control field 321, a partial basic service set identifier (BSSID) field 322, and a timestamp field 322. Each of the frame control field 321, the partial BSSID field 322, and the timestamp field 322 may have a length of one (1) Byte or octet. In some examples some part of the contents of the Frame Control field may be carried in the PHY preamble of the WUR PPDU.

The 1-byte frame control field 321 may provide information that identifies details of the MPDU 302 type and/or length. In some implementations, the frame control field 321 may include a type subfield (not shown) and a length/subtype field (not shown). The type subfield may be configured to identify a frame type for the PPDU 300. In some implementations, the type subfield may indicate that the PPDU 300 is a WUR Beacon frame, a WUR control frame, a WUR sync frame, etc.). In some examples the frame control may indicate whether the frame is a secure/protected frame or an unsecure/unprotected frame (MIC present or CRC present). For example, a first value in the type subfield may indicate the WUR Beacon frame while a second value in the type subfield may indicate the WUR control frame. In some implementations, the frame type indicated by the type subfield may help differentiate between constant length and variable-length PPDUs 300. The length/subtype field may provide information indicating one or both of different frame subtypes or different payload or frame body sizes for the payload or frame body portion 330 of the PPDU 300. In some implementations, as will be described in more detail below, the payload or frame body portion 330 may be integrated with the MAC header portion 320, and the length of the payload or frame body portion 330 may not be indicated in the length/subtype subfield of the frame control field 321, but rather the length of the MAC header, or of the MPDU, or of the variable portion of the MPDU may be indicated by the length specified in the Frame Control field. When the length/subtype field is included, the length may provide lengths for variable-length frames. Alternatively, or additionally, the subtype field may provide additional details of subtypes for constant length frames. In some examples, the frame control field 321 may be moved to the PHY preamble 310 and may be part of a SIG field of the PHY preamble or encoded in the PHY preamble itself.

In some examples, the constant length frame may not include the payload or frame body portion 330. A WUR frame that includes the payload or frame body portion 330 may be referred to as a variable-length (VL) WUR frame. In some examples, a constant length WUR frame can be sent to any WUR STA while a variable-length WUR frame can be sent only to a WUR STA that has declared support of reception of variable-length WUR frames.

The partial BSSID field 322 (may optionally be present and may be 1 byte) may provide identification of an identity (e.g., an ID) of a transmitting BSS. The transmitting BSS may correspond to the BSS from which the WUR communication is transmitted. For example, the partial BSSID field 322 may include a partial address or identifier for the AP 104 or STA 106 that transmitted the PPDU 300. In some implementations, the receive WUR STA may use the partial BSSID field (and the information contained therein) to determine whether or not the WUR STA is a potential intended recipient for the PPDU 300. For example, during association with the AP 104 and/or the wireless communication system 100, the WUR STA may be assigned or provided with a BSSID for the BSS to which the WUR STA belongs (e.g., the BSS in the BSA 102). Accordingly, the WUR STA may store the BSSID for its BSS in its memory (e.g., the memory 206 of FIG. 2). When the WUR STA compares the partial BSSID 322 to the stored BSSID, if the values match, then the WUR STA may determine that the received PPDU 300 does apply to the WUR STA and perform additional checks as described below. However, if the partial BSSID 322 does not match the WUR STA stored BSSID, then the WUR STA may determine that the received PPDU 300 does not apply to the WUR STA and may ignore the remainder of the PPDU 300. Accordingly, the partial BSSID field 322 may be used to reduce unnecessarily computations, processing, and reception of the PPDU 300 by WUR STAB that do not need to pay attention to the PPDU 300. In some examples the partial BSSID may be a value that is known by both the AP and STA which may change in time according to a function (e.g., a random generator with a seed known at both devices) that is known at both the AP and STA.

In some examples, the partial BSSID 322 field may only include one octet of the BSSID of the transmitting device. In some examples, the single octet of the BSSID (e.g., the partial BSSID) is sufficient to provide adequate intra-PPDU power savings and discarding of PPDUs sent by other BSSs (APs) as compared to the added costs (e.g., time, bandwidth, etc.) of transmitting and processing the full BSSID. Accordingly, the partial BSSID field 322 may provide for reduced accuracy of identifying whether the WUR STA belongs to the same or different BSS as the transmitting AP 104 or STA 106 while providing for reduced communication costs (e.g., time, bandwidth, etc.). Additionally, in some examples, the partial BSSID field 322 may be used in some implementations of minimization of false alarms in the FCS, as discussed in further detail below.

The timestamp field 323 (may be 1 byte or 2 bytes in length, if present) may contain a partial timing synchronization function (TSF). The partial TSF may allow the WUR STA to synchronize its clock to match the clock of the transmitting AP 104. The partial TSF may also allow the WUR STA to prevent and/or avoid replay attacks, as will be described in further detail below.

Figure 4:
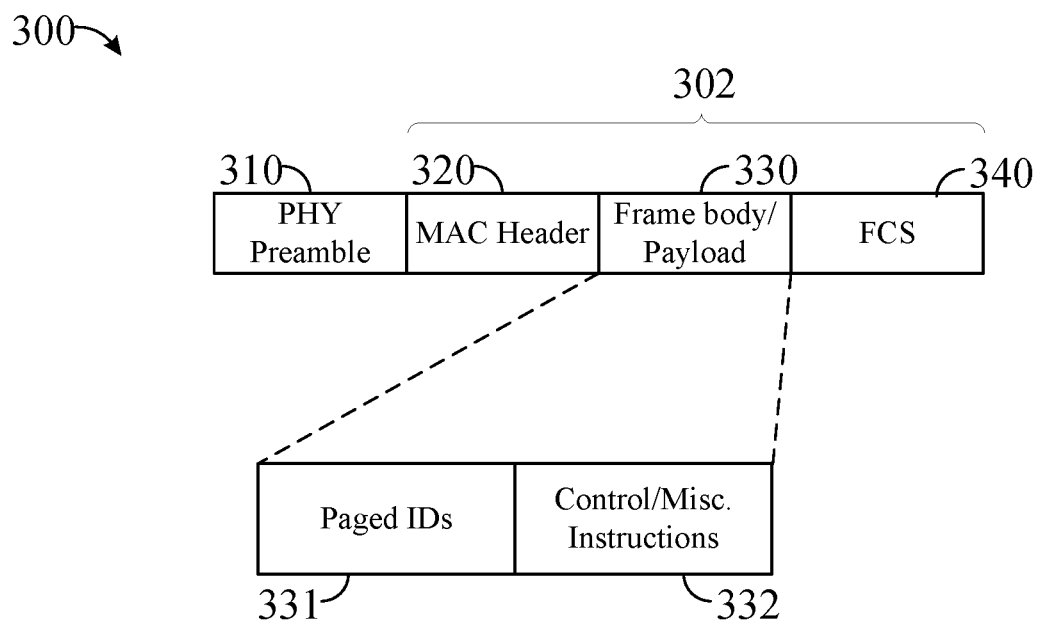
FIG. 4 illustrates an example of further details of the structure of the PPDU of FIG. 3 for communicating with a WUR device in WUR device communications in accordance with aspects of the present disclosure.

FIG. 4 illustrates an example of further details of the structure of the PPDU of FIG. 3 for communicating with a WUR device in WUR device communications in accordance with aspects of the present disclosure. In some examples, the exemplary structure of the PPDU 300 of FIG. 3 may be used for communicating with the WUR device 202 (FIG. 2). As depicted in FIG. 4, the payload or frame body portion 330 may include two separate fields: a paged identifiers (paged IDs, or wake-up identifiers, WIDs) field 331 and control/misc. instructions field 332. In some examples, the control/misc. information may be interchangeable referred to as miscellaneous information and/or control information herein. The paged IDs field 331 may have a variable byte or octet length and the control/misc. instructions field 332 may have a length of 1 byte or octet. In another example the paged ID(s) field 331 and/or the control/misc. instructions field 332 may be part of the MAC header 320.

The paged IDs field 331 (may have one or more paged IDs, each of which may be 1 byte in length) may provide a list of intended receiving WUR STAs of the payload or frame body or of the PPDU 300. In some implementations, the paged IDs field 331 may include identifiers, each of which may identify one STA or be assigned to a group of WUR STAs, or identify all WUR STAs associated to the device sending the PPDU 300. The paged IDs field 331 may be used in conjunction with the partial BSSID field 322 of FIG. 3. For example, when a WUR STA determines that the partial BSSID field 322 matches the BSSID of the WUR STA, then the WUR STA may proceed to confirm that the ID of the WUR STA is included in the paged IDs field 331. If the ID of the WUR STA is not included in the paged IDs field 331, then the WUR STA can stop receiving the PPDU 300 and can ignore any received information. On the other hand, if the ID of the WUR STA is included in the paged IDs field 331, then the WUR STA proceeds to receive the remainder of the PPDU 300 and follows any instructions included in the PPDU 300. In some examples each paged ID in the paged IDs field 331 may be mixed with a known portion of an identifier of the BSS (e.g., XORing with certain 8 bits of the BSSID) so that the paged ID values are not concentrated in a certain portion of the range (e.g., if all APs 104 start allocating IDs in increasing order, then the likelihood that multiple APs assign low values (e.g., 1, 2, etc.) is high. If APs 104 apply this rule, then paged ID values can be uniformly spread across the 1-255 range). In certain examples the APs 104 may use a random generator for selecting the paged IDs that they assign to their STAs and the selected paged IDs may be known by all APs that are within its range so that paged IDs assigned by APs 104 in the same area do not coincide.

In some implementations, the paged IDs field 331 may have a length of one byte. With a length of one byte, the paged IDs field 331 may indicate or identify a single WUR STA to or with which the PPDU 300 applies or is associated. The paged IDs field 331 may have a size of up to 16 bytes, allowing the PPDU 300 to apply or be associated with up to 16 different WUR STAs. In some examples, the length subfield of the frame control field 321 may indicate a number of WUR STAs identified by the paged IDs field 331 and, accordingly, may indicate a number of bytes of the paged IDs field 331. In some examples, when the length subfield is zero (0), the PPDU 300 may be intended to be a broadcast or multicast PPDU that applies to all WUR STAs or to all WUR STAs sharing the BSSID of the partial BSSID field 322. In such an implementation, the paged IDs field 331 may have a length of zero and may not include any WUR STA identifiers. In some implementations, when the length subfield is 0 for the broadcast PPDU, the pages IDs field 331 may have a length of one (1) byte without including any WUR STA identifiers (e.g., may have a value of zero indicating that the frame is broadcast).

The paged IDs subfield 331 of 1-byte length may be used to identify up to 256 unique STA identifiers (or if value 0 is used for broadcast, then up to 255 unique STA identifiers may be identified, or if the Paged ID is 11 bits, then up to 1024 unique STA identifiers may be identified, etc.). However, if the AP 104 serves more than 256 STAs, then the AP 104 may be configured to utilize orthogonal scheduling to orthogonally schedule STAs that share the same paged IDs. If the paged IDs are obtained from the association identifier (AID), for example, 8 LSBs of the AID provide the Paged ID, then the AP may make such scheduling using one or more of the remaining MSBs of the AID. For example, STAs having an association identifier of "1" and "257" may share the LSB of 0000 0001. Accordingly, if the paged IDs field 331 identifies the STA having the identifier 0000 0001, then both the STA "1" and the STA "257" will determine, based on the partial BSSID field 321 and the paged IDs field 331, that the PPDU 300 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (e.g., STA 1 may be scheduled the first 10 ms of a 20 ms wake time duration and STA 257 may be scheduled the second 20 ms of a wake time duration. Accordingly, the clone STAs (e.g., the WUR STAs having the same LSB identifiers or paged ID) will not wake up simultaneously and unintended WUR STAs will not be awakened just because they share an LSB identifier of paged ID with an intended WUR STA.

Alternatively, or additionally, a most significant bit (MSB) of the identifier for the paged IDs may be masked in one or more other fields of the PPDU 300 or the MPDU 302. For example, the paged IDs in the paged IDs field 331 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU is intended for it or for another WUR STA having the same LSB identifier in the paged ID field 331.

In some implementations, the AP 104 may desire to send instructions or page more than 16 WUR STAs. In such an implementation, the AP 104 may send a multicast or broadcast PPDU 300 (e.g., having the length of 0, as described herein). Alternatively, or additionally, the AP 104 may transmit back-to-back (e.g., consecutive) WUR PPDUs 300. When multiple PPDUs 300 are transmitted back-to-back, the AP 104 may include STA identifiers in the paged IDs field 331 in only increasing or ascending (or any other) order, which may allow STAs to know when they will not be paged in later PPDUs 300. For example, when a first PPDU 300 of two or more back-to-back PPDUs 300 includes paged IDs for WUR STA 1, 3, and 8, the WUR STA 5 may know that later PPDUs 300 of the two or more back-to-back PPDUs 300 will not page the STA 5 because the lowest WUR STA that can be paged by subsequent PPDUs 300 is 9 (e.g., the STA identifiers only ascend between PPDUs). Such an ascending order may allow WUR STAs to optimize their sleep patterns by determining when they will not be paged without having to wait for all back-to-back PPDUs 300 from being received and reviewed. In some implementations, one or more bits may be included in the MPDU 302 to indicate that a train of one or more other PPDUs 300 is following the current PPDU 300.

The control/misc. instructions field 332 may include one or more instructions for the one or more paged IDs identified in the paged IDs field 331. In some implementations, the control/misc. instructions field 332 may provide special instructions for the WUR STA(s) to perform once they are awakened. In some implementations, the control/misc. instructions field 332 may include special commands if the PPDU 300 is used for controlling external states. In some implementations, the special commands may instruct which main radio to turn on (e.g., by identifying a radio number, technology, or band). In some implementations, the special commands may indicate which bandwidth to use or may specify one or more receive or transmit parameters.

In some implementations, the one or more control/misc. instructions field 332 may be common to all of the identified WUR STAs in the paged IDs field 331. In some implementations, one or more of the identified WUR STAs in the paged IDs field 331 may have unique instructions from others of the identified WUR STAs in the paged IDs field 331. The association of WUR STAs to particular control instructions may be identified in the frame control field 321, for example, the length subfield. For example, the length subfield may indicate that each identified WUR STA has a respective control instruction field. In this implementation, the length subfield may provide the length of both page IDs and control IDs (e.g., the unit of the length subfield may be 2 bytes because one paged ID may be one byte and one control ID one byte) and the length will have a range between 2 and 14 bytes. Other lengths for the length subfield in the frame control field 321 may be used (e.g., 3 or 4 or more).

In some implementations, the two-byte paged ID and control field may include a combination of AID identifier bits and control/misc. instructions bits. For example, the two-byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (e.g., different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

Figure 5:
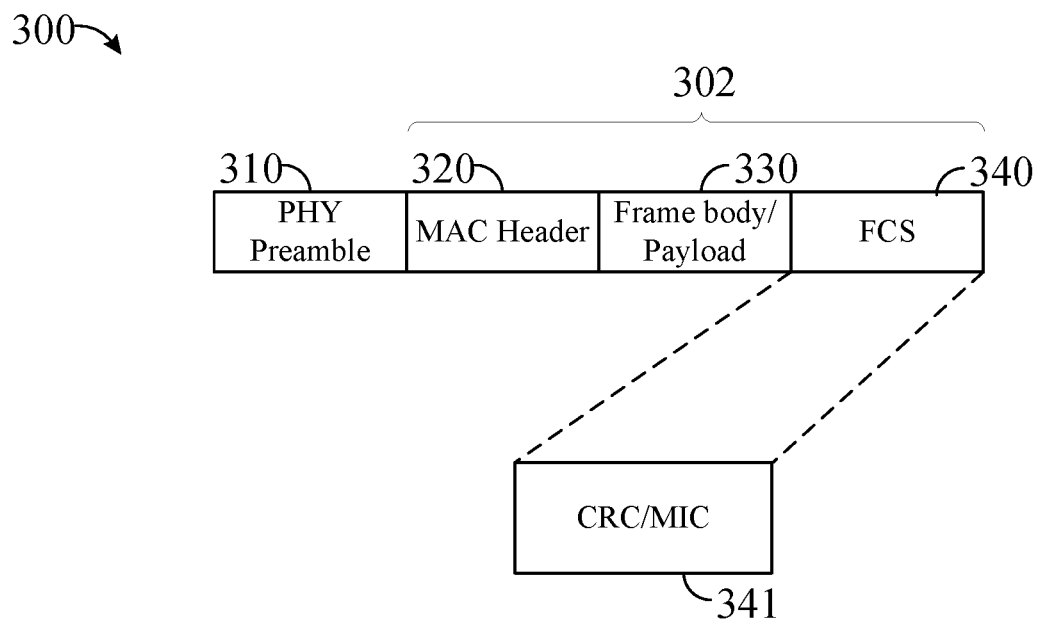
FIG. 5 illustrates an example of further details of the structure of the PPDU of FIG. 3 for communicating with a WUR device in WUR device communications in accordance with aspects of the present disclosure.

FIG. 5 illustrates an example of further details of the structure of the PPDU of FIG. 3 for communicating with a WUR device in WUR device communications in accordance with aspects of the present disclosure. In some examples, the exemplary structure of the PPDU 300 of FIG. 3 may be used for communicating with the WUR device 202 of FIG. 2. As depicted in FIG. 5, the FCS 340 may be a two-byte portion that includes a CRC or a MIC. The CRC may be used to detect errors in unsecured PPDUs 300. The MIC may be used to detect errors and/or replay attacks in secure PPDUs 300.

In some implementations, the AP 104 may logically combine the FCS 340 with portions of the BSSID of the AP 104 or known sequences prior to transmission of the PPDU 300. For example, the AP 104 may XOR the FCS with the two LSBs of the 3 MSBs of the BSSID of the AP 104. Since the BSSID of the AP 104 is known to the associated STAs from the initial association process, when the FCS is decoded by the receiving WUR STAs, successful decoding may mean that the WUR STA is receiving the PPDU 300 that was generated by the AP 104 of the WUR STA. For WUR STAs that belong to a different BSSID than the transmitting AP 104, the PPDU 300 may be decrypted as being corrupted. In some examples, the AP 104 may compute the CRC and the MIC assuming that the BSSID is present in the PPDU 300 (e.g., immediately after the FCS or prior to the FCS and omit it from transmission, for example, compute but do not transmit). The receiver, when it receives the PPDU 300, may check the FCS and/or MIC under the assumption that the BSSID was present (e.g., MAC address of the AP transmitting the PPDU 300).

In some implementations, the CRC/MIC fields of the FCS 340 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes). Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302.

In some implementations, the MIC computation may be based on the entire MPDU 302. For example, the MPDU 302 may be intended for a single WUR STA or a plurality of WUR STAs. In some implementations, the MIC is generated by the AP 104 based on a group key known by both AP and the one or more WUR STAs. The group key may be known by all STAs associated with the AP 104 that are intended receivers for the PPDU 300. In some implementations, the timestamp field 323 may provide part of a monotonically increasing counter. For example, an absolute TSF timer at the WUR STA may be updated based on the partial TSF of the timestamp field 323. The absolute TSF timer may be used as an input parameter for the MIC computation, which may be further used to protect the WUR STA from replay attacks.

In some implementations, the MPDU 302 may have a minimum length and a maximum length. The length may be signaled or determined based on a frame type of the PPDU 300 (e.g., in the frame control field 321, as described herein). For example, the MPDU 302 may have a minimum length of six (6) bytes. The MPDU 302 may include one or more of the following fields: the frame control field 321 of 1 byte, the partial BSSID field 322 of 1 byte, the timestamp field 323 of 1 byte, the control/misc. instructions field 322, and the CRC/MIC field 341 of 2 bytes. In some examples, as described above, the MPDU 302 may have a minimum length of seven (7) bytes when the frame control fields 321 indicates no length (e.g., no paged IDs) but where the paged IDs field 331 is included with a length of 1 byte but a zero value. In some implementations, constant length PPDUs 300 may have minimum MPDU 302 sizes of 6 or 7 bytes. The minimum sized MPDUs 302 may utilize 1 ms of time to transmit at 62.5 Kbps.

The MPDU 302 may have a maximum length of twenty-two (22) bytes. For example, the MPDU 302 may include the minimum 6 bytes described above and then also include 16 bytes for 16 identifiers in the paged ID field 331. Thus, the maximum length for the MPDU 302 may be the 6 bytes of the non-paged IDs fields plus the maximum of 16 bytes for the paged IDs field 331. In some implementations, variable-length PPDUs 300 may be signaled and/or determined based on the frame type and length in the frame control field 321. The maximum MPDU 302 length of 22 bytes may use ~3 ms of transmission time at 62.5 Kbps. In some implementations, the MPDU 302 may have a length anywhere between 6 bytes and 22 bytes.

Figure 6:
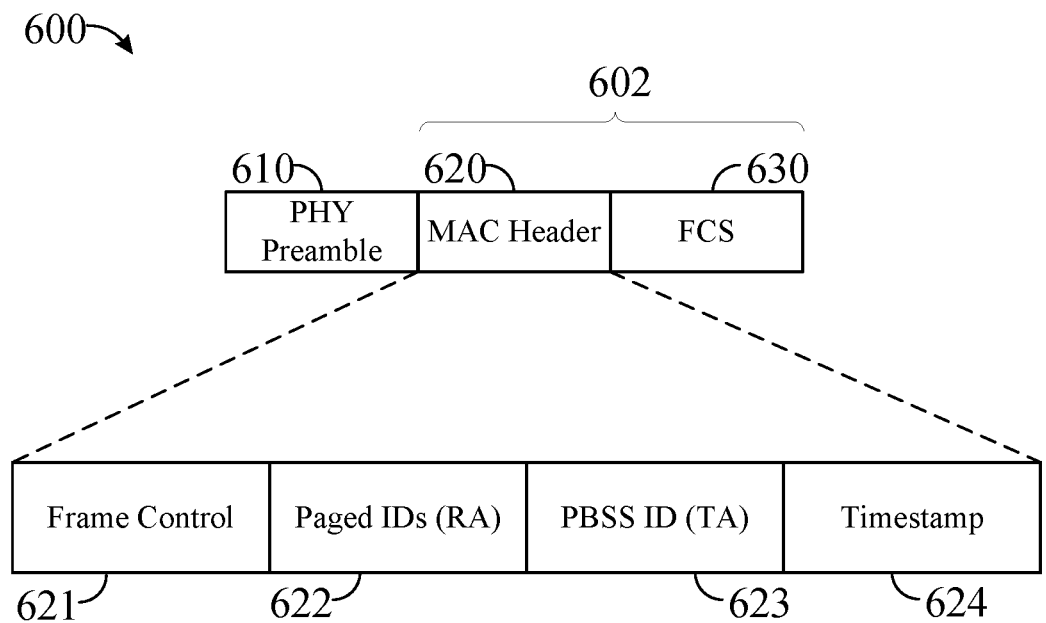
FIG. 6 illustrates an example of a structure of a PPDU for communicating with a WUR device in WUR device communications in accordance with aspects of the present disclosure.

FIG. 6 illustrates an example of a structure of a PPDU for communicating with a WUR device in WUR device communications in accordance with aspects of the present disclosure. In some examples, PPDU 600 may be used for communicating with the WUR device 202 (FIG. 2). The three portions of the PPDU 600 illustrated are a PHY Preamble 610 portion, media access control (MAC) header 620 portions, and an FCS 630 portion. The PHY preamble 610 is a portion of the PPDU 600 preamble that contains information for decoding the one or more PSDUs or MPDUs 602 contained in the PPDU 600. More than one MPDU 602 may be contained in a PPDU 600 that is sent in MU mode (e.g., using OFDMA multiplexing techniques). The MPDU 602 contained in the PPDU 600 may include one or more of the MAC header 620 and the FCS 630. The MAC header 620, as compared to the MAC header 320, may include one or more common fields that are present in all PPDUs 600 or it may include one or more type specific fields that may not be present in every WUR PPDU 600. Accordingly, in some implementations, the contents of the MAC header 620 may depend on a type of WUR PPDU frame in which the MAC header 620 is included. The FCS 630 may include a CRC or a MIC, depending on the type of WUR PPDU frame received (e.g., the CRC may be present if the PPDU 600 is not secure, and the MIC may be present if the PPDU 600 is secured). No payload or frame body portion may exist in the PPDU 600, as the PPDU frames do not carry any payloads and the type specific fields may not be included in the MAC header 620 portion. Other aspects of communicating the PPDU 600 (e.g., speeds, frequency bands, etc.) may be similar to those described above in relation to FIG. 3 and the PPDU 300.

As depicted in FIG. 6, the MAC header 620 may include one or more of four separate fields: a frame control field 621, a paged IDs (RA) field 622, a partial BSSID (TA) field 623, and a timestamp field 624. The frame control field 321 may have a length of one (1) byte or octet. The paged IDs (RA) field 622, partial BSSID (TA) field 623, and timestamp field 624 may have lengths not fully established but estimated as described below. In some implementations, some part of the contents of the frame control field 621 may be carried in the PHY preamble of the PPDU 600.

The 1-byte frame control field 621 may provide information that identifies details of the MPDU 602 type and/or length. In some implementations, the frame control field 621 may include a one-bit protocol version field (not shown), where zero (0) is currently used and one (1) is saved for future development. The frame control field 621 also includes a type subfield of a two-bit length. The type a type subfield (not shown) may identify a type of PPDU 600 frame. In some implementations, the type subfield may indicate that the PPDU 600 is a WUR Beacon frame, a WUR control frame, a WUR sync frame, etc. In some implementations, the frame control field 621 may indicate whether the PPDU 600 is a secure/protected PPDU 600 or an unsecure/unprotected PPDU 600 (e.g., MIC present or CRC present). For example, a first value in the type subfield may indicate the WUR Beacon frame while a second value in the type subfield may indicate the WUR control frame. In some implementations, the frame type indicated by the type subfield may help or may implicitly differentiate between constant length and variable-length PPDUs 600. For example, WUR broadcast frames may be constant length while Beacon or control frames may be variable length. The length/subtype field (not shown) may be a 3-bit field that may provide information indicating one or both of different frame subtypes or payload or frame body sizes for a payload or frame body of the PPDU 600 and MPDU 602. In some implementations, as will be described in more detail below, the payload or frame body may be integrated with the MAC header portion 620. In some implementations, the length/subtype field may have a length of four bits. In some implementations, the length of the MAC header 620, or of the MPDU 602, or of the variable portion of the MPDU may be indicated by the length specified in the frame control field 621. When the length/subtype field is included, the length may provide lengths for variable-length frames. Alternatively, or additionally, the subtype field may provide additional details of subtypes for constant length frames. The frame control field 621 may further include two bits for future use (one or both of these two bits may be used for security purposes, as described in further detail below). In some examples, the frame control field 621 may be moved to the PHY preamble 610 and may be part of a SIG field of the PHY preamble or encoded in the PHY preamble itself. The possible breakdown above of the frame control field 621 may also apply to the frame control field 321 of FIG. 3.

The partial BSSID field 623 (may optionally be present with a length TBD) may provide identification of an identity (e.g., and ID) of a transmitting BSS. The transmitting BSS may correspond to the BSS from which the WUR communication is transmitted. For example, the partial BSSID field 623 may include a partial address or identifier for the AP 104 or STA 106 that transmitted the PPDU 600. In some implementations, the receive WUR STA may use the partial BSSID field (and the information contained therein) to determine whether or not the WUR STA is a potential intended recipient for the PPDU 600. For example, during association with the AP 104 and/or the wireless communication system 100, the WUR STA may be assigned or provided with a BSSID for the BSS to which the WUR STA belongs (e.g., the BSS in the BSA 102). Accordingly, the WUR STA may store the BSSID for its BSS in its memory (e.g., the memory 206 of FIG. 2). When the WUR STA compares the partial BSSID 623 to the stored BSSID, if the values match, then the WUR STA may determine that the received PPDU 600 does apply to the WUR STA and perform additional checks as described below. However, if the partial BSSID 623 does not match the WUR STA stored BSSID, then the WUR STA may determine that the received PPDU 600 does not apply to the WUR STA and may ignore the remainder of the PPDU 600.

Accordingly, the partial BSSID field 623 may be used to reduce unnecessarily computations, processing, and reception of the PPDU 600 by WUR STAB that do not need to pay attention to the PPDU 600. In some examples the partial BSSID 623 may be a value that is known by both the AP 104 and the WUR STA, which may change in time according to a function (e.g., a random generator with a seed known at both devices) that is known at both the AP 104 and WUR STA.

In some examples, the partial BSSID 623 field may only include one octet of the BSSID of the transmitting device. In some examples, the single octet of the BSSID (e.g., the partial BSSID) is sufficient to provide adequate intra-PPDU power savings and discarding of PPDUs 600 sent by other BSSs (APs) as compared to the added costs (e.g., time, bandwidth, etc.) of transmitting and processing the full BSSID. Accordingly, the partial BSSID field 623 may provide for reduced accuracy of identifying whether the WUR STA belongs to the same or different BSS as the transmitting AP 104 or STA 106 while providing for reduced communication costs (e.g., time, bandwidth, etc.). Additionally, in some examples, the partial BSSID field 623 may be used in some implementations of minimization of false alarms in the FCS, as discussed in further detail below. Additionally, or alternatively, the partial BSSID may be masked or hidden in another field of the MPDU 602, for example the FCS 630. Additionally, or alternatively, the paged IDs may be scrambled or masked with the partial BSSID, as will be discussed in further detail below.

The timestamp field 624 (optional with a length TBD) may contain a partial timing synchronization function (TSF). The partial TSF may allow the WUR STA to synchronize its clock to match the clock of the transmitting AP 104. The partial TSF may also allow the WUR STA to prevent and/or avoid replay attacks, as will be described in further detail below. The timestamp field 624 may have a length of 1 byte. Alternatively, or additionally, the timestamp field 624 may include a sequence number (e.g., the timestamp field 624 may be the timestamp/sequence number field 624). The sequence number pay provide an alternative for a counter of secure frames and provide other purposes, such as BSS parameter updates, etc. In some implementations, the timestamp field 624 may include change sequence information or control information. For example, control information may be carried in the timestamp field 624 in the timestamp information (e.g., scrambled or masked) or prior to or after the timestamp information. In some implementations, if control information is desired for each paged ID, then the paged IDs field 622 may be followed by a control field (not shown). Thus, each paged ID may have a dedicated or shared control field. The control field may have a variable length based on the control information and/or the number of paged IDs. In some implementations, the control field may provide for special signaling to one or more WUR STA. For example, the control information may include application layer commands. Alternatively, or additionally, the control information may include indications of which WUR STAs should turn on their main radio or which radio to turn on in dual/tri-band radios or which antennas to activate in multi-antenna STAs. In some implementations, the control field application may be dependent on the type of the PPDU 600. In some implementations, the special commands may instruct which main radio to turn on (e.g., by identifying a radio number, technology, or band). In some implementations, the special commands may indicate which bandwidth to use or may specify one or more receive or transmit parameters.

In some implementations, the control information may be common to all of the identified WUR STAs in the paged IDs field 621. In some implementations, one or more of the identified WUR STAs in the paged IDs field 621 may have unique instructions from others of the identified WUR STAs in the paged IDs field 621. The association of WUR STAs to particular control instructions may be identified in the frame control field 621, for example, the length subfield. For example, the length subfield may indicate that each identified WUR STA has a respective control instruction field. In this example the length field may provide the length of both page ids and control Ids (unit of 2 bytes as an example because one paged id may be one byte and control another one) and the length will have a range between 2 to 14 bytes. Different lengths of the length field may be used in the frame control field (3 or 4 or more).

In some implementations, the two-byte paged ID and control field may include a combination of AID identifier bits and control/misc. instructions bits. For example, the two-byte paged ID and control field may include 12 AID identifier bits and 4 control/misc. instructions bits. In some implementations, the combination may be 8 AID identifier bits and 8 control/misc. instructions bits. In some implementations, the various combinations of the AID identifier bits and the control/misc. instructions bits are negotiated in advance between the AP 104 and the WUR STA. In some implementations, the combination of AID identifier bits and the control/misc. instructions bits may be vendor specific (e.g., different vendors may have different numbers of AIDs identifier bits and different numbers of control/misc. instructions bits, etc.).

In some implementations, the commands or instructions associated with the control/misc. instructions bits may be negotiated in advance between the AP 104 and the WUR STA. For example, these bits and the corresponding instructions may be negotiated during association of the WUR STA with the AP 104. For example, the control/misc. instructions bits may be stored in a table-type format with each bit corresponding to a particular action, command, or instruction.

The paged IDs field 622 (may include one or more paged IDs each of which may be 1 byte in length) may provide a list of intended receiving WUR STAs of the payload or frame body or of the WUR PPDU 600. In some implementations, the paged IDs field 624 may include identifiers, each of which may identify one WUR STA or assigned to a group of WUR STAs, or identify all WUR STAs associated to the device sending the PPDU 600. The paged IDs field 622 may be used in conjunction with the partial BSSID field 623 of FIG. 6. For example, when a WUR STA determines that the partial BSSID field 622 (or BSSID stored or retrieved from elsewhere, for example, masked with FCS 630 or paged ID) matches the BSSID of the WUR STA, then the WUR STA may proceed to confirm that the ID of the WUR STA is included in the paged IDs field 622. If the ID of the WUR STA is not included in the paged IDs field 331, then the WUR STA can stop receiving the PPDU 600 and can ignore any received information. On the other hand, if the ID of the WUR STA is included in the paged IDs field 622, then the WUR STA proceeds to receive the remainder of the PPDU 600 and follows any instructions included in the PPDU 600. In some examples each paged ID in the paged IDs field 622 may be mixed, scrambled, coded, or masked with a known portion of an identifier of the BSS of the AP 104 (e.g., XORed with certain 8 bits of the BSSID of the AP 104 and the WUR STA) so that the paged ID values are not concentrated in a certain portion of the range of available IDs. For example, if all APs 104 start allocating IDs in increasing (or any other) order, then the likelihood that multiple APs 104 assign low values (e.g., 1, 2, etc.) is high. If APs 104 apply this rule, then paged ID values can be uniformly spread across the 1-255 range. In certain implementations, the APs 104 may use a random generator for selecting the paged IDs that are assigned to associated STAs. The random generator and selected/assigned paged IDs may be known by all APs 104 that are within range so that paged IDs assigned by APs 104 in the same area do not coincide or overlap.

In some implementations, the paged IDs field 622 may have a length of one byte. With a length of one byte, the paged IDs field 622 may indicate or identify a single WUR STA to or with which the PPDU 600 applies or is associated. The paged IDs field 622 may have a size of up to 8 bytes, allowing the PPDU 600 to apply or be associated with up to 8 different WUR STAs. For example, when the length subfield in the frame control field 621 is 3 bits, then only 8 paged IDs can be included. Thus, length subfield of the frame control field 621 may indicate the number of WUR STAs identified by the paged IDs field 622 and, accordingly, may indicate a number of bytes of the length of the paged IDs field 622 (maximum of 8). In some examples, when the length subfield is zero (0), the PPDU 600 may be intended to be a broadcast or multicast PPDU that applies to all WUR STAs or to all WUR STAs sharing the BSSID of the partial BSSID field 622. In such an implementation, the paged IDs field 622 may have a length of zero and may not include any WUR STA identifiers. In some implementations, when the length subfield is 0 for the broadcast PPDU, the pages IDs field 622 may have a length of one (1) byte without including any WUR STA identifiers (e.g., may have a value of zero, indicating that the PPDU is a broadcast PPDU). In some implementations, the paged IDs field 622 is included in multicast and/or broadcast PPDUs 600. Only a single paged ID may be present in the paged IDs field 622 (length of 1 byte) for a unicast PPDU 600.

The paged IDs subfield 622 of 1-byte length may be used to identify one of up to 256 unique STA identifiers (or if value 0 is used for broadcast than up to 255 unique STA identifiers). The number of STAs that can be identified depends on the size of the paged ID. For example, if the paged ID is 11 bits in length, then the paged ID may identify up to 1024 STA (assuming value of 0 is used for broadcast), and so on. However, if the AP 104 serves more than 256 STAs, then the AP 104 may be configured to orthogonally schedule STAs that share the same paged IDs. If the paged IDs are obtained from an association identifier (AID), for example, 8 LSBs of the AID provided the paged ID, then the AP 104 may make such scheduling using one or more of the remaining MSBs of the AID. For example, STAs having an association identifier of "1" and "257" may share the LSB of 0000 0001. Accordingly, if the paged IDs field 622 identifies the STA having the identifier 0000 0001, then both the STA "1" and the STA "257" will determine, based on the partial BSSID field 623 and the paged IDs field 622, that the PPDU 600 is intended for the STA. Accordingly, the STA "1" and the STA "257" may be considered "clones." During association of the STA "1" and the STA "257," the AP 104 may schedule clones to have orthogonal wake times or allocated in orthogonal groups. For example, the STA "1," during association, may be provided to have a scheduled wake times and wake time durations (SPs) such that they do not coincide with the scheduled wake times and wake time durations of STA 257 (e.g., STA 1 may be scheduled the first 10 ms of a 20 ms wake time duration and STA 257 may be scheduled the second 10 ms of the 20 ms wake time duration). Accordingly, the clone STAs (e.g., the WUR STAs having the same LSB identifiers or paged ID) will not wake up simultaneously and unintended WUR STAs will not be awakened just because they share an LSB identifier or paged ID with an intended WUR STA.

Alternatively, or additionally, a most significant bit (MSB) of the identifier for the paged IDs may be masked in one or more other fields of the PPDU 600 or the MPDU 602. For example, the paged IDs in the paged IDs field 622 may be associated with between one and four groups of MSBs. For example, for the STA "1" and the STA "257," the STAs will be associated with two groups of MSBs. The STA "1" will be associated with an MSB of "0" while the STA "257" will be associated with an MSB of "1." Accordingly, the MSB identifiers may be communicated to the WUR STA to allow the WUR STA to determine if the PPDU 600 is intended for it or for another WUR STA having the same LSB identifier in the paged ID field 622.

In some implementations, the AP 104 may desire to send instructions or page more than 8 WUR STAs. In such an implementation, the AP 104 may send a multicast or broadcast PPDU 600 (e.g., having the length of 0, as described herein). Alternatively, or additionally, the AP 104 may transmit back-to-back (e.g., consecutive) PPDUs 600. When multiple PPDUs 600 are transmitted back-to-back, the AP 104 may include STA identifiers in the paged IDs field 622 in only ascending order, which may allow STAs to know when they will not be paged in later PPDUs 600. For example, when a first PPDU 600 of two or more back-to-back PPDUs 300 includes paged IDs for WUR STA 1, 3, and 8, the WUR STA 5 may know that later PPDUs 600 of the two or more back-to-back PPDUs 600 will not page the STA 5 because the lowest WUR STA that can be paged by subsequent PPDUs 600 is 9 (e.g., the STA identifiers only ascend between PPDUs). Such an ascending order may allow WUR STAs to optimize their sleep patterns by determining when they will not be paged without having to wait for all back-to-back PPDUs 600 from being received and reviewed. In some implementations, one or more bits may be included in the MPDU 602 to indicate that a train of one or more other PPDUs 600 is following the current PPDU 600.

In some implementations, the no paged ID field 622 is included in broadcast PPDUs 600 as noted above. In such an implementation, each receive WUR STA will decode the PPDU 600, independent of the BSS of the WUR STA. Thus, in some implementations, the partial BSSID field 623 and the paged IDs field 622 may be eliminated from the MAC header 620 (further reducing the minimum MPDU 602 size to 3 bytes). In some implementations, one paged ID may be included in the paged ID field 622 for broadcast frames. Accordingly, the AP 104 may allocate a single WUR STA ID for inclusion in the paged IDs field 622. In some implementations, this WUR STA may drop other BSSIDs. Additionally, or alternatively, the AP 104 may scramble or mask a portion of the BSSID identifier of the AP 104 with the paged IDs included in the paged ID field 622. For example, the AP 104 may mask its BSSID (or a portion thereof, for example, BSSID[40:47]) with the target paged IDs as stored in the paged IDs field 622. The receive WUR STAs can descramble the paged IDs in the paged IDs field 622 and determine if any of the obtained paged IDs match the WUR STA's identifier or if it is a broadcast value (e.g., paged ID value of 0). If the WUR STA determines that one of the descrambled paged IDs matches the WUR STA identifier, or that the broadcast value was included, then the WUR STA receives the remainder of the packet and performs any necessary actions. If the WUR STA determines that the descrambled paged ID does not match the WUR STA identifier and that the broadcast value is not included, then the WUR STA may discard the PPDU 600.

Figure 7:
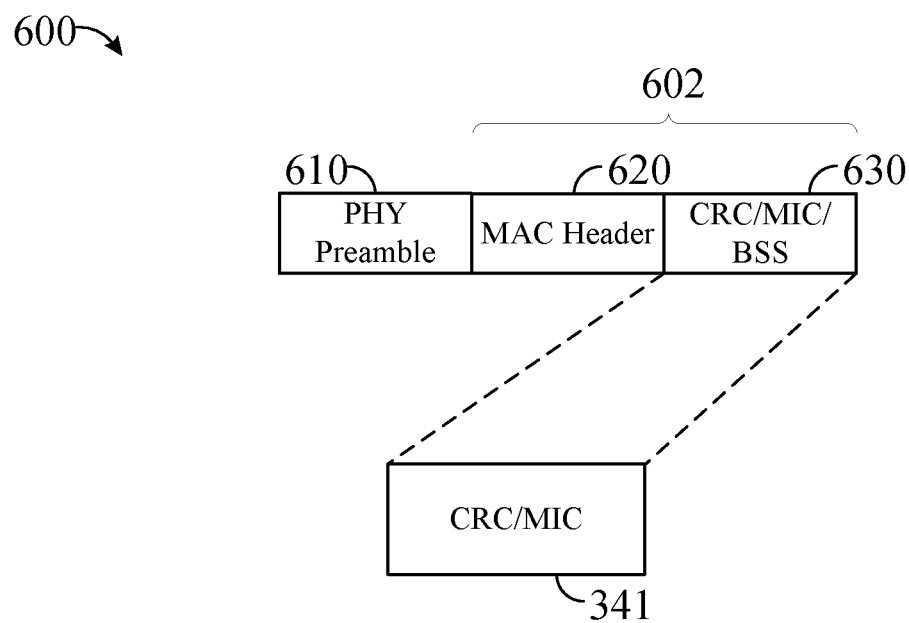
FIG. 7 illustrates an example of further details of the structure of the PPDU of FIG. 6 for communicating with a WUR device in WUR device communications in accordance with aspects of the present disclosure.

FIG. 7 illustrates an example of further details of the structure of the PPDU of FIG. 6 for communicating with a WUR device in WUR device communications in accordance with aspects of the present disclosure. In some examples, the exemplary structure of PPDU 600 of FIG. 6 may be used for communicating with the WUR device 202 (FIG. 2). As depicted in FIG. 7, the FCS 630 (length TBD) may include a CRC or a MIC. The CRC may be used to detect errors in unsecured PPDUs 600. The MIC may be used to detect errors and replay attacks in secure PPDUs 600. In some implementations, there may not be any need for an explicit CRC for the PPDU 600.

In some implementations, the AP 104 may hide, scramble, or mask its partial BSSID in the FCS 630. Various methods may be used for such scrambling or hiding. For example, the AP 104 may XOR its partial BSSID (e.g., BSSID[23:38]) with the FCS 630. Accordingly, the WUR STA will only successfully decode received PPDUs 600 generated by its AP 104 because only those WUR STAB will have the proper BSSID values to successfully decode the FCS 630. PPDUs generated by other APs 104 will decode as being corrupted because the improper BSSID decoder value will result in an incorrect FCS 630. By using such a scrambling or coding method, the partial BSSID may not need to be included as a separate field, saving communication time, power, and bandwidth. In some implementations, the FCS field 630 may have a length of 2 bytes, which may provide for better security and protection, fewer false alarms, and greater prevention of replay attacks. In some implementations, the AP 104 may compute the CRC and the MIC assuming that the BSSID of the AP 104 is present in the PPDU 600 (e.g., immediately after the FCS or prior to the FCS) and omit the BSSID from transmission (e.g., compute but do not transmit). The WUR STA, when it receives the PPDU 600, may check the FCS and/or MIC under the assumption that the BSSID was present (e.g., MAC address of the AP 104 transmitting the PPDU 600).

Accordingly, in some examples, computing the CRC may be based at least in part on an assumption that at least a portion of the BSSID is present in the WUR frame. For example, a transmitter may append one or more bits of the BSSID in the WUR frame but without transmitting the one or more bits of the BSSID (e.g., a 16-bit address 2 field may be present after an address field but the address 2 may not be transmitted).

Alternatively, the CRC may be computed as described herein and then may be scrambled or embedded with some information of the BSSID with which the transmitter device (e.g., the AP 104) is associated. In some examples, the XORing may be expanded to other fields of the WUR frame. For example, if the WUR frame is 6 bytes long, then WUR frame may be scrambled with 6 bytes of BSSID. The scrambling of the CRC may occur before the CRC is included in the FCS 630. The CRC may be scrambled with 16 bits of the BSSID. As described herein, the scrambling may include XORing the CRC. A receiver device (e.g., the STA 106) may descramble the CRC based on known information of the receiver BSSID before checking or comparing the descrambled CRC to confirm that it passes. In some examples, the MIC may be computed and scrambled or embedded instead of the CRC.

In some implementations, the CRC/MIC/BSS fields of the FCS 630 may be used to ensure that WUR STAs are not woken up by PPDUs from an attacker or non-friendly AP 104. For example, a security protocol with low overhead may be used to avoid CCMP-like signaling, where the MIC has 8 or 16 bytes and the CCMP header has 8 bytes). Accordingly, the PPDUs 300 or MPDUs 302 may be unsecure when the FCS 340 contains the CRC and secure when the FCS 340 contains the MIC. In some implementations, the frame control field 321 may be used to signal whether CRC or MIC is used for a particular PPDU 300 or MPDU 302. In some implementations, the MIC is a truncated output of a selected cipher suite (e.g., baseline) and the timestamp field 624 TSF timer may act as a packet number. Accordingly, the PPDUs 600 may be unsecure PPDUs when the FCS 630 contains the CRC with a scrambled/coded/masked/camouflaged/etc. BSSID of the AP 104 and may be secure PPDUs when the FCS 630 contains the MIC with scrambled/coded/masked/camouflaged/etc. BSSID of the AP 104. In some implementations, the frame control field 621 may signal differences between the secure and unsecure PPDUs 600.

In some implementations, the MIC computation may be based on the entire MPDU 602. For example, the MPDU 602 may be intended for a single WUR STA or a plurality of WUR STAs. In some implementations, the MIC is generated by the AP 104 based on a group key known by both the AP 104 and the one or more WUR STAs. For example, the group key may be a primary connecting radio (PCR) group key, etc., IGTK. The group key may be known by all STAs associated with the AP 104 that are intended receivers for the PPDU 600. In some implementations, the timestamp field 624 may provide part of a monotonically increasing counter. For example, the timestamp field 624 may contain the MSB of the 2 LSBs of the TSF timer, which may provide 256 us steps in time and a wraparound of the timestamp every 65536 ms. In some implementations, a full TSF timer at the WUR STA is updated using the partial TSF included in the timestamp field 624. In some implementations, the absolute TSF timer may be used as an input parameter for the MIC computation, which may be further used to protect the WUR STA from replay attacks.

In some implementations, the MPDU 602 may have a minimum length and a maximum length. The length may be signaled or determined based on a frame type of the PPDU 600 (e.g., in the frame control field 621, as described herein). For example, the MPDU 602 may have a minimum length of five (5) bytes. The MPDU may include one or more of the frame control field 621 of 1 byte, the paged IDs (RA) field 622 (TBD), the partial BSSID (TA) field 623 (TBD), the timestamp field 624 (TBD), and the CRC/MIC/BSS field 631 (TBD), assuming that the paged IDs (RA) field 622 has a length of zero bytes (e.g., for a broadcast or multicast PPDU 600) and each of the remaining TBD fields have a minimum length of 1 byte. In some examples, as described above, the MPDU 602 may have a minimum length of six (6) bytes when the frame control fields 621 indicates no length (e.g., no paged IDs) but where the paged IDs field 622 is included with a length of 1 byte but a zero value. In some implementations, constant length PPDUs 600 may have minimum MPDU 602 sizes of 5 or 6 bytes. The minimum sized MPDUs 602 may utilize ~0.77 ms of time to transmit at 62.5 Kbps.

The MPDU 602 may have a maximum length of twelve (12) bytes. For example, the MPDU 602 may include the minimum 5 bytes described above and then also include 7 bytes for 16 identifiers in the paged ID field 622. Thus, the maximum length for the MPDU 602 may be the 5 bytes of the non-paged IDs fields plus the maximum of 8 bytes for the paged IDs field 622. In some implementations, variable-length PPDUs 600 may be signaled and/or determined based on the frame type and length in the frame control field 621. The maximum MPDU 602 length of 12 bytes may use ~1.66 ms of transmission time at 62.5 Kbps. In some implementations, the MPDU 602 may have a length anywhere between 5 bytes and 12 bytes.

Figure 8:
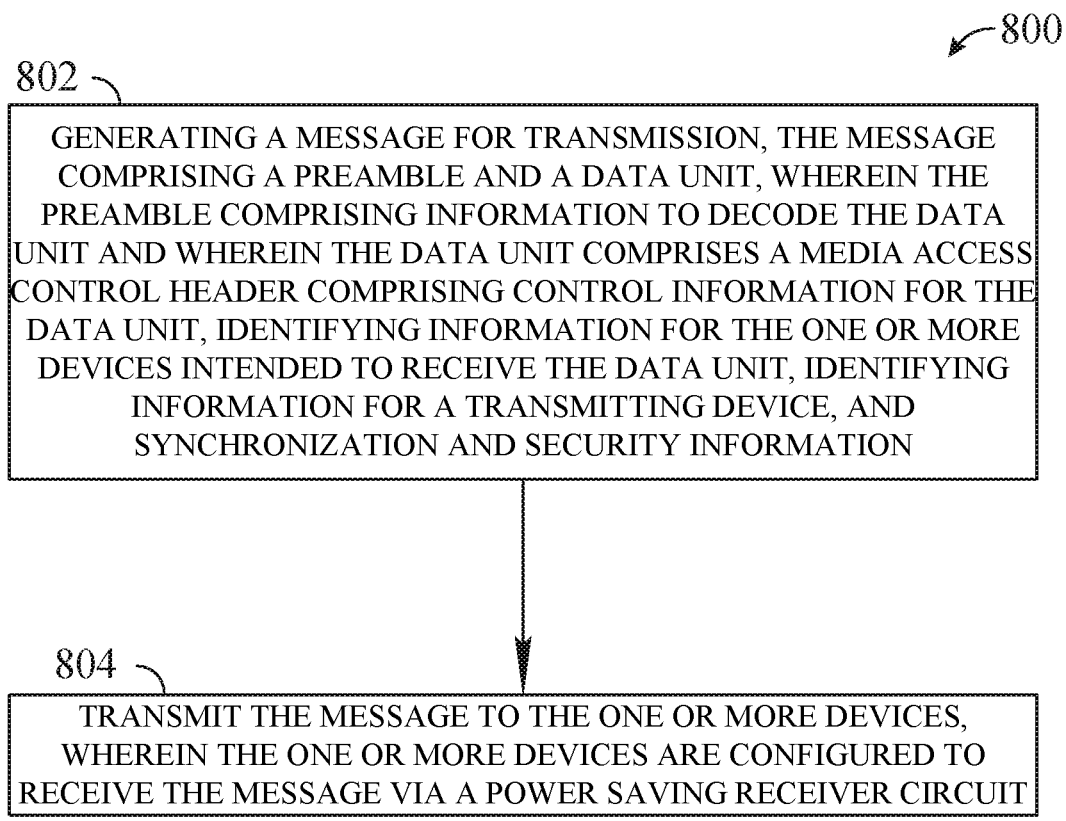
FIG. 8 illustrates a flowchart of an exemplary method that supports addressing for WUR frames in WUR device communications in accordance with aspects of the present disclosure.

FIG. 8 illustrates a flowchart of an exemplary method that supports addressing for WUR frames in WUR device communications in accordance with aspects of the present disclosure. Although the method 800 is described herein with reference to communications among an AP 104 and STAs 106 as discussed above with respect to FIG. 1, a person having ordinary skill in the art will appreciate that the method 800 may be implemented by other suitable devices and systems. For example, the method 800 may be performed by a STA 106 or a plurality of APs 104. Although the method 800 is described herein with reference to a particular order, in various examples, blocks herein may be performed in a different order, or omitted, and additional blocks may be added.

In operation block 802 the method comprises generating a message for transmission, the message comprising a preamble and a data unit. The preamble may comprise information to decode the data unit. The data unit may comprise control information for the data unit, identifying information for the one or more devices intended to receive the data unit, identifying information for a transmitting device, and synchronization and security information. In operational block 804, the method further comprises transmitting the message to the one or more devices from the transmitting device, wherein the one or more devices are configured to receive the message via a power saving receiver circuit.

In some examples, an apparatus for wireless communication may perform some of the examples described herein. In some examples, the apparatus comprises means for generating a message transmission, the message comprising a preamble and a data unit. The preamble may comprise information to decode the data unit. The data unit may comprise control information for the data unit, identifying information for the one or more devices intended to receive the data unit, identifying information for a transmitting device, and synchronization and security information. The apparatus further comprises means for transmitting the message to the one or more devices from the transmitting device, wherein the one or more devices are configured to receive the message via a power saving receiver circuit.

Figure 9:
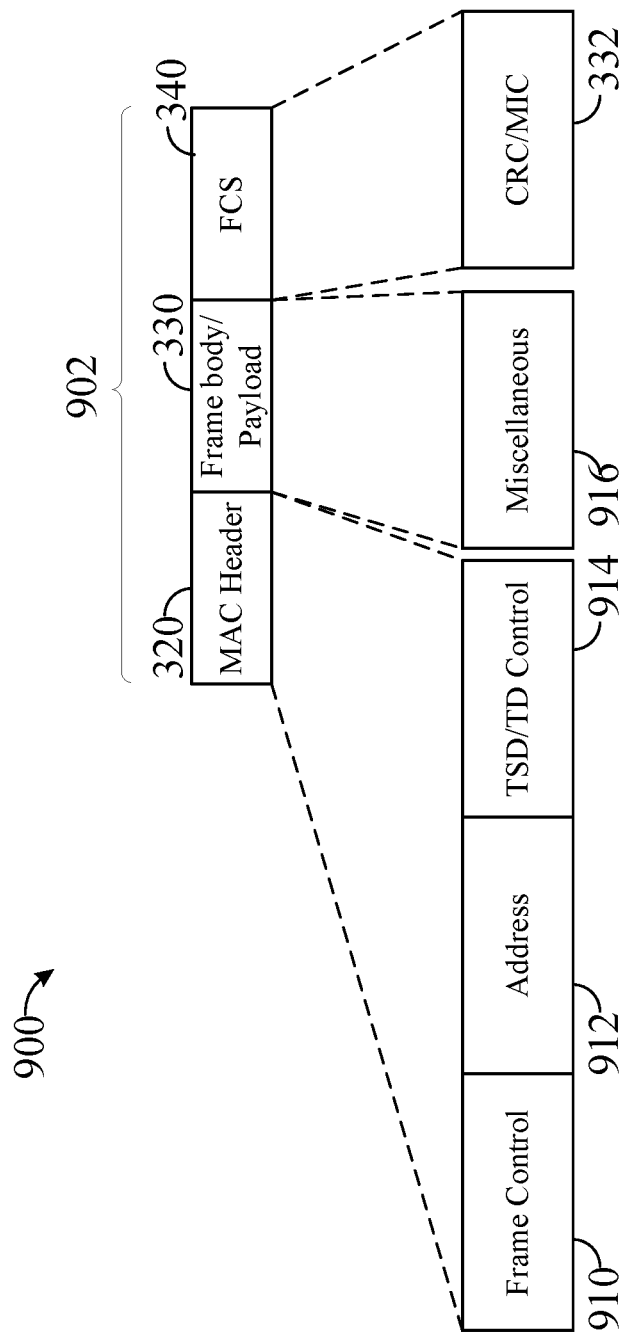
FIG. 9 illustrates an example of further details of the structure of the PPDU of FIG. 3 for communicating with a WUR device (e.g., FIG. 2) in WUR device communications in accordance with aspects of the present disclosure.

FIG. 9 illustrates an example of further details of the structure of the PPDU of FIG. 3 for communicating with a WUR device (e.g., FIG. 2) in WUR device communications in accordance with aspects of the present disclosure. FIG. 9 illustrates only the three portions of the one or more MPDU 902 contained in the PPDU 300. More than one MPDU may be contained in a PPDU that is sent in MU mode (e.g., using OFDMA multiplexing techniques). The MPDU 902 may include one or more of a MAC header 320, payload or frame body portion 330, and FCS 340. The MAC header 320 may include one or more common fields that are present in all WUR frames or PPDUs. For example, the MAC header 320 may include one or more of a frame control field 910, an address field 912, and a TSD (type subtype dependent)/TD (type dependent) control 914. Either one of the TSD or TD may be present in the WUR frame. In some examples, TSD and TD may be used interchangeably. The payload or frame body portion 330 may contain miscellaneous information and may have a length of zero ("0") or more bits. In certain examples, the length may be a multiple of one octet, or two octets, etc., and the length may be indicated in the Frame Control field. The FCS 340 may include cyclic redundancy check ("CRC") or message integrity check ("MIC") depending on the type of PPDU 300 received (e.g., the CRC may be present if the frame is not secure, and the MIC may be present if the frame is secured). The FCS field 340 may be a 16-bit field. The FCS 340 may additionally be computed accounting for the BSSID address if the frame is sent to one or more STAs that are associated with the BSS. The FCS 340 may not be computed accounting for the BSSID address if the frame is sent to one or more STAs that are not associated with the BSS.

As depicted in FIG. 9, the MAC header 320 may include one or more of the three separate fields: a frame control field 910, an address field 912, and a TSD/TD control field 914. The frame control field 910 may be an 8-bit field, the address field 912 may be a 12-bit field, and the TSD/TD control frame 914 may be a 12-bit field. In some examples some part of the contents of the Frame Control field may be carried in the PHY preamble of the WUR PPDU. Additionally, the payload or frame body portion 330 may have a variable length and the FCS may have a length of 8, 16, 24, and 32 bits. For example, the maximum lengths for the payload or frame body portion 330 may be 8, 16, 32 or 64 bytes. In certain examples, the length of the payload or frame body portion 330 is indicated in the frame control field 910, and is in units of 1 octet, 2 octets, etc.

The 1-byte frame control field 910 may provide information that identifies details of the MPDU 902 type and/or length, and additional information that may be necessary to decode the MPDU. In some implementations, the frame control field 910 may include a one-bit protocol version field (not shown), where zero (0) is currently used and one (1) is saved for future development. In some implementations, the frame control field 910 may include a type subfield (not shown) and a length/subtype field (not shown). The type subfield may be configured to identify a frame type for the MPDU 902. In some implementations, the type subfield may indicate that the MPDU 902 is a WUR Beacon frame, a WUR control frame, a WUR sync frame, a WUR paging frame, etc.). In some examples the type subfield may be used to differentiate between constant or variable-length frames. For example, a first value in the type subfield may indicate the WUR Beacon frame with a constant length while a second value in the type subfield may indicate the WUR control frame with a varied length. The length/subtype field may provide information indicating one or both of different frame subtypes or different payload or frame body sizes for the payload or frame body portion 330 portion of the MPDU 902. Alternatively, or additionally, the length/subtype field may provide a parity bit which may indicate validity or lack of corruption in the frame. Alternatively, or additionally, a bit (e.g., the first bit or the last bit of the frame control field 910) may be a parity bit that indicates validity or corruption of one or more of the subfields of the MPDU 902. In one example the parity bit may be computed to cover only the frame control field 910, or the frame control field 910 and/or the address field 912. Alternatively or additionally, the length/subtype field may indicate a frame subtype for constant length frames or a length for variable-length frames. In some examples, the parity bit may be any bit in the frame control field 910. For example, the parity bit may be either bit 1 of the frame control field 910 or the last bit of the frame control field 910. Alternatively, or additionally, the parity bit could also be one of the bits of the address field 912 (e.g., the last bit).

The address field 912 may optionally be present and may be 8 or 12 bits in length and may provide identification of an identity (e.g., an ID) of a transmitting device. The transmitting device may be identified by the transmitting BSS, which may correspond to the BSS from which the WUR communication is transmitted. For example, the address field 912 may contain a partial BSSID field 322 or it may include a partial address or identifier for the AP 104 or STA 106 that transmitted the PPDU 300. Alternatively, the address field 912 may include a portion of the BSSID or a portion of the service set identifier (SSID). In some implementations, the receive WUR STA may use the address field 912 (and the information contained therein) to determine whether or not the WUR STA is a potential intended recipient for the PPDU 300. For example, during association with the AP 104 and/or the wireless communication system 100, the WUR STA may be assigned or provided with a BSSID for the BSS to which the WUR STA belongs (e.g., the BSS in the BSA 102). Accordingly, the WUR STA may store the BSSID for its BSS in its memory (e.g., the memory 206 of FIG. 2). When the WUR STA compares the partial BSSID 322 to at least a portion of the stored BSSID (or the portion to be compared may be stored rather than the full BSSID), if the values match, then the WUR STA may determine that the received PPDU 300 does apply to the WUR STA and perform additional checks as described below. However, if the partial BSSID 322 does not match the WUR STA stored BSSID or SSID, then the WUR STA may determine that the received PPDU 300 does not apply to the WUR STA and may ignore the remainder of the PPDU 300. Accordingly, the partial BSSID field 322 may be used to reduce unnecessarily computations, processing, and reception of the PPDU 300 by WUR STAs that do not need to pay attention to the PPDU 300. In some examples the partial BSSID may be a value that is known by both the AP and STA which may change in time according to a function (e.g., a random generator with a seed known at both devices, or in line with a time reference common at the AP and STA) that is known at both the AP and STA. In some examples, the address field 912 may contain an identifier for the WUR frame, which may be selected from Table 1 below. The identifier included in the address field 912 may be dependent on the type of WUR frame (identified below in relation to Table 2).

TABLE 1

Identifiers of WUR frames

| Address field | Identifier description |
| --- | --- |
| Transmit ID | Identifier of the transmitting AP (may be provided by the AP to the WUR STAs) |
| Group ID | Identifier of a group of receiving WUR STAs (may be provided by the AP to the group of WUR STAs) |
| Wake Up ID | Identifier of an individual receiving WUR STA (may be provided by the AP to the WUR STA) |
| OUI1 | The 12 MSBs of the OUT (see 9.4.1.32 (Organization Identifier field)) |

In some examples, the WUR STAs may rely on the address field 912 of the WUR frame to identify whether the frame is one of the Wake-Up ID (meaning the WUR frame is individually addressed to the receiving WUR STA), the Transmit ID (meaning the WUR frame is broadcast), and the Group ID (meaning the WUR frame is addressed to a group to which the WUR STA belongs). In some examples, the WUR STAs also rely on additional information that may be included in the WUR frame (e.g., an embedded BSSID, as described in more detail herein) and/or that may be included in the WUR frame (e.g., in a TSD/TD control field 914). Based on this combination of the address field 912 and some additional information, the WUR STAs may experience reduced false wake ups caused by WUR frames generated by OBSS APs and may experience increased or improved filtering of WUR frames that are not intended for the WUR STA because the received information increases a likelihood that the corresponding addressing information is reliable and/or accurate.

In some examples, the address field 912 of a WUR frame (e.g., a Wake-Up frame) contains the Wake-Up ID when the WUR frame is individually addressed, the Group ID when the WUR frame is group addressed, and the Transmit ID when the WUR frame is broadcast. In the descriptions below, other examples for the identifiers contained in the address field and/or in other fields of the WUR frame are provided.

In some examples, the partial BSSID 322 field may only include one octet of the BSSID of the transmitting device or 12 bits of the BSSID (or SSID). In some examples, the single octet or 12 bits of the BSSID (e.g., the partial BSSID) is sufficient to provide adequate intra-PPDU power savings and discarding of PPDUs sent by other BSSs (APs) as compared to the added costs (e.g., time, bandwidth, etc.) of transmitting and processing the full BSSID. Accordingly, the partial BSSID field 322 may provide for reduced accuracy of identifying whether the WUR STA belongs to the same or different BSS as the transmitting AP 104 or STA 106 while providing for reduced communication costs (e.g., time, bandwidth, etc.). Additionally, in some examples, the partial BSSID field 322 may be used in some implementations of minimization of false alarms in the FCS, as discussed in further detail below. In some examples, the frame control field 910 can be moved to the PHY preamble if there is a SIG field in the PHY preamble.

The type and/or subtype dependent (TSD/TD) control field 914 contains control information that depends on the type and/or subtype of the MPDU 902, as discussed in more detail below. For example, the TSD/TD control field 914 may contain a partial TSF if the MPDU 902 is a beacon, a packet number if the MPDU 902 is paging one or more STAs to wake up and the frame is protected, other control information may be carried in this case such as partial TSF etc. In another example, the TSD/TD control field 914 may contain additional portions of the transmitter identifier. This may be useful for frames sent prior to association (e.g., for locationing, discovery, and ranging purposes) as these frames may require a lower false alarm probability. In this example the Address field and the TSD/TD control field 914 may be such that a portion of the transmitter identifier is stored in the Address field and another portion of the transmitter identifier is stored in the TSD/TD control field 914. Alternatively the TSD/TD control field 914 may contain a portion of the receiver identifier when the Address field contains a portion of the transmitter identifier, or vice versa. While we refer to a portion of the identifier in this example it should be clear that these values may be identifiers that are assigned, and/or negotiated between the peer STAs using the main radio.

The payload or frame body portion 330 may be of variable length, and its content may be dependent of the MPDU type/subtype or other settings of fields that precede it in the MPDU 902. The payload or frame body portion 330 may contain information specific to particular individual WUR frame types. Additionally, the payload or frame body portion 330 may not be present in constant length WUR frames and may be present in variable-length WUR frames. In some examples, the length of the payload or frame body portion 330 may be equal to X*(L+1), where L is the value of the length subfield in the frame control field 910 and X is the unit in octets (e.g., if unit is 1 octet and the length field is 3 bits, or if unit is 2 octets and the length field is 2 bits), 16 octets (similar considerations playing with the possible X, L values), 24 octets, or 32 octets. Examples of the possible miscellaneous fields are provided below in relation to FIG. 10.

Figure 10:
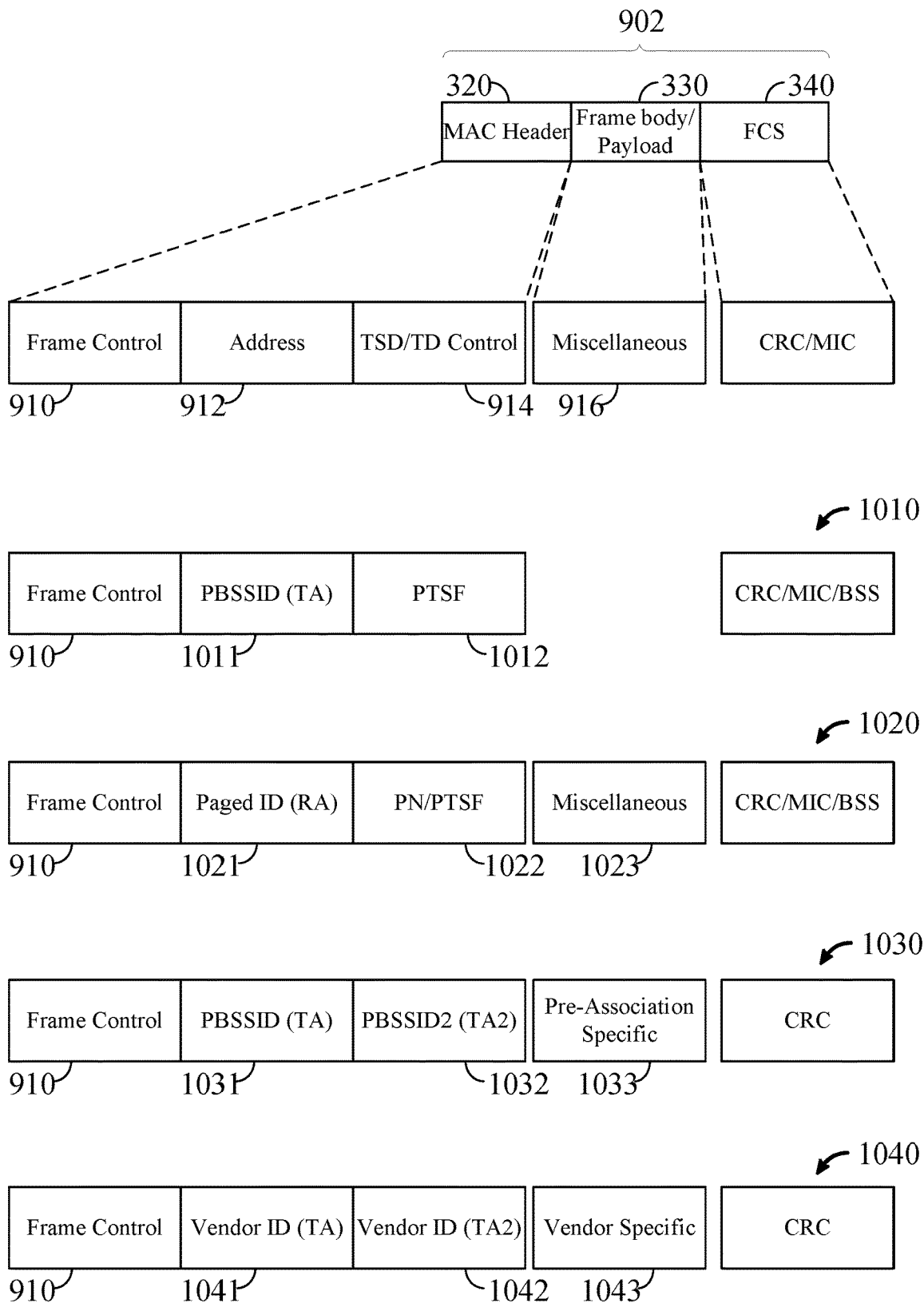
FIG. 10 illustrates an example of further details of an exemplary structure of a media access control (MAC) protocol data unit (MPDU) of FIG. 9 for communicating with a WUR device in WUR device communications in accordance with aspects of the present disclosure.

FIG. 10 illustrates an example of further details of an exemplary structure of a media access control (MAC) protocol data unit (MPDU) of FIG. 9 for communicating with a WUR device in WUR device communications in accordance with aspects of the present disclosure. FIG. 10 illustrates four specific MPDU formats of the general MPDU format 902: a beacon format 1010, a paging format 1020, a pre-association format 1030, and an exemplary vendor specific format 1040. As shown, each of these formats may be associated with a particular "type" value (and/or subtype value) which may correspond to a value to be used in the type subfield of the frame control field 910 described herein. Accordingly, the beacon format 1010 may be identified by the type field value being "0", the paging format 1010 may be identified by the type field value being "1", the pre-association format 1030 may be identified by the type field value being "2", and the vendor specific format 1040 may be identified by the type field value being "3".

As shown, the beacon format 1010 includes the 8-bit frame control field 910 as described above in relation to FIG. 9. The 12-bit address field 912 referenced in relation to FIG. 9 is a partial BSSID (PBSSID) 1011 for the transmitting device, as described herein. For the beacon format 1010, the 12-bit TSD/TD control field 914 is a partial timestamp function (PTSF) field, 1011, and contains 12 bits of the timing synchronization function of the AP (e.g., the 12 LSBs of the Timestamp field that the AP would include in a transmitted beacon, or a certain window of size 12 bits of the Timestamp field). The PTSF field helps the receiver to synchronize its internal clock to that of the AP (peer STA) with which the receiver is interacting. For the beacon format 1010, no payload or frame body portion 330 may be included, and the FCS 340 is the CRC/MIC/BSS field described herein. Thus, the beacon format 1010 may have a length of 6 bytes.

In some examples, the beacon format 1010 may be constant or variable length. The constant length may be most used and may be required for use by all WUR devices. The enhanced or extended length beacon formats may be optional. In some examples, a beacon format 1010 may have a subtype identifier (e.g., in the length/subtype field) of 0, indicating a constant length. If the length bits are not used to indicate the length of the payload or frame body portion 330, then this field (e.g., the remaining bits of the length/subtype field) may not be used and can be repurposed. In such an example, the bits may be used as extended control bits, such as a change sequence number that can indicate to the receiver STAs that a BSS system update has occurred if the change sequence number has increased.

As shown, the paging format 1020 includes the 8-bit frame control field 910 as described above in relation to FIG. 9. The 12-bit address field 912 referenced in relation to FIG. 9 is a paged ID field 1021 for the receiving device, as described herein, and may contain the 11 LSBs of the association identifier of the receiving device. For the paging format 1020, the 12 bit TSD/TD control field 914 may be any of the following: a packet number field which is an increasing number that identifies the packet and may be used to identify replay attacks for protected frames, or may be used to identify the packet for which an acknowledgment is needed; a PTSF field which contains a portion of the timing synchronization function, which is useful for synchronizing the internal clock of the receiver to that of the transmitter, and additionally can be used as a counter to detect replay attacks over secure frames. For the paging format 1020, a frame body field 1023 of variable length may be included, and presence of the frame body field 1023 may be indicated by a nonzero length field in the frame control field 910, and the FCS 340 is the CRC/MIC/BSS field described herein. Thus, the paging format 1020 may have a minimum length of 6 bytes and a maximum length of 13 bytes, depending on the presence and/or length of the frame body field 1023.

The paging format 1020 may be basic or advanced. When the paging format 1020 is advanced, it may have a variable length based on the presence and length of the frame body field 1023 itself. Accordingly, the length/subtype field of the frame control field 910 may be used to indicate a length of the frame body field 1023 in units of 1 byte, in units of 2 bytes, 3 bytes, 4 bytes, and so on (unit known at both transmitter and receiver and can be a default value). For example, when the length/subtype field indicates "2", the frame body field 1023 may have a length of 2 bytes. In some examples, the 2-byte frame body field 1023 may indicate two addresses in reference to the paged ID in the paged ID field 1021. For example, the frame body field 1023 may include a range of addresses in relation to the paged ID in the paged ID field 1021. For example, when the frame body field 1023 is 2 bytes then it may contain a STA list of an additional 2 paged ID fields, identifying a second and a third STA, wherein the first STA is identified by the Address field itself of the WUR Paging frame. In this example the first STA is identified by the AID contained in the Address field, the second STA is identified by the AID (identifier) that is obtained from the 3 MSBs of the Address field and the first 8 bits of the STA list, while the third STA is identified by the AID (identifier) that is obtained from the 3 MSBs of the Address field and the second 8 bits of the STA list. As shown, the pre-association format 1030 includes the 8-bit frame control field 910 as described above in relation to FIG. 9. The 12-bit address field 912 referenced in relation to FIG. 9 is a partial BSSID field 1031 or a partial identifier for the transmitting device (e.g., PBSSID (TA)). For the pre-association format 1030, the 12-bit TSD/TD control field 914 is a second partial BSSID field 1032 (e.g., PBSSID2 (TA2)), as described herein. The presence of two identifiers in the frame reduces significantly the false alarm probability. For the pre-association format 1030, the payload or frame body portion 330 may be specific to pre-association frames (e.g., a pre-association specific field 1033) and may be of variable length. The FCS 340 is the CRC field described herein. Thus, the pre-association format 1030 may have a minimum length of 6 bytes and a maximum length of 13 bytes, depending on the length of the pre-association specific field 1033. In some examples, the vendor specific field 1043 may include a receiver address (e.g., an address of the receiving device for the vendor specific format 1040 frame).

In some examples, the pre-association format 1030 may not be encrypted because the communicating devices may not be aware of encryption methods used by the other device until they are associated. Furthermore, the pre-association format 1030 may be transmitted by a transmitting device for locationing by the receiving device, to convey timing information, or to convey discovery information. In some situations, the CRC of the FCS 340 may be replaced with another PBSSID field (e.g., PBSSID3 (TA3)) to further reduce the false alarm probability (from 24 bits now it becomes 32 bits identifier of that transmitter). In some examples, the pre-association specific field 1033 may have a length indicated by the length/subtype field of the frame control field 910. For example, when the length field indicates a length of 2, then the pre-association specific field 1033 may have a length of 2 bytes and may be used to provide for fine timing synchronization, locationing, etc. In some examples, the PBSSID field 1031 and the PBSSID2 field 1032 may include a hash of an SSID of the for the transmitting device (and the receiving device). For example, the 6-byte MAC address of an associated AP may be hashed down to 3 bytes and included in the PBSSID and PBSSID2 fields 1031 and 1032, respectively.

As shown, the vendor specific format 1040 includes the 8-bit frame control field 910 as described above in relation to FIG. 9. The 12-bit address field 912 referenced in relation to FIG. 9 is a vendor ID 1041 for the transmitting device, which may identify a particular vendor, etc. For the vendor specific format 1040, the 12-bit TSD/TD control field 914 is a second vendor ID field 1024, which may identify a second transmitting device. In some examples, the vendor specific format contains two partial identifiers, one in the address field (e.g., the vendor ID field 1041) and one in the TSD/TD control field 914 (e.g., the second vendor ID field 1024). The vendor ID field 1041 may contain the 12 least significant bits (LSBs) of the organizationally unique identifier (OUI), and the second vendor ID field 1042 contains another 12 bits of the OUI. The vendor ID fields 1041 and 1042 may identify the vendor of the device generating the frame. For the vendor specific format 1040, the payload or frame body portion 330 may include a vendor specific field 1043 of miscellaneous length, and the FCS 340 is the CRC field described herein. Thus, the vendor specific format 1040 may have a minimum length of 6 bytes and a maximum length of 13 bytes, depending on the length of the vendor specific field 1043. In some examples, the vendor specific field 1043 may include a receiver address (e.g., an address of the receiving device) for the vendor specific format 1040 frame.

Figure 11:
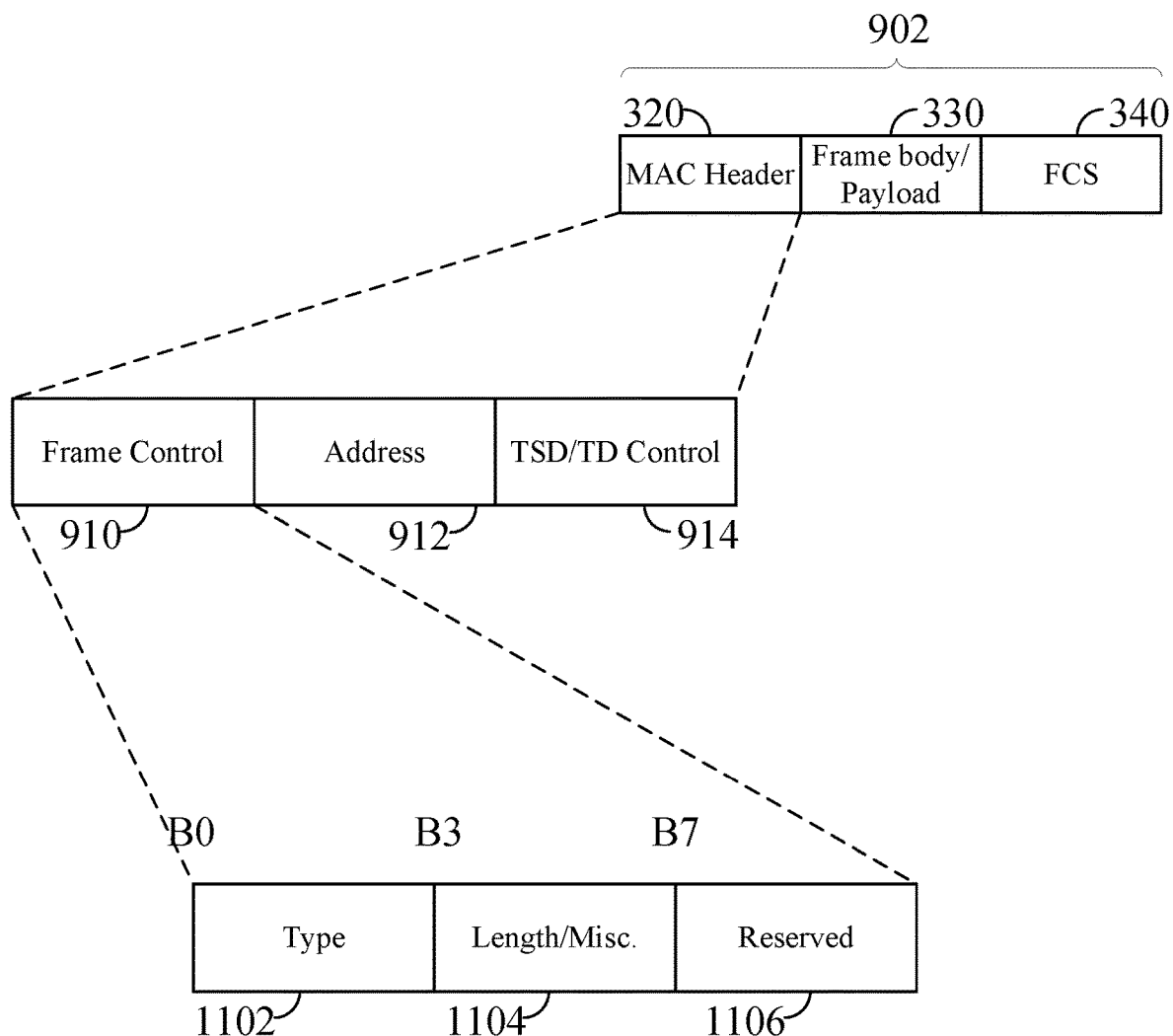
FIG. 11 illustrates an example of further details of an exemplary structure of an MPDU of FIG. 9 for communicating with a WUR device in WUR device communications in accordance with aspects of the present disclosure.

FIG. 11 illustrates an example of further details of an exemplary structure of an MPDU of FIG. 9 for communicating with a WUR device in WUR device communications in accordance with aspects of the present disclosure. In some examples, the exemplary structure of the MPDU 902 of FIG. 9, including details of the frame control field 910 of the MPDU 902 may be used in WUR device communications. As shown, the frame control field 910 may include a type (or subtype) field 1102, a length or miscellaneous field 1104, and a reserved field(s) 1106. In some examples, the type field 1102 may be 3-4 bits in length and the length/miscellaneous field 1104 may be 3-4 bits in length. The reserved field(s) 1106 may be the remainder bits of the 8-bit frame control field. The type field 1102 may indicate a type of the MPDU 902. Exemplary types for the MPDU 902 are provided below in Table 2:

TABLE 2

| WUR frame types | |
|---|---|
| Type | Type description |
| 0 | WUR Beacon |
| 1 | WUR Wake Up |
| 2 | WUR Vendor Specific |
| 3 | WUR Discovery |
| 4-7 (if 3 bits) or 4-15 (if 4 bits) | Reserved |

For example, when the type field 1102 includes a value of "0", the MPDU 902 may be a WUR beacon frame. When the type field 1102 includes a value of "1", the MPDU 902 may be a WUR wake up frame. When the type field 1102 includes a value of "2", the MPDU 902 may be a WUR vendor specific frame. When the type field 1102 includes a value of "3", the MPDU 902 may be a WUR discovery frame. When the type field 1102 includes a value of "4" or greater, the MPDU 902 may be another specific type of frame(s).

The length/miscellaneous field 1104 may include or act as a length field for the MPDU 902 when the length is variable and as a miscellaneous field for the MPDU 902 when the length is constant. In some examples, whether or not the MPDU 902 is variable length or constant length may be indicated by a bit (e.g., a variable length or constant length bit). When the bit is set to "1", the MPDU 902 may be of variable length. When the bit is set to "0", the MPDU 902 may be of constant length. The bit may be indicated in various locations. As an example, this bit can be the most significant bit or the least significant bit of either the Type field or the length/miscellaneous field itself. Alternatively, this bit may be in the B0 or B2 or B3 or any other bit position of the type field 1102. The bits shown in FIG. 11 are exemplary to the type field 1102 and the length/miscellaneous field 1104 being 4-bits in length.

When the length/miscellaneous field 1104 is operating as the length field for a variable-length MPDU 902, the length field 1104 may contain the length of the payload or frame body portion 330. When the length/miscellaneous field 1104 is operating as the miscellaneous field, the miscellaneous field 1104 may contain bits that are expected to be used to indicate or convey various other information, for example, as discussed above.

As described herein, each WUR frame including the MPDU 902 may consist of the following components: a MAC header 320 (which includes the frame control 910, the address field 912, and the type and/or subtype dependent (e.g., TSD/TD) control field 914), a payload or frame body portion 330 (which may be variable length and, when variable length, contains information specific to the frame type), and an FCS 340 (which contains for example an 8-, 16-, or other bit CRC). In some examples, the FCS may contain a different CRC. For example, the FCS 340 may include a CRC-16 FCS, which may include a degree 16 polynomial and corresponding computation(s), or a CRC-8 FCS, which may include a degree 8 polynomial and corresponding computation(s). In some examples, another CRC polynomial or computation may be used or provided.

Figure 12:
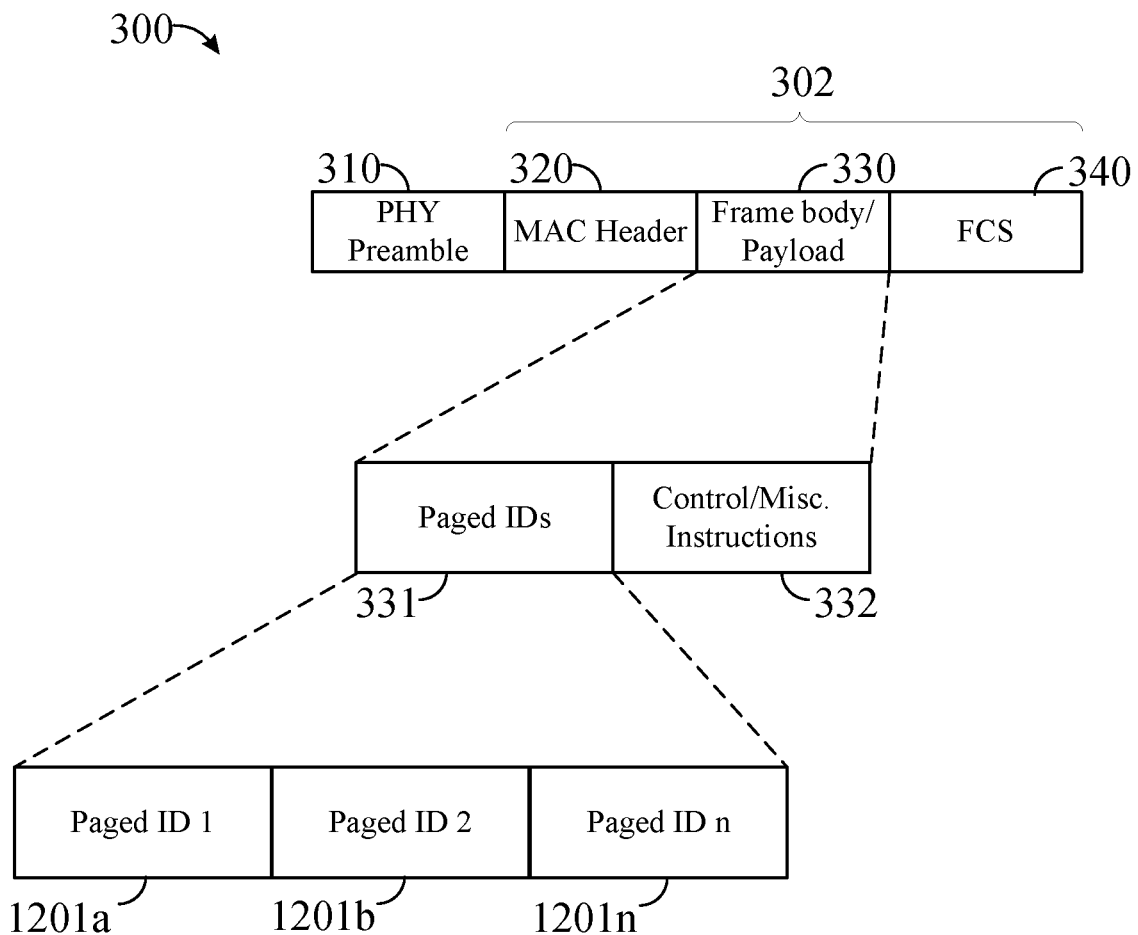
FIG. 12 illustrates an example of further details of an exemplary structure of a PPDU of FIG. 4 for communicating with a WUR device in WUR device communications in accordance with aspects of the present disclosure.

FIG. 12 illustrates an example of further details of an exemplary structure of a PPDU of FIG. 4 for communicating with a WUR device in WUR device communications in accordance with aspects of the present disclosure. In some examples, the WUR frame or PPDU 300, as described above, may include the paged IDs or WIDs in the paged IDs field 331. In some examples, the paged IDs field 331 may include information regarding the one or more STAs to which the PPDU 300 applies or is addressed. For example, when the PPDU 300 is a unicast frame or of constant length, the PPDU 300 need not include information regarding the one or more STAs to which the PPDU 300 applies or is addressed. When the PPDU 300 is a broadcast frame or of variable length, the PPDU 300 may include information regarding the one or more STAs to which the PPDU applies or is addressed. In some examples, the information may include one or more of a bitmap, and STA identifier list, etc. As shown, the paged IDs field 331 may include STA identifiers for three STAs in paged ID 1 field 1201a, paged ID 2 field 1201b, and paged ID 3 field 1201n.

In some examples, when the payload or frame body portion 330 of the PPDU 300 includes an address field (e.g., address field 912) set to zero, the payload or frame body portion 330 may include the multiple paged identifiers (e.g., paged IDs 1201a-1201n) for STAs for which the PPDU 300 is intended and/or directed. For example, in a variable-length, broadcast or multicast WUR wake up frame with a payload or frame body portion 330, each receiving STA may determine that the payload or frame body portion 330 includes one or more paged IDs in the paged ID field 331 (e.g., the paged IDs 1201a-1201n) and may parse the WUR wake up frame to determine whether the PPDU 300 applies to or is directed to the receiving STA based on the identifiers in the paged ID field 331. In some examples, the STA identifiers in the paged IDs field 331 (e.g., paged IDs 1201a-1201n) may be in a preselected order. In such examples, each STA receiving the PPDU 300 may parse the entire payload or frame body portion 330 to determine if the PPDU 300 is directed to or applies to the STA, even though the PPDU 300 is likely intended for only a small subset of the receiving STAs.

In some examples, as described herein, the STA identifiers may be listed in increasing order. In some examples, the STA identifiers maybe listed in decreasing order. In such an example, the receiving STAs may be provided with a simple method of discarding frames not intended for or applying to them with minimal or reduced processing as compared when the STA identifiers in the paged IDs field 331 are not arranged in a deterministic or preselected order. For example, when the paged IDs are listed in increasing order, each receiving STA may parse the paged IDs field 331 and, if the parsed paged ID in the paged ID field 331 is greater than the ID of the STA, the STA may discard or drop the PPDU 300 because each of the remaining IDs in the paged ID field 331 will be greater than the ID of the STA and the PPDU 300 will not apply to or be directed to the STA. Thus, by utilizing deterministic or preselected ordering schemes of the paged IDs 1201a-1201n in the paged ID field 331, receiving STAs may be provided with a mechanism for discarding or dropping PPDUs 300 generated by non-associated APs that are not intended for or directed to those STAs. Accordingly, the STAs that drop the PPDUs 300 may re-synchronize with concurrent WUR frames generated by the AP with which the STAs are associated. This also allows the STAs to refrain from processing frames generated by an AP that are intended for other STAs, thereby reducing power consumption by providing a mechanism for early termination of the receiving and processing of such multicast, variable-length Wake-Up WURs.

In some examples, WUR APs 104 that generate multicast, variable-length WUR frames may order a list of paged IDs 1201a-1201n in the paged ID field 331 in increasing order. In some examples, WUR APs 104 may utilize such increasing order in other multicast or variable-length WURs that include a list of paged IDs 1201a-1201n. Accordingly, receiving STAs may discard or drop the received wake up WUR frame (or other WUR frame) when the STA identifies a paged ID 1201 that is greater than its own ID without finding its ID in the paged IDs field 331 or immediately after locating the last paged ID 1201a-1201n in the paged IDs field 331 and the paged ID 1201a-1201n is less than the ID of the receiving STA.

Figure 13:
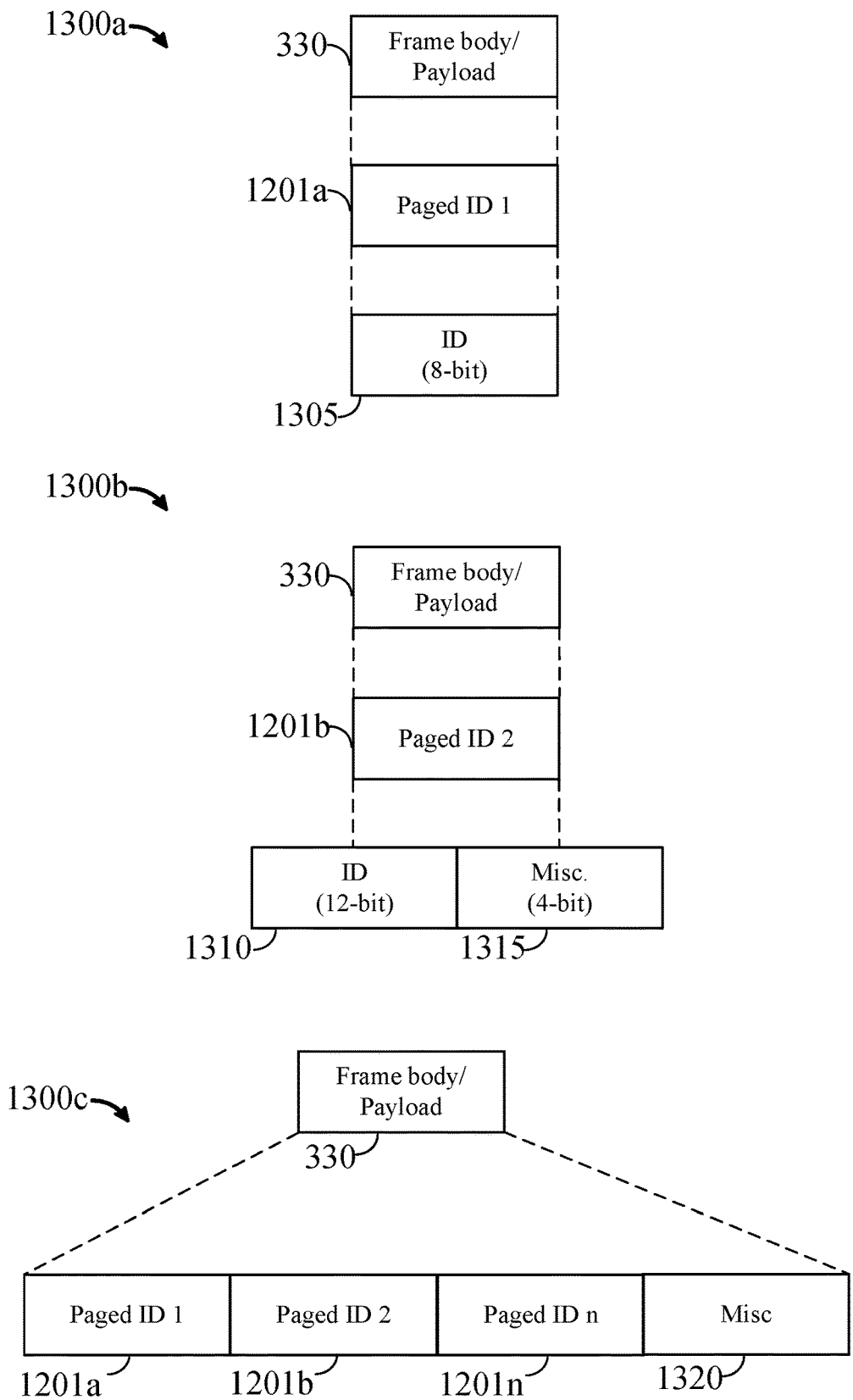
FIG. 13 illustrates an example of further details of an exemplary structure of paged IDs field of a PPDU of FIG. 12 for communicating with a WUR device in WUR device communications in accordance with aspects of the present disclosure.

FIG. 13 illustrates an example of further details of an exemplary structure of paged IDs field of a PPDU of FIG. 12 for communicating with a WUR device in WUR device communications in accordance with aspects of the present disclosure. In some examples, the payload or frame body portion 330 may only include the paged IDs field 331 or the paged IDs 1201 in the frame body 330. In some examples, the payload or frame body portion 330 may include paged IDs field 331 or the paged IDs 1201 in the payload or frame body portion 330 along with control/misc. information 332. Three optional examples of the paged ID structure 1300 of the payload or frame body portion 330 are included as 1300a, 1300b, and 1300c.

In a first option for the paged ID structure 1300a, the payload or frame body portion 330 includes the paged IDs 1201 (e.g., paged ID 1201a) which has a length of 8 bits. A paged ID 1201a of 8-bit length may be sufficient to identify up to 256 unique STAs. In some examples, up to 4096 stations may be indicated by utilizing the address field (having a length of 12 bits) and its MSBs (or another quantity of MSBs) in conjunction with the paged IDs 1201 in the paged IDs field 331. For example, when the address fields include 12 bits, the 4 MSBs of the address field may be used with or in conjunction with the paged IDs 1201 to identify a specific STA. In some examples, the first listed STA for which the WUR frame is directed or to which the WUR frame applies may be identified in an address field of the PPDU 300. All additional STAs to which the WUR frame is directed or to which the WUR frame applies may be identified in the paged IDs field 331. When parsing the received WUR frame, a STA may determine whether or not the ID in the address field of the received WUR frame matches the ID of the STA. When the ID in the address field does match the ID of the STA, the STA continues parsing the received WUR frame through the FCS. When the ID in the address field does not match the ID of the STA, the STA determines whether the 4 MSBs of the ID in the address field match the 4 MSBs of the ID of the STA. If they do match, then the STA continues parsing the WUR frame to determine if the IDs listed in the paged IDs field 331 include the ID of the STA to determine whether the WUR frame is applied to or directed to the STA, as described herein. If the 4 MSBs do not match, then the STA may discard the received WUR frame. One skilled in the art may appreciate that this procedure may be applicable to any combination of address field and paged IDs field 331 lengths, wherein the address field or the address identified in the address field has a length that is greater than or equal to a corresponding length of the paged ID 1201 in the paged IDs field or the paged IDs field itself and wherein the number of MSBs is equal to a difference of the size or length of the address field and the size or length of one of the paged IDs field 331. For example, if the address field is 16 bits in length and the paged IDs field is 10 bits, then 6 MSBs are to be compared (16–10=6 MSBs). In some examples, more than 256 unique STAs may be identified using orthogonal scheduling, as described herein. Such scheduling may allow use of the smaller, 8-bit length paged ID 1201 while avoiding waking of unintended STAs, thereby reducing field size and potential overhead. However, some flexibility and may be lost as compared to being able to uniquely identify each STA.

In a second option for the paged ID structure (e.g., paged ID structure 1300b), the payload or frame body portion 330 includes the paged IDs 1201 (e.g., paged ID 1201b) which has a length of 16-bits. A paged ID 1201b of 16-bit length may include a 12-bit ID field or portion 1310 and a 4-bit miscellaneous field or portion 1315. The 12-bit ID field 1310 may be sufficient to uniquely identify 2048 STAs. Such a structure may allow the WUR to utilize the same or similar signaling as the main radio and provides for additional flexibility as compared to the single octet of option 1300a. Additionally, the larger 16-bit structure may provide for communication of extra control information between the STA and the AP with a potential cost of increased overhead as compared to option 1300a.

In a third option for the paged ID structure (e.g., paged ID structure 1300c), the payload or frame body portion 330 includes the paged IDs 1201a-1201n and a miscellaneous field 1320. In this option, each of the paged IDs 1201a, 1201b, and 1201n may be listed adjacently (e.g., contiguously or back-to-back) in the payload or frame body portion 330, where the payload or frame body portion 330 has a length that is a multiple of 8. Accordingly, the paged IDs 1201a, 1201b, and 1201n may have any length (e.g., 8-bits, 12-bits, etc.) and the payload or frame body portion y 330 will be filled or padded with additional bits to obtain a total length that is a multiple of 8. The padding or additional bits may include vendor specific bits, bits used for additional FCS, control bits, miscellaneous bits, etc. Such an arrangement may maximize a number of identifiers included in the frame body while maintaining the constraints on the payload or frame body portion 330. In some examples, the paged IDs 1201a-1201n may be of mixed length (e.g., mix of 8-bits, 12-bits, 16-bits, etc.) when such mixing of lengths is indicated in the PPDU 300.

In some examples, the payload or frame body portion 330 may have a maximum length of 8 or 16 octets. Accordingly, with option 1300a, up to 8 WUR STAs (8-octets) or 16 WUR STAs (16-octets) may be paged with a single wake up WUR frame. With option 1300b, up to 4 WUR STAs (8-octets) or 8 WUR STAs (16-octets) may be paged with a single wake up WUR frame.

In some examples, the payload or frame body portion 330 may include one or more paged IDs, where each paged ID contains a single 8-bit identifier (e.g., option 1300a), where the 8-bit identifier is equal to the 8 LSBs of the recipient STA identifier. In some examples, the payload or frame body portion 330 may include one or more paged IDs (e.g., option 1300b), where each paged ID contains a 12-bit identifier 1310 and a 4-bit miscellaneous field 1315, where the 12-bit identifier 1310 is equal to the recipient STA identifier.

Figure 14:
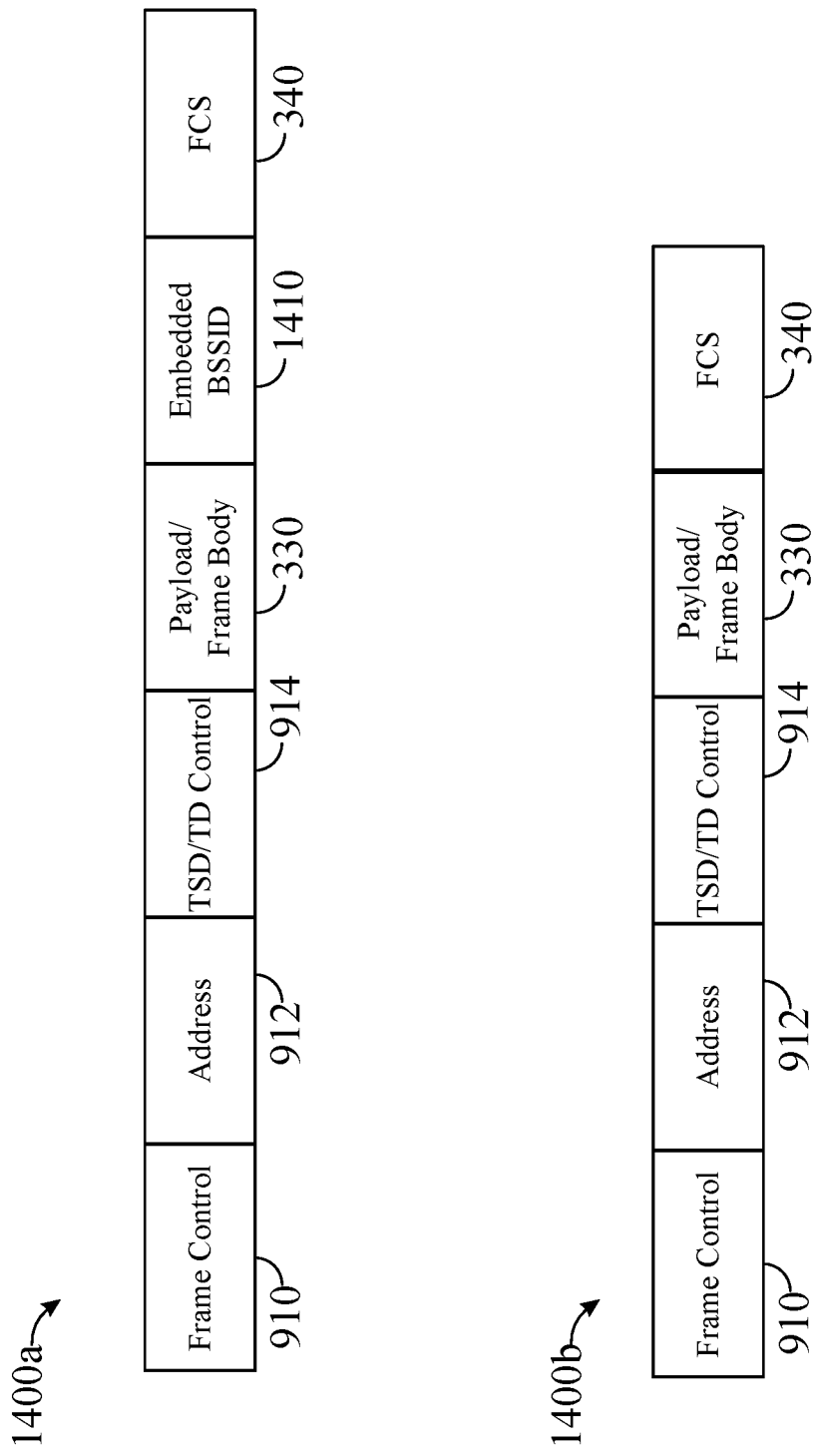
FIG. 14 illustrates an example of details of an exemplary WUR frame indicating an embedded basic service set identifier (BSSID) field and of an exemplary WUR frame not indicating the embedded BSSID field that supports addressing for WUR frames in WUR device communications in accordance with aspects of the present disclosure.

FIG. 14 illustrates an example of details of an exemplary WUR frame indicating an embedded basic service set identifier (BSSID) field and of an exemplary WUR frame not indicating the embedded BSSID field that supports addressing for WUR frames in WUR device communications in accordance with aspects of the present disclosure. In some examples, the WUR frame 1400a includes the frame control field 910, the address field 912, the TSD/TD control field 914, the payload or frame body portion 330, an embedded BSSID field 1410, and the FCS field 340. The WUR frame 1400b includes the frame control field 910, the address field 912, the TSD/TD control field 914, the payload or frame body portion 330, and the FCS field 340 without the embedded BSSID field 1410 explicitly included in the WUR frame 1400b.

In some examples, the FCS field 340 may include a 16-bit CRC and the FCS may be calculated over the frame control field 910, the address field 912, the TSD/TD control field 914, the payload or frame body portion 330, and the embedded BSSID field 1410 shown in WUR frame 1400a. In some examples, the frame control field 910, the address field 912, the TSD/TD control field 914, the payload or frame body portion 330, and the embedded BSSID field 1410 may be referred to as calculation fields. In some examples, as discussed herein, the payload or frame body portion 330 may be optional, for example, may only be included in the WUR frame 1400a when the WUR frame 1400a is variable length. Otherwise, the payload or frame body portion 330 may not be included in the WUR frame 1400a. Similarly, the embedded BSSID field 1410 may only be included in the WUR frame 1400a for WUR frames that are not WUR discovery frames (e.g., may only be present in post-association WUR frames). For WUR discovery frames, the embedded BSSID field 1410 may not be included in the WUR frame 1400a. In some examples, the embedded BSSID field 1410 may be the last field, sequentially, in the calculation fields.

In some examples, when the embedded BSSID field 1410 is not included in the WUR frame 1400b, the embedded BSSID may be obtained from a recent WUR Mode element or a recent WUR Operation element transmitted by the AP 104 to the STA 106. In some examples the embedded BSSID field 1410 may be obtained from a hash of a BSSID field contained in the WUR Mode element or the WUR Operation element. The AP 104 may include the WUR Operation element in either individually addressed management frames sent to the STA 106 (if the AP 104 wants these frames to be decodable only by the STA 106, for example, by using an embedded BSSID or BSSID field only known by the STA 106 and providing this information to the STA 106 in an encrypted management frame), or in broadcast management frames (e.g., Beacon, broadcast Probe Response, etc.) so that all STAs 106 that are associated to it, or that intend to associate with the AP 104 are aware of the embedded BSSID or the BSSID from which they can derive the embedded BSSID. The embedded BSSID may comprise, for example, 16 bits randomly selected by the AP 104 from the BSSID that identifies the BSS with which the receive STA 106 is associated or from the BSSID that identifies a non-transmitting BSS when the BSS with which the STA 106 is associated belongs to a multiple BSSID set and the BSSID is not the transmitting BSSID. In some examples, the AP 104 may select any value of 16-bits for the BSSID provided that the selected value is different from all other BSSs in the neighborhood. The AP 104 may request that the STAs 106 provide a reporting or listing of BSSIDs they see in their respective neighborhoods. Alternatively, the STAs 106 may report the observed BSSIDs without prompting by the AP 104. In some examples, the reporting or listing of BSSIDs may utilize a mechanism similar to BSS color collision reports.

In some examples, when the embedded BSSID field 1410 is not included in the WUR frame 1400b, the embedded BSSID may be obtained from the lowest significant bits (LSBs) of the BSSID. For example, the embedded BSSID may be the 16 LSBs (e.g., BSSID[32:47]) of the BSSID that identifies the BSS with which the STA 106 is associated. Alternatively, these 16 LSBs BSSID[32:47] are from the BSSID that identifies the transmitting BSS when the BSS with which the STA 106 is associated belongs to a multiple BSSID set.

In some examples, when the embedded BSSID field 1410 is not included in the WUR frame 1400b, the embedded BSSID may be a 16-bit field obtained by default from XORing the BSSID. For example, the embedded BSSID may be the 16 bits equal to a result of BSSID[0:15] XOR BSSID[16:31] XOR BSSID[32:47] of the BSSID that identifies the BSS with which the STA 106 is associated. Alternatively, the embedded BSSID is from the BSSID, XORed as described above, that identifies the transmitting BSS when the BSS with which the STA 106 is associated belongs to a multiple BSSID set.

In some examples, when the embedded BSSID field 1410 is not included in the WUR frame 1400b, the embedded BSSID may be obtained from a 48-bit BSSID. For example, the 48-bit BSSID may identify the BSS with which the STA 106 is associated. Alternatively, the 48-bit BSSID IS from the BSSID that identifies the transmitting BSS when the BSS with which the STA 106 is associated belongs to a multiple BSSID set.

In some examples, the calculation fields are processed according to the order in which they are transmitted. In some examples, the embedded BSSID may not be present as an independent field in the transmitted WUR frame. For example, the embedded BSSID may be embedded in one or more other fields in the WUR frame that is actually transmitted. Thus, though the WUR frame 1400a shows the embedded BSSID as an explicit field 1410, the embedded BSSID may actually be included in the calculation frames as part of, or embedded in, one or more of the fields that make up the calculation fields (e.g., the frame control field 910, the address field 912, the TSD/TD control field 914, the payload or frame body portion 330). In some examples, the FCS 340 may comprise the is complement of the remainder generated by the modulo 2 division of the calculation fields by the corresponding 8, 24, or 32-bit polynomial.

In some examples, the FCS 340 may comprise a is compliment of a remainder generated by a modulo 2 division of the calculation fields by the polynomial $x^{16}+x^8+x^5+1$, where a shift-register state is preset to all 1 s.

Figure 15:
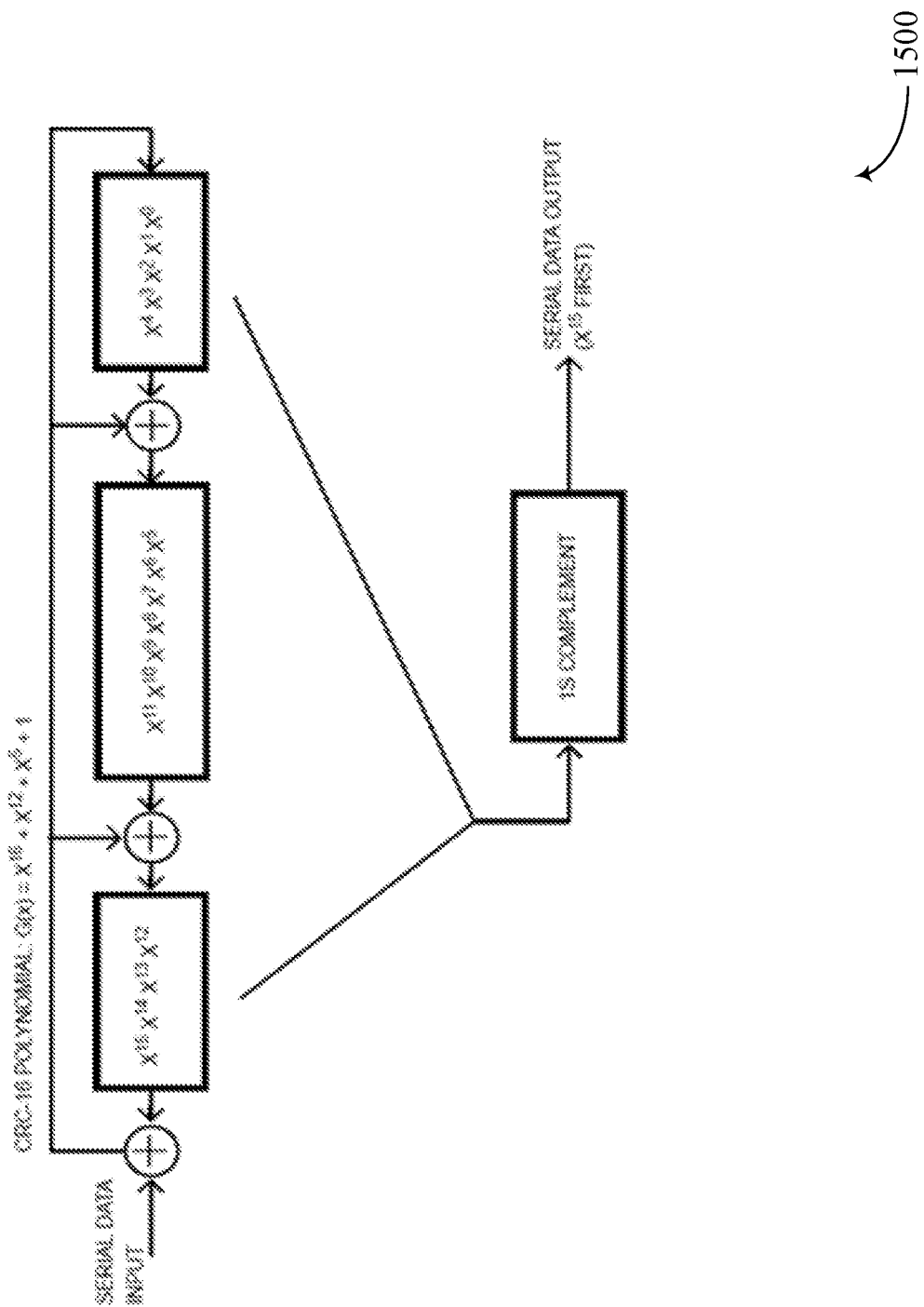
FIG. 15 illustrates an example of details of an exemplary processing flow for calculating a frame check sequence (FCS) that supports addressing for WUR frames in WUR device communications in accordance with aspects of the present disclosure.

FIG. 15 illustrates an example of details of an exemplary processing flow for calculating an FCS that supports addressing for WUR frames in WUR device communications in accordance with aspects of the present disclosure. As shown, a CRC-16 implementation includes a serial data input. In some examples, the serial data input may consist of the calculation fields (($B_L$, $B_{L-1}$ . . . , $B_1$, $B_0$), with $B_L$ being the most significant bit of the calculation fields. In some examples, the CRC-16 implementation may be replaced with one of a CRC-8, CRC-24, CRC-32, and CRC-64 implementation.

In conveying addressing information to the WUR STA, the AP 104 may utilize mapping from the PCR, which may result in reduced memory consumption and processing as the information for the PCR is already known to the WUR STA. Additionally, the AP 104 may maintain one or more of the following identifiers in certain examples: (1) the BSSID of the BSS, which may have a length of 6 Bytes in certain examples; (2) N−1 other BSSIDs that include non-transmitted BSSIDs, where N equals a total number of BSSIDs including the BSSID of the AP 104 and the non-transmitted BSSIDs in a neighborhood of the AP 104; and (3) AIDs for each of the WUR STAB that is associated with (or intends to associate with) the AP 104, each AID having a length of 12 bits in certain examples. Additionally, the AP 104 may maintain a TIM bitmap that identifies one or more of: (1) an existence of broadcast buffer unit (BU) delivery for WUR STAs (bit 0); (2) an existence of broadcast BU delivery for at least one non-transmitted BSSID (bits 1 to n−1); and (3) an existence of individual BUs for each WUR STA (bit AID), in certain examples.

All WUR STAs may maintain each of these identifiers when the PCR of the corresponding WUR STA is activate (e.g., not in a power save mode). In some examples, power saving mechanisms in the PCR may heavily rely on these indications to deliver BUs to the power saving WUR STAs. Furthermore, the WUR STAs, while maintaining as few identifiers as possible, may maintain: (1) the Transmit ID (of length 12 bits), which has a conceptual equivalency with bit 0 of a traffic indication mapping (TIM) bitmap; (2) the Wake Up ID (of length 12 bits), which has a conceptual equivalency with bit(s) equal to the AID of the WUR STA of the TIM bitmap; and (3) the Group ID (of length 12 bits), which has a conceptual equivalency with bits (1 to n−1) of the TIM bitmap. In some examples, the WUR STAs may maintain identifiers for multiple Group IDs.

Figure 16:
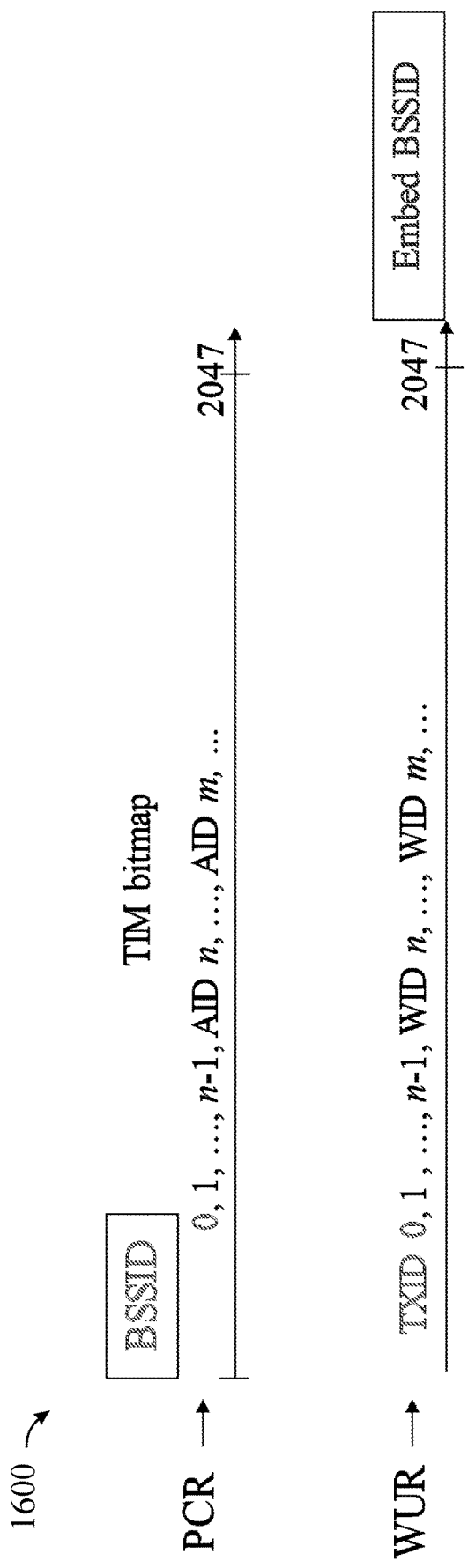
FIG. 16 illustrates an example of an exemplary mapping of a traffic indication map (TIM) between a primary connecting radio (PCR) and the WUR that supports addressing for WUR frames in WUR device communications in accordance with aspects of the present disclosure.

FIG. 16 illustrates an example of an exemplary mapping of a TIM between a primary connecting radio (PCR) and the WUR that supports addressing for WUR frames in WUR device communications in accordance with aspects of the present disclosure. In some examples, the BSSID of the PCR may be mapped to the WUR at bit 0 as the transmitter identifier (Transmit ID 0). The AID (AID n-AID m) of the PCR may be mapped to the WUR as the Wake-Up ID of the WUR STA (WID n-WID m). The BSSID may be embedded after the 2048 bits of the PCR to WUR mapping shown in the map 1600.

Figure 17:
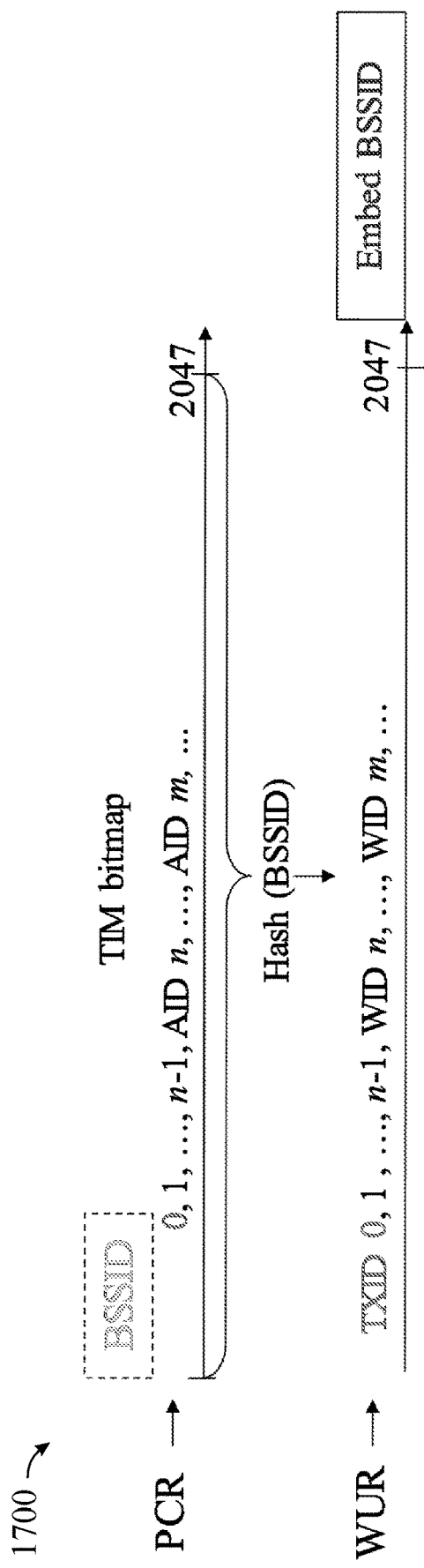
FIG. 17 illustrates an example of an exemplary mapping of a TIM between a PCR and the WUR that supports addressing for WUR frames in WUR device communications in accordance with aspects of the present disclosure.

FIG. 17 illustrates an example of an exemplary mapping of a TIM between a PCR and the WUR that supports addressing for WUR frames in WUR device communications in accordance with aspects of the present disclosure. In some examples, the TIM 1700 may include the BSSID of the PCR mapped to the WUR at bit 0, the AID of the PCR mapped to the WUR as the WID of the WUR STA, and the embedded BSSID after the 2048 of the PCR to WUR mapping shown in the map 1700. However, the map 1700 shows that the bits 2048 of the PCR to WUR mapping may be hashed using the BSSID, which may result in the assignments between the PCR and the WUR to be randomized. In some examples, the hash function may comprise an XOR of different portions of the BSSID with the PCR mapping.

Such hashing may provide for use of the PCR to WUR mapping similar to that of map 1600 without (or with reduced) additional memory requirements and communication changes regarding additional identifier elements as compared to if hashing is not used. Furthermore, such hashing as described herein and depicted in map 1700 may provide for a reduction in memory requirements for a WUR STA to store its Transmit ID and Wake Up ID (e.g., using at most 3 octets and up to eight additional bits of multiple BSSIDs are used). Such hashing may also provide for a reduction in memory requirements for the WUR STA to store values for Group IDs (e.g., using 12 bits for each Group ID, unless the Group IDs are contiguously spaced, which may provide for further reduction in memory requirements, as described herein). Furthermore, randomly distributing the assignments in the PCR to WUR mapping may provide for early packet filtering and reduced collisions, among other benefits.

When performing the hashing functions and XORing the PCR TIM with the BSSID to generate the WUR TIM, the AP 104 may generate the identifiers described herein according to the following: The Transmit ID may be generated as being equal to: (1) 12 bits of the BSSID (e.g., BSSID[36:47]) and (2) 12 bits of the BSSID as XORed with other 12-bit blocks of the BSSID (e.g., BSSID[0:11] XOR BSSID[12:23] XOR BSSID[24:35] XOR BSSID [36:47]). In some examples, the Wake-Up ID may be generated based on the AID of the WUR STA and the Transmit ID (e.g., (AID+Transmit ID) mod 212). In some examples, the Group ID may be generated based on the Transmit ID (e.g., Transmit ID n=(n+Transmit ID) mod 212, where n is a maximum number of BSSs identified the TIM bitmap (including both the non-transmitted BSSID and transmitted BSSID) and Group ID=(m+Transmit ID) mod 212, where m is the highest AID that the AP 104 assigned to a WUR STA). In some examples, when the hashing function that generates the Transmit, Wake Up, and Group IDs as described herein is applied to the embedded BSSID, the embedded BSSID may be equal to: (1) 16 bits of the BSSID (e.g., BSSID[20:35] and (2) 16 bits of the BSSID as XORed with other 16-bit blocks of the BSSID (e.g., BSSID[0:15] XOR BSSID[16:31] XOR BSSID[32:47]). In the described examples, the BSSID may correspond to the AID of the transmitting AP 104 unless the AP advertises an alternative WUR BSSID in a transmitted WUR element (e.g., the WUR Mode element or the WUR Operation element).

Accordingly, when the WUR STA is operating in WUR mode, the WUR STA may store the Transmit ID (having a 12-bit length), the Wake-Up ID (having a length of up to 12 bits), and the Embedded BSSID (having a 16-bit length). Alternatively, or additionally, the WUR STA may store these IDs plus multiple BSSIDs using an additional 3 bits to identify a non-transmitted BSSID. In some examples, the WUR STA may store Group IDs. When the Group IDs are included, the AP may allocate the Group IDs in a contiguous ID space that can be identified by a Start ID+a Group Bitmap (thus, having a total size of 12 bits plus a size of the bitmap).

In such examples, the WUR STA may declare the bitmap size that the WUR STA supports.

In some examples, the AP 104 may determine that its BSSID (and the corresponding embedded BSSID) each match with corresponding BSSID and embedded BSSID of another AP in the same neighborhood (e.g., an OBSS AP). In such an example, the AP 104 may be configured to change its hashing function or hash value (e.g., the BSSID that is used in the XORing described herein). In some examples, the AP 104 may advertise an alternative WUR BSSID, for example, in the WUR Mode element or the WUR Operation element, as described herein. In some examples, such advertising of the alternative WUR BSSID may utilize 6 bytes of communication between the PCR and the WUR. Such advertising may indicate that the WUR BSSID is to be used in the XOR hashing function between the PCR and the WUR mapping instead of the BSSID that the AP 104 employs for hashing. In some examples, the AP 104 may change its hashing function altogether (e.g., change the XOR function to Walsh-Hadamard or any other hashing function, or a random selection of 12-bits from the BSSID). Such a change in the hashing function may result in an increase of computation logics as compared to the XORing described herein but may not require a change in the BSSID as used in the hashing function.

In some examples, the AP 104 and WUR STAs may use a CRC computation as the hashing function for obtaining one or more of the Transmit ID and/or embedded BSSID. In such examples, the AP 104 and the WUR STAs may use at least a portion of a 32-bit CRC calculated over the BSSID (where the calculation may be performed based on Equation 1 or as described herein, where the BSSID is the calculation fields) to generate the Transmit ID and another portion to generate the embedded BSSID. As an example, the 16 LSBs of the calculated 32-bit CRC can be used as the embedded BSSID and the 12 MSBs can be used as the Transmit ID. In some examples, since the CRC contains 32 bits and 12 bits (e.g., the 12 MSBs or the 12 LSBs) of the 32 bits may be used for the Transmit ID, the embedded BSSID can be constructed to be 20 bits in size and to contain the remaining bits of the CRC (e.g., the 20 LSBs or the 20 MSBs). In general, the bits used for the Transmit ID and for the embedded BSSID may be obtained from any bit location provided that the bits used for the Transmit ID are not used for the embedded BSSID and vice-versa. For example, in some examples, bits used for the Transmit ID may not overlap those bits used for the embedded BSSID.

In some examples, the AP 104 and/or the WUR STA may request that communications between the AP 104 and the WUR STA be private. Accordingly, the AP 104 and the WUR STA may authenticate communications using a key known only to the AP 104 and the WUR STA (and, in certain examples, other STAs associated with the AP 104). Once the communications between the AP 104 and the WUR STA are authenticated, the WUR STA may request private communications. In response, the AP 104 may transmit the BSSID (or the AID of the AP 104 or a hash function) to the WUR STA in an encrypted frame such that only STAs 106 that are associated with the AP 104 are able to identify the BSSID (or AID or hash function) used in the hashing between the AP 104 and the WUR STA. Accordingly, only WUR STAs associated with the AP 104 are able to figure out communications between the AP 104 and the WUR STA that requests private communications, which may result in hiding of history from other STAs.

Figure 18:
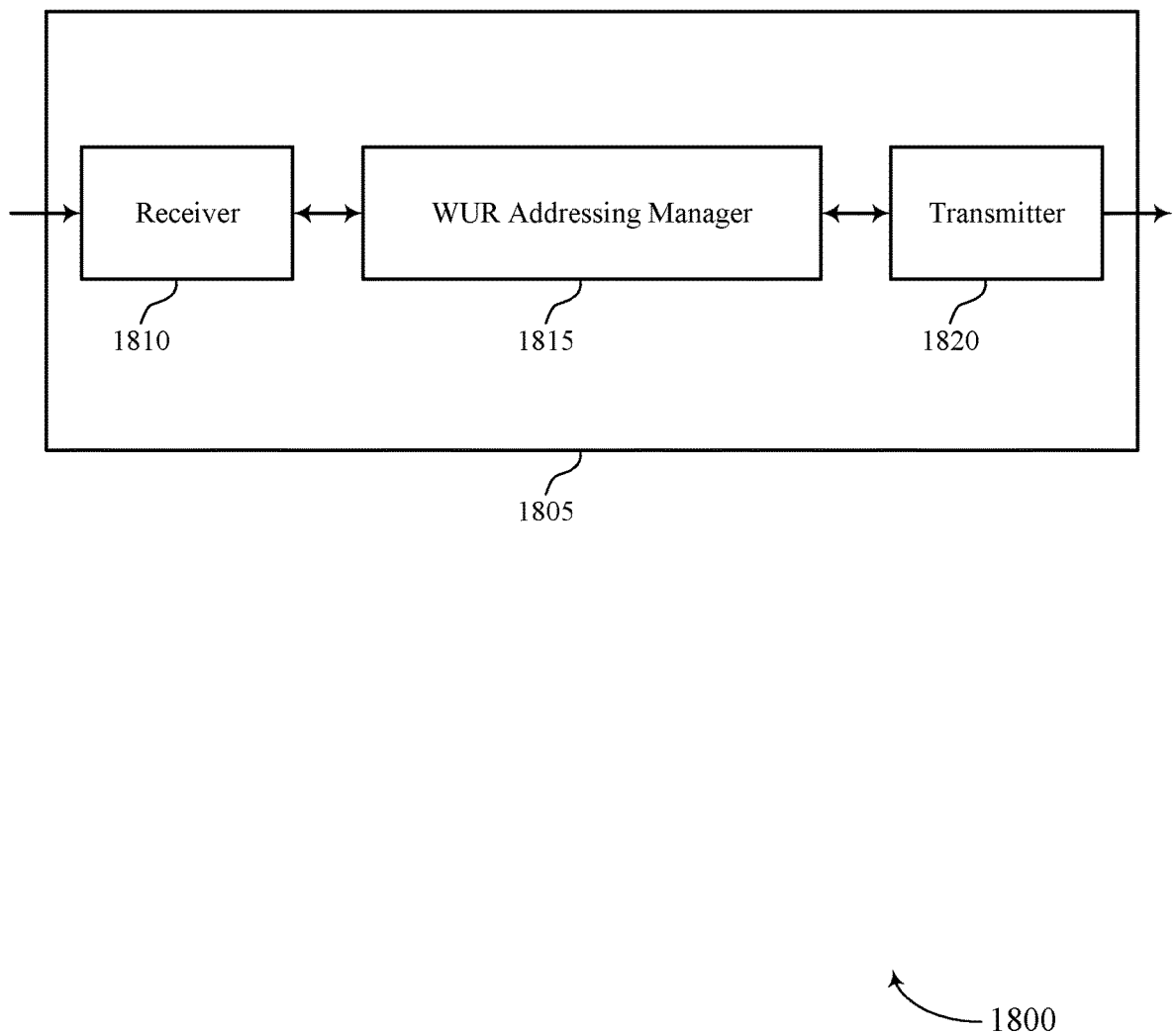
FIGS. 18 and 19 show block diagrams of devices that support addressing for WUR frames in WUR device communications in accordance with aspects of the present disclosure.

FIG. 18 shows a block diagram 1800 of a device 1805 that supports addressing for WUR frames in WUR device communications in accordance with aspects of the present disclosure. The device 1805 may be an example of aspects of an AP (or other transmitting wireless device) as described herein. The device 1805 may include a receiver 1810, a WUR addressing manager 1815, and a transmitter 1820. The device 1805 may also include a processor. Each of these components may be in communication with one another (e.g., via one or more buses).

The receiver 1810 may receive information such as packets, user data, or control information associated with various information channels (e.g., control channels, data channels, and information related to addressing for WUR frames in WUR device communications, etc.). Information may be passed on to other components of the device. The receiver 1810 may be an example of aspects of the transceiver 2120 described with reference to FIG. 21. The receiver 1810 may utilize a single antenna or a set of antennas.

The WUR addressing manager 1815 may identify one or more receiving wireless devices for which to send a WUR frame, obtain a BSSID for the AP that is associated with (or intends to be associated with) the one or more receiving wireless devices, the BSSID being known by the one or more receiving wireless devices, perform a hashing function to the BSSID to obtain a hashed BSSID, use a first portion of the hashed BSSID as a first identifier, generate the WUR frame for transmission with an address identifier field that includes either the first identifier or a second identifier, wherein the second identifier is based at least in part on the first identifier, and transmit the WUR frame to the one or more receiving wireless devices. The WUR addressing manager 1815 may be an example of aspects of the WUR addressing manager 2110 described herein.

The WUR addressing manager 1815, or its sub-components, may be implemented in hardware, code (e.g., software or firmware) executed by a processor, or any combination thereof. If implemented in code executed by a processor, the functions of the WUR addressing manager 1815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The WUR addressing manager 1815, or its sub-components, may be physically located at various positions, including being distributed such that portions of functions are implemented at different physical locations by one or more physical components. In some examples, the WUR addressing manager 1815, or its sub-components, may be a separate and distinct component in accordance with various aspects of the present disclosure. In some examples, the WUR addressing manager 1815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1820 may transmit signals generated by other components of the device. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
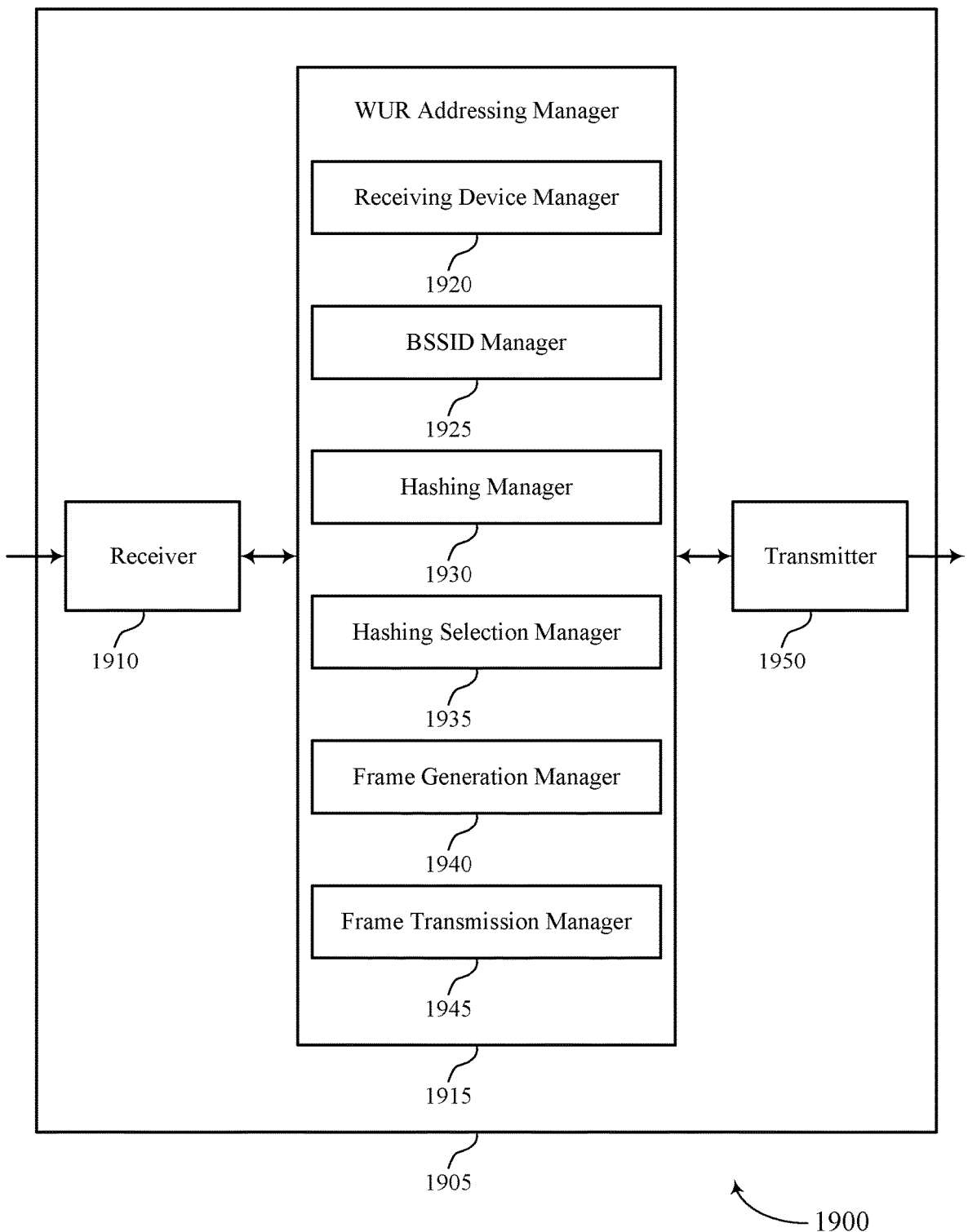

FIG. 19 shows a block diagram 1900 of a device 1905 that supports addressing for WUR frames in WUR device communications in accordance with aspects of the present disclosure. The device 1905 may be an example of aspects of a device 1805 or an AP 115 (or other transmitting wireless device) as described herein. The device 1905 may include a receiver 1910, a WUR addressing manager 1915, and a transmitter 1950. The device 1905 may also include a processor. Each of these components may be in communication with one another (e.g., via one or more buses).

The receiver 1910 may receive information such as packets, user data, or control information associated with various information channels (e.g., control channels, data channels, and information related to addressing for WUR frames in WUR device communications, etc.). Information may be passed on to other components of the device. The receiver 1910 may be an example of aspects of the transceiver 2120 described with reference to FIG. 21. The receiver 1910 may utilize a single antenna or a set of antennas.

The WUR addressing manager 1915 may be an example of aspects of the WUR addressing manager 1815 as described herein. The WUR addressing manager 1915 may include a receiving device manager 1920, a BSSID manager 1925, a hashing manager 1930, a hashing selection manager 1935, a frame generation manager 1940, and a frame transmission manager 1945. The WUR addressing manager 1915 may be an example of aspects of the WUR addressing manager 2110 described herein.

The receiving device manager 1920 may identify one or more receiving wireless devices for which to send a WUR frame. The BSSID manager 1925 may obtain a BSSID for the AP that is associated with (or intends to be associated with) the one or more receiving wireless devices, the BSSID being known by the one or more receiving wireless devices. The hashing manager 1930 may perform a hashing function to the BSSID to obtain a hashed BSSID. The hashing selection manager 1935 may use a first portion of the hashed BSSID as a first identifier (e.g., a transmitter ID of device 1905).

The frame generation manager 1940 may generate the WUR frame for transmission with one of the first identifier or a second identifier (e.g., a wake up ID of a receiving wireless device, a group ID associated with multiple receiving wireless devices, or a non-transmitted BSSID associated with the neighborhood) that is based on the first identifier in an address identifier field of the WUR frame. The frame transmission manager 1945 may transmit the WUR frame to the one or more receiving wireless devices.

The transmitter 1950 may transmit signals generated by other components of the device. In some examples, the transmitter 1950 may be collocated with a receiver 1910 in a transceiver module. For example, the transmitter 1950 may be an example of aspects of the transceiver 2120 described with reference to FIG. 21. The transmitter 1950 may utilize a single antenna or a set of antennas.

Figure 20:
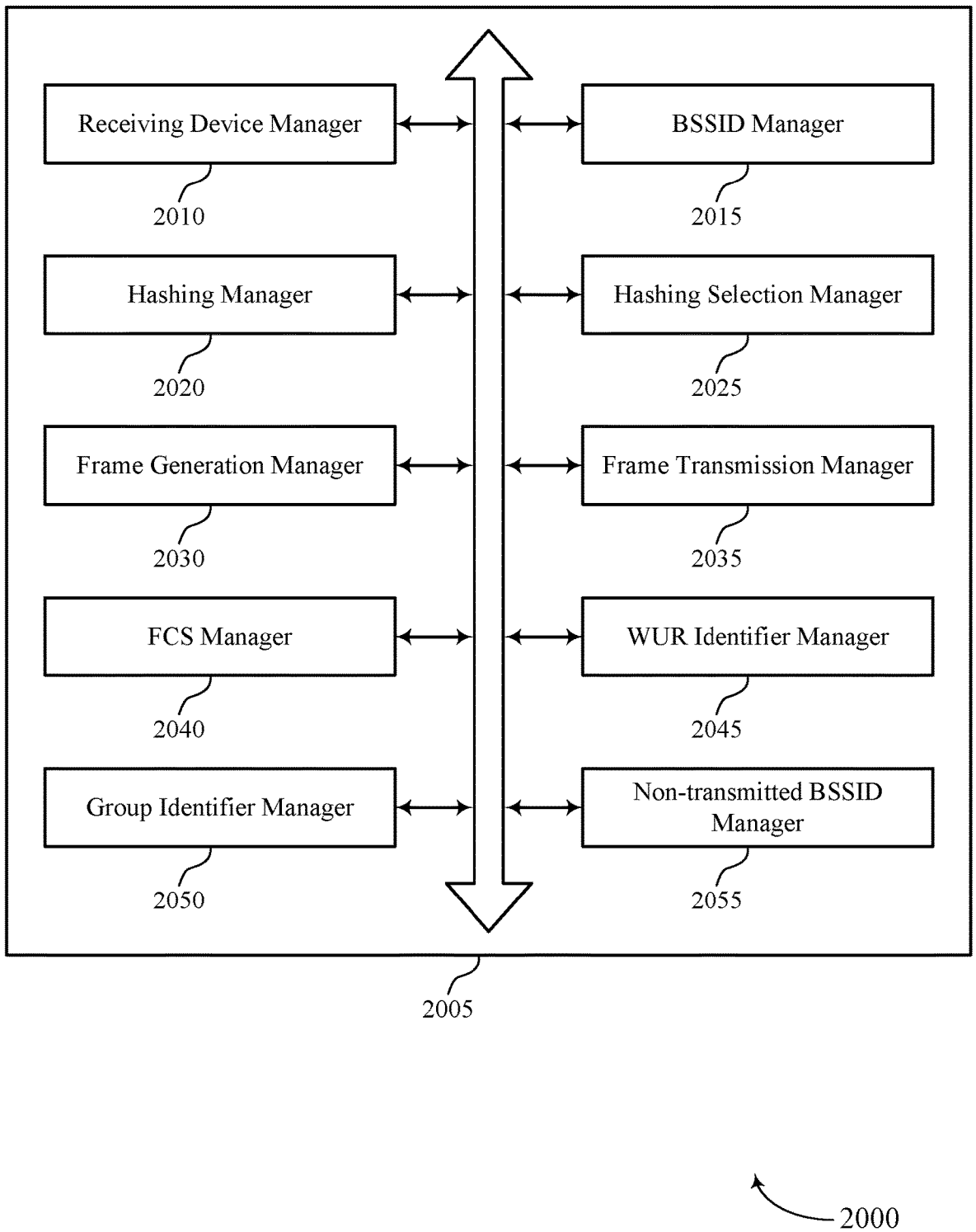
FIG. 20 shows a block diagram of a WUR addressing manager that supports addressing for WUR frames in WUR device communications in accordance with aspects of the present disclosure.

FIG. 20 shows a block diagram 2000 of a WUR addressing manager 2005 that supports addressing for WUR frames in WUR device communications in accordance with aspects of the present disclosure. The WUR addressing manager 2005 may be an example of aspects of a WUR addressing manager 1815, a WUR addressing manager 1915, or a WUR addressing manager 2110 described herein. The WUR addressing manager 2005 may include a receiving device manager 2010, a BSSID manager 2015, a hashing manager 2020, a hashing selection manager 2025, a frame generation manager 2030, a frame transmission manager 2035, a FCS manager 2040, a WUR identifier manager 2045, a group identifier manager 2050, and a non-transmitted BSSID manager 2055. Each of these modules may communicate, directly or indirectly, with one another (e.g., via one or more buses).

The receiving device manager 2010 may identify one or more receiving wireless devices for which to send a WUR frame. The BSSID manager 2015 may obtain a BSSID for the AP that is associated with (or intends to be associated with) the one or more receiving wireless devices, the BSSID being known by the one or more receiving wireless devices. The hashing manager 2020 may perform a hashing function to the BSSID to obtain a hashed BSSID. In some examples, the hashing manager 2020 may calculate a CRC over the BSSID to obtain the hashed BSSID. In some cases, the BSSID is a calculation field used for calculating the CRC. In some cases, a polynomial associated with the CRC over the BSSID is a same polynomial as a polynomial used for a CRC computation for a transmission over a first radio transceiver different from a second radio transceiver used for transmitting the WUR frame The hashing selection manager 2025 may use a first portion of the hashed BSSID as a first identifier. In some examples, the hashing selection manager 2025 may use a second portion of the hashed BSSID as a third identifier.

The frame generation manager 2030 may generate the WUR frame for transmission with an address identifier field that includes either the first identifier or a second identifier, wherein the second identifier is based at least in part on the first identifier. In some examples, the frame generation manager 2030 may generate a WUR frame for transmission with the CRC value in an FCS field of the WUR frame. In some examples, the frame generation manager 2030 may generate a WUR frame for transmission with the MIC value in an FCS field of the WUR frame. In some examples, the frame generation manager 2030 may generate the WUR frame for transmission without the third identifier explicitly included in a field of the WUR frame. In some examples, the frame generation manager 2030 may generate a broadcast WUR frame for transmission with the first identifier in the address identifier field. In some examples, the frame generation manager 2030 may generate a variable-length WUR frame for transmission with the second identifier in the address identifier field and a set of identifiers, each identifier of the set of identifiers associated a corresponding receiving wireless device of the one or more receiving wireless devices. In some cases, each identifier of the set of identifiers is listed in an order (e.g., a predefined order known by the receiving wireless devices) within the variable-length WUR frame. In some cases, each identifier of the set of identifiers may be listed in an increasing order. In some cases, each identifier of the set of identifiers may be listed in an decreasing order. The frame transmission manager 2035 may transmit the WUR frame to the one or more receiving wireless devices.

The FCS manager 2040 may calculate a CRC over a set of calculation fields that includes a field (e.g., an embedded BSSID field) with the third identifier to obtain to obtain a CRC value. In some cases, the set of calculation fields may also include the first or second identifier in the address identifier field (e.g., the first identifier when the WUR frame is a WUR Beacon frame or the second identifier when the WUR frame is a WUR Wake-Up frame). In some cases, the WUR frame may be generated for transmission with the CRC value in an FCS field of the WUR frame. In some cases, the WUR frame may be generated for transmission without the third identifier being explicitly included in a field of the WUR frame. In other words, the third identifier may be used in a field during the process of performing or calculating a CRC, but the third identifier is not expressly included in a field that is subsequently transmitted with the CRC value in the FCS field of the WUR frame. In some cases, the second portion of the hashed BSSID comprises a most significant bit portion of the hashed BSSID and a length of the second portion is 16 bits. In some examples, the FCS manager 2040 may perform or calculate a MIC over a set of calculation fields that includes a field (e.g., an embedded BSSID field) with the third identifier to obtain to obtain a MIC value. For example, the FCS type may be a MIC based at least in part on the WUR frame being a protected frame type. In some case, the techniques for calculating the MIC may be similar to the techniques for calculating the CRC.

The WUR identifier manager 2045 may calculate the second identifier using the first identifier and an association identifier of a receiving wireless device of the one or more receiving wireless devices. In some examples, the WUR identifier manager 2045 may perform a modulo operation on a summation of the first identifier and the association identifier of the receiving wireless device.

The group identifier manager 2050 may calculate the second identifier using the first identifier and a value that is greater than or equal to a number of basic services sets available to the one or more receiving wireless devices. In some examples, the group identifier manager 2050 may perform a modulo operation on a summation of the first identifier and the value (e.g., the value that is greater than or equal to the number of basic service sets available to the one or more receiving wireless devices). In some cases, the number of basic service sets is a maximum number of basic service sets identified in a TIM. In some examples, the group identifier manager 2050 may calculate the second identifier using the first identifier and a value greater than a highest association identifier of a receiving wireless device of the one or more receiving wireless devices. In some examples, the group identifier manager 2050 may perform a modulo operation on a summation of the first identifier and the value (e.g., the value that is greater than the highest association identifier of the receiving wireless device). The non-transmitted BSSID manager 2055 may calculate the second identifier using the first identifier and an indication of a non-transmitted BSSID.

Figure 21:
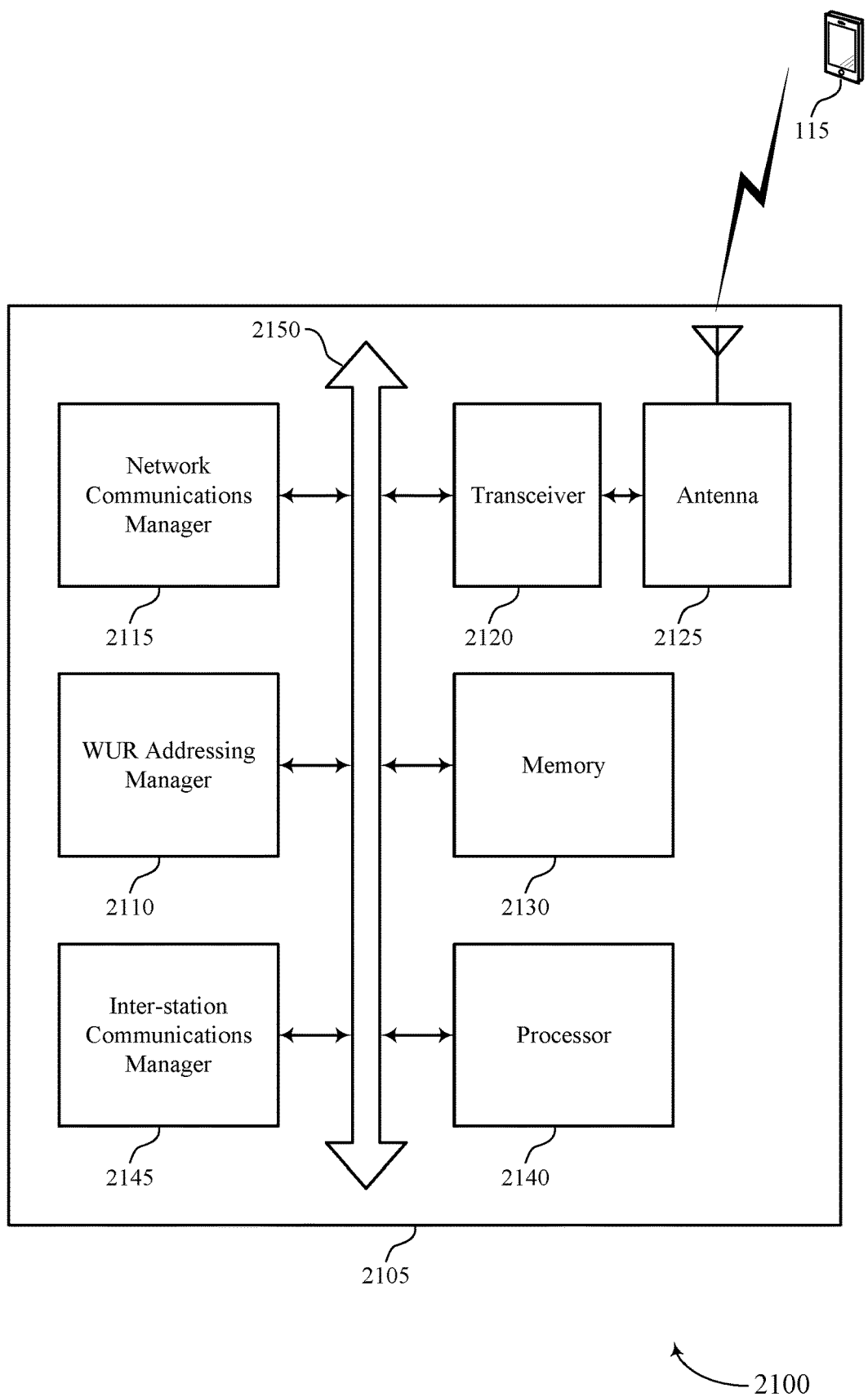
FIG. 21 shows a diagram of a system including a device that supports addressing for WUR frames in WUR device communications in accordance with aspects of the present disclosure.

FIG. 21 shows a diagram of a system 2100 including a device 2105 that supports addressing for WUR frames in WUR device communications in accordance with aspects of the present disclosure. The device 2105 may be an example of or include the components of device 1805, device 1905, or a AP as described herein. The device 2105 may include components for bi-directional voice and data communications including components for transmitting and receiving communications, including a WUR addressing manager 2110, a network communications manager 2115, a transceiver 2120, an antenna 2125, memory 2130, a processor 2140, and an inter-station communications manager 2145. These components may be in electronic communication via one or more buses (e.g., bus 2150).

The WUR addressing manager 2110 may identify one or more receiving wireless devices for which to send a WUR frame, obtain a BSSID for the AP that is associated with (or intends to be associated with) the one or more receiving wireless devices, the BSSID being known by the one or more receiving wireless devices, perform a hashing function to the BSSID to obtain a hashed BSSID, use a first portion of the hashed BSSID as a first identifier, generate the WUR frame for transmission with an address identifier field that includes either the first identifier or a second identifier, wherein the second identifier is based at least in part on the first identifier, and transmit the WUR frame to the one or more receiving wireless devices.

The network communications manager 2115 may manage communications with the core network (e.g., via one or more wired backhaul links). For example, the network communications manager 2115 may manage the transfer of data communications for client devices, such as one or more UEs 115.

The transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

The memory 2130 may include RAM and ROM. The memory 2130 may store computer-readable, computer-executable code 2135 including instructions that, when executed, cause the processor to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In other cases, a memory controller may be integrated into processor 2140. The processor 2140 may be configured to execute computer-readable instructions stored in a memory to perform various functions (e.g., functions or tasks supporting addressing for WUR frames in WUR device communications).

The inter-station communications manager 2145 may manage communications with other base station 105 and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communication network technology to provide communication between base stations 105.

Figure 22:
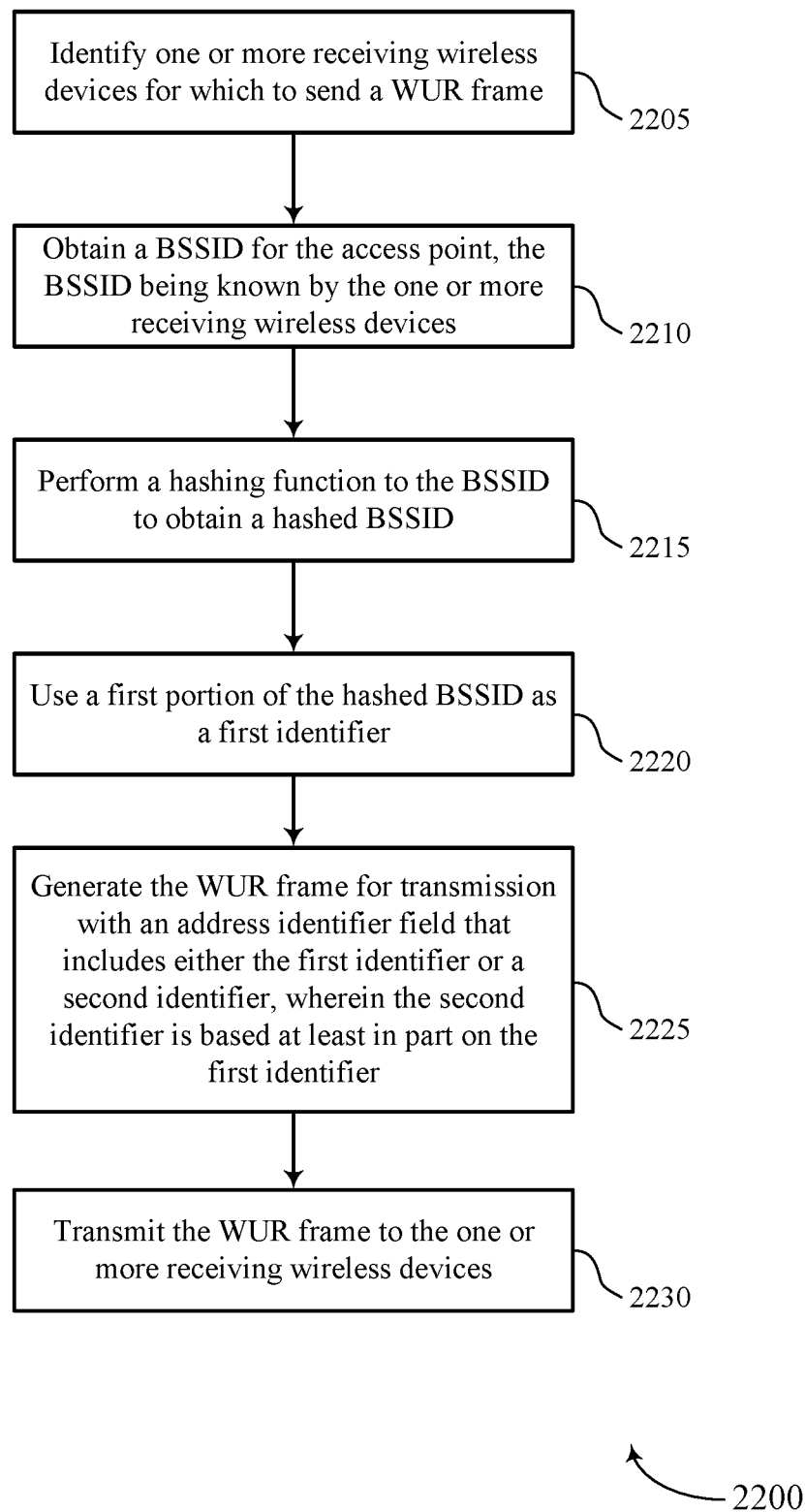
FIGS. 22 through 26 show flowcharts illustrating methods that support addressing for WUR frames in WUR device communications in accordance with aspects of the present disclosure.

FIG. 22 shows a flowchart illustrating a method 2200 that supports addressing for WUR frames in WUR device communications in accordance with aspects of the present disclosure. The operations of method 2200 may be implemented by an AP or its components as described herein. For example, the operations of method 2200 may be performed by a WUR addressing manager as described with reference to FIGS. 18 through 21. In some examples, an AP may execute a set of instructions to control the functional elements of the AP to perform the functions described below.

Additionally or alternatively, a AP may perform aspects of the functions described below using special-purpose hardware.

At 2205, the AP may identify one or more receiving wireless devices for which to send a WUR frame. The operations of 2205 may be performed according to the methods described herein. In some examples, aspects of the operations of 2205 may be performed by a receiving device manager as described with reference to FIGS. 18 through 21.

At 2210, the AP may obtain a BSSID for the AP that is associated with (or intends to be associated with) the one or more receiving wireless devices, the BSSID being known by the one or more receiving wireless devices. The operations of 2210 may be performed according to the methods described herein. In some examples, aspects of the operations of 2210 may be performed by a BSSID manager as described with reference to FIGS. 18 through 21.

At 2215, the AP may perform a hashing function to the BSSID to obtain a hashed BSSID. The operations of 2215 may be performed according to the methods described herein. In some examples, aspects of the operations of 2215 may be performed by a hashing manager as described with reference to FIGS. 18 through 21.

At 2220, the AP may use a first portion of the hashed BSSID as a first identifier. The operations of 2220 may be performed according to the methods described herein. In some examples, aspects of the operations of 2220 may be performed by a hashing selection manager as described with reference to FIGS. 18 through 21.

At 2225, the AP may generate the WUR frame for transmission with an address identifier field that includes either the first identifier or a second identifier, wherein the second identifier is based at least in part on the first identifier. The operations of 2225 may be performed according to the methods described herein. In some examples, aspects of the operations of 2225 may be performed by a frame generation manager as described with reference to FIGS. 18 through 21.

At 2230, the AP may transmit the WUR frame to the one or more receiving wireless devices. The operations of 2230 may be performed according to the methods described herein. In some examples, aspects of the operations of 2230 may be performed by a frame transmission manager as described with reference to FIGS. 18 through 21.

Figure 23:
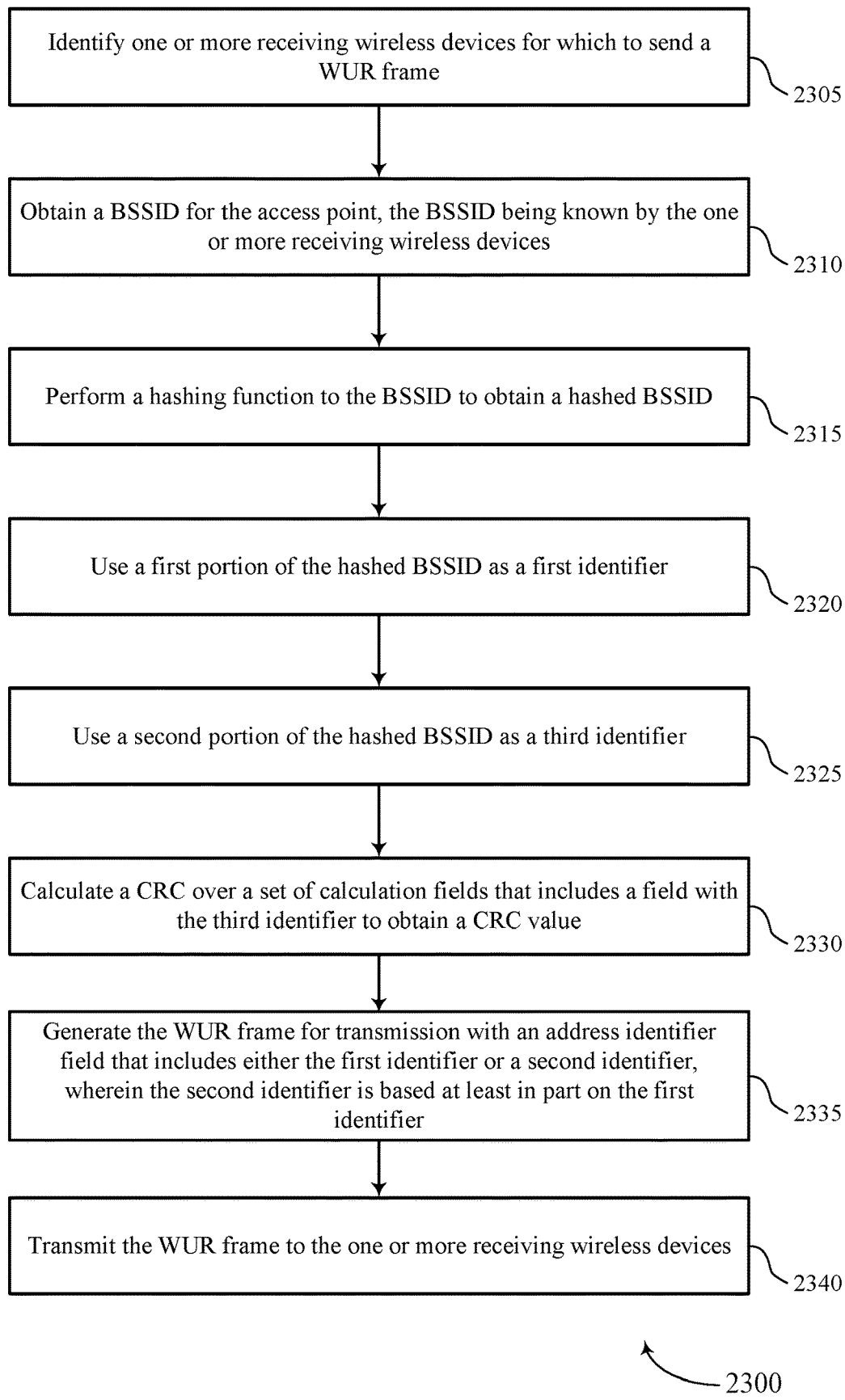

FIG. 23 shows a flowchart illustrating a method 2300 that supports addressing for WUR frames in WUR device communications in accordance with aspects of the present disclosure. The operations of method 2300 may be implemented by an AP or its components as described herein. For example, the operations of method 2300 may be performed by a WUR addressing manager as described with reference to FIGS. 18 through 21. In some examples, an AP may execute a set of instructions to control the functional elements of the AP to perform the functions described below. Additionally or alternatively, a AP may perform aspects of the functions described below using special-purpose hardware.

At 2305, the AP may identify one or more receiving wireless devices for which to send a WUR frame. The operations of 2305 may be performed according to the methods described herein. In some examples, aspects of the operations of 2305 may be performed by a receiving device manager as described with reference to FIGS. 18 through 21.

At 2310, the AP may obtain a BSSID for the AP that is associated with (or intends to be associated with) the one or more receiving wireless devices, the BSSID being known by the one or more receiving wireless devices. The operations of 2310 may be performed according to the methods described herein. In some examples, aspects of the operations of 2310 may be performed by a BSSID manager as described with reference to FIGS. 18 through 21.

At 2315, the AP may perform a hashing function to the BSSID to obtain a hashed BSSID. The operations of 2315 may be performed according to the methods described herein. In some examples, aspects of the operations of 2315 may be performed by a hashing manager as described with reference to FIGS. 18 through 21.

At 2320, the AP may use a first portion of the hashed BSSID as a first identifier. The operations of 2320 may be performed according to the methods described herein. In some examples, aspects of the operations of 2320 may be performed by a hashing selection manager as described with reference to FIGS. 18 through 21.

At 2325, the AP may use a second portion of the hashed BSSID as a third identifier. The operations of 2325 may be performed according to the methods described herein. In some examples, aspects of the operations of 2325 may be performed by a hashing selection manager as described with reference to FIGS. 18 through 21.

At 2330, the AP may calculate a CRC over a set of calculation fields that includes a field with the third identifier to obtain an CRC value. The operations of 2330 may be performed according to the methods described herein. In some examples, aspects of the operations of 2330 may be performed by an FCS manager as described with reference to FIGS. 18 through 21.

At 2335, the AP may generate the WUR frame for transmission with an address identifier field that includes either the first identifier or a second identifier, wherein the second identifier is based at least in part on the first identifier. Additionally or alternatively, the AP may generate the WUR frame for transmission with the CRC value in an FCS field of the WUR frame. The operations of 2335 may be performed according to the methods described herein. In some examples, aspects of the operations of 2335 may be performed by a frame generation manager as described with reference to FIGS. 18 through 21.

At 2340, the AP may transmit the WUR frame to the one or more receiving wireless devices. The operations of 2340 may be performed according to the methods described herein. In some examples, aspects of the operations of 2340 may be performed by a frame transmission manager as described with reference to FIGS. 18 through 21.

Figure 24:
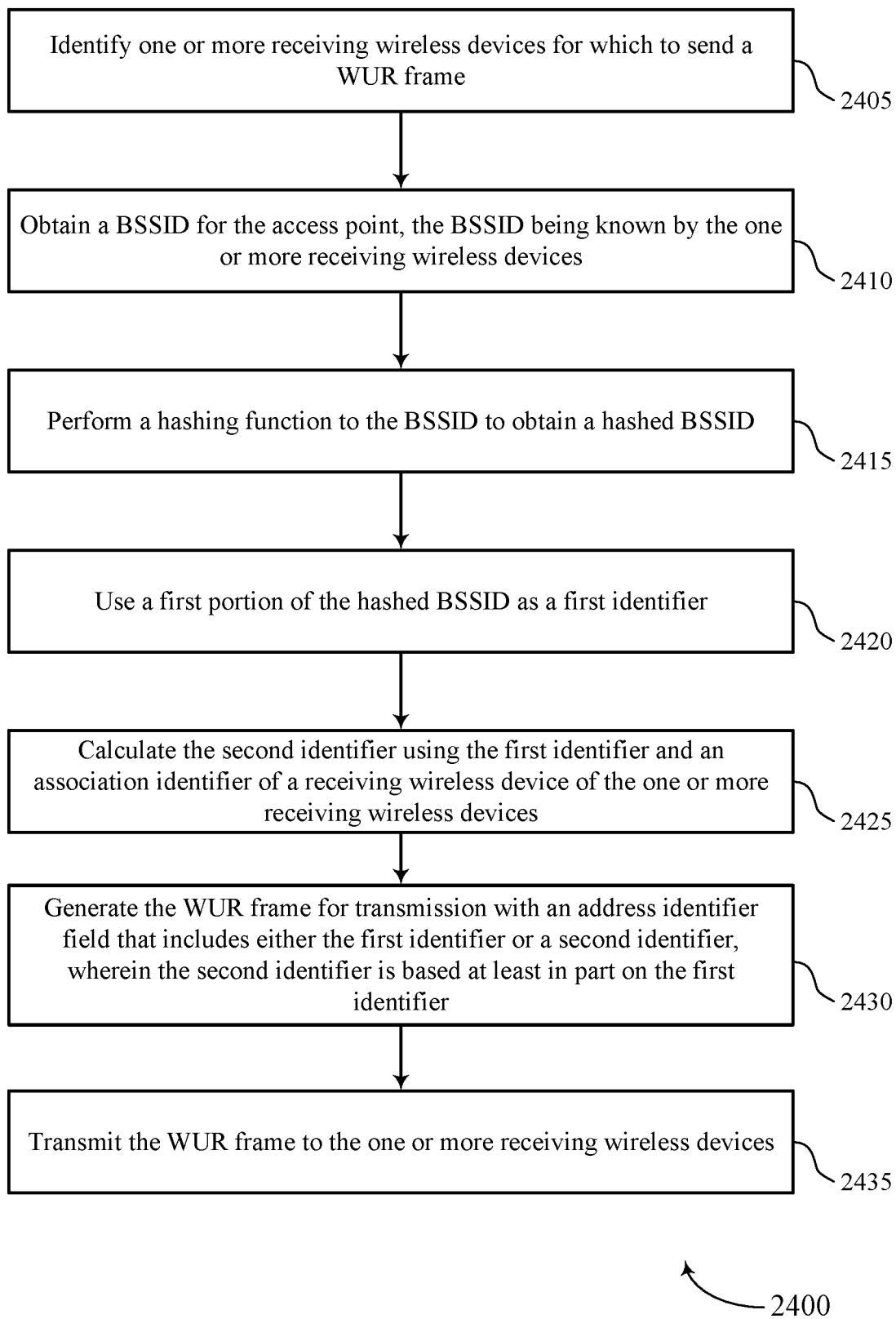

FIG. 24 shows a flowchart illustrating a method 2400 that supports addressing for WUR frames in WUR device communications in accordance with aspects of the present disclosure. The operations of method 2400 may be implemented by an AP or its components as described herein. For example, the operations of method 2400 may be performed by a WUR addressing manager as described with reference to FIGS. 18 through 21. In some examples, an AP may execute a set of instructions to control the functional elements of the AP to perform the functions described below. Additionally or alternatively, a AP may perform aspects of the functions described below using special-purpose hardware.

At 2405, the AP may identify one or more receiving wireless devices for which to send a WUR frame. The operations of 2405 may be performed according to the methods described herein. In some examples, aspects of the operations of 2405 may be performed by a receiving device manager as described with reference to FIGS. 18 through 21.

At 2410, the AP may obtain a BSSID for the AP that is associated with (or intends to be associated with) the one or more receiving wireless devices, the BSSID being known by the one or more receiving wireless devices. The operations of 2410 may be performed according to the methods described herein. In some examples, aspects of the operations of 2410 may be performed by a BSSID manager as described with reference to FIGS. 18 through 21.

At 2415, the AP may perform a hashing function to the BSSID to obtain a hashed BSSID. The operations of 2415 may be performed according to the methods described herein. In some examples, aspects of the operations of 2415 may be performed by a hashing manager as described with reference to FIGS. 18 through 21.

At 2420, the AP may use a first portion of the hashed BSSID as a first identifier. The operations of 2420 may be performed according to the methods described herein. In some examples, aspects of the operations of 2420 may be performed by a hashing selection manager as described with reference to FIGS. 18 through 21.

At 2425, the AP may calculate the second identifier using the first identifier and an association identifier of a receiving wireless device of the one or more receiving wireless devices. The operations of 2425 may be performed according to the methods described herein. In some examples, aspects of the operations of 2425 may be performed by a WUR identifier manager as described with reference to FIGS. 18 through 21.

At 2430, the AP may generate the WUR frame for transmission with an address identifier field that includes either the first identifier or a second identifier, wherein the second identifier is based at least in part on the first identifier. For example, the AP may generate the WUR frame for transmission with the second identifier in the address identifier field. The operations of 2430 may be performed according to the methods described herein. In some examples, aspects of the operations of 2430 may be performed by a frame generation manager as described with reference to FIGS. 18 through 21.

At 2435, the AP may transmit the WUR frame to the one or more receiving wireless devices. The operations of 2435 may be performed according to the methods described herein. In some examples, aspects of the operations of 2435 may be performed by a frame transmission manager as described with reference to FIGS. 18 through 21.

Figure 25:
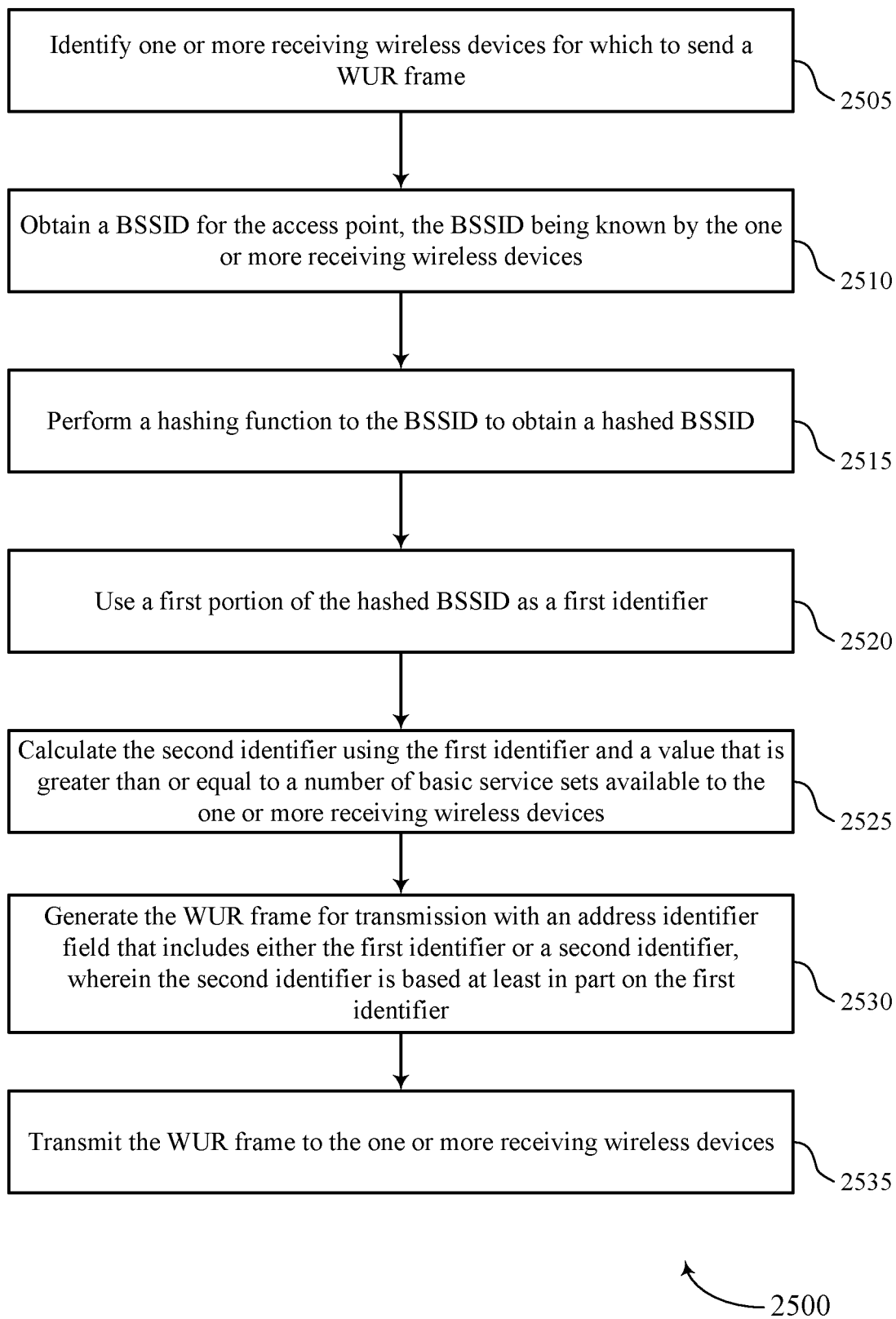

FIG. 25 shows a flowchart illustrating a method 2500 that supports addressing for WUR frames in WUR device communications in accordance with aspects of the present disclosure. The operations of method 2500 may be implemented by an AP or its components as described herein. For example, the operations of method 2500 may be performed by a WUR addressing manager as described with reference to FIGS. 18 through 21. In some examples, an AP may execute a set of instructions to control the functional elements of the AP to perform the functions described below. Additionally or alternatively, a AP may perform aspects of the functions described below using special-purpose hardware.

At 2505, the AP may identify one or more receiving wireless devices for which to send a WUR frame. The operations of 2505 may be performed according to the methods described herein. In some examples, aspects of the operations of 2505 may be performed by a receiving device manager as described with reference to FIGS. 18 through 21.

At 2510, the AP may obtain a BSSID for the AP that is associated with (or intends to be associated with) the one or more receiving wireless devices, the BSSID being known by the one or more receiving wireless devices. The operations of 2510 may be performed according to the methods described herein. In some examples, aspects of the operations of 2510 may be performed by a BSSID manager as described with reference to FIGS. 18 through 21.

At 2515, the AP may perform a hashing function to the BSSID to obtain a hashed BSSID. The operations of 2515 may be performed according to the methods described herein. In some examples, aspects of the operations of 2515 may be performed by a hashing manager as described with reference to FIGS. 18 through 21.

At 2520, the AP may use a first portion of the hashed BSSID as a first identifier. The operations of 2520 may be performed according to the methods described herein. In some examples, aspects of the operations of 2520 may be performed by a hashing selection manager as described with reference to FIGS. 18 through 21.

At 2525, the AP may calculate the second identifier using the first identifier and a value that is greater than or equal to a number of basic service sets available to the one or more receiving wireless devices. The operations of 2525 may be performed according to the methods described herein. In some examples, aspects of the operations of 2525 may be performed by a group identifier manager as described with reference to FIGS. 18 through 21.

At 2530, the AP may generate the WUR frame for transmission with an address identifier field that includes either the first identifier or a second identifier, wherein the second identifier is based at least in part on the first identifier. For example, the AP may generate the WUR frame for transmission with the second identifier in the address identifier field. The operations of 2530 may be performed according to the methods described herein. In some examples, aspects of the operations of 2530 may be performed by a frame generation manager as described with reference to FIGS. 18 through 21.

At 2535, the AP may transmit the WUR frame to the one or more receiving wireless devices. The operations of 2535 may be performed according to the methods described herein. In some examples, aspects of the operations of 2535 may be performed by a frame transmission manager as described with reference to FIGS. 18 through 21.

Figure 26:
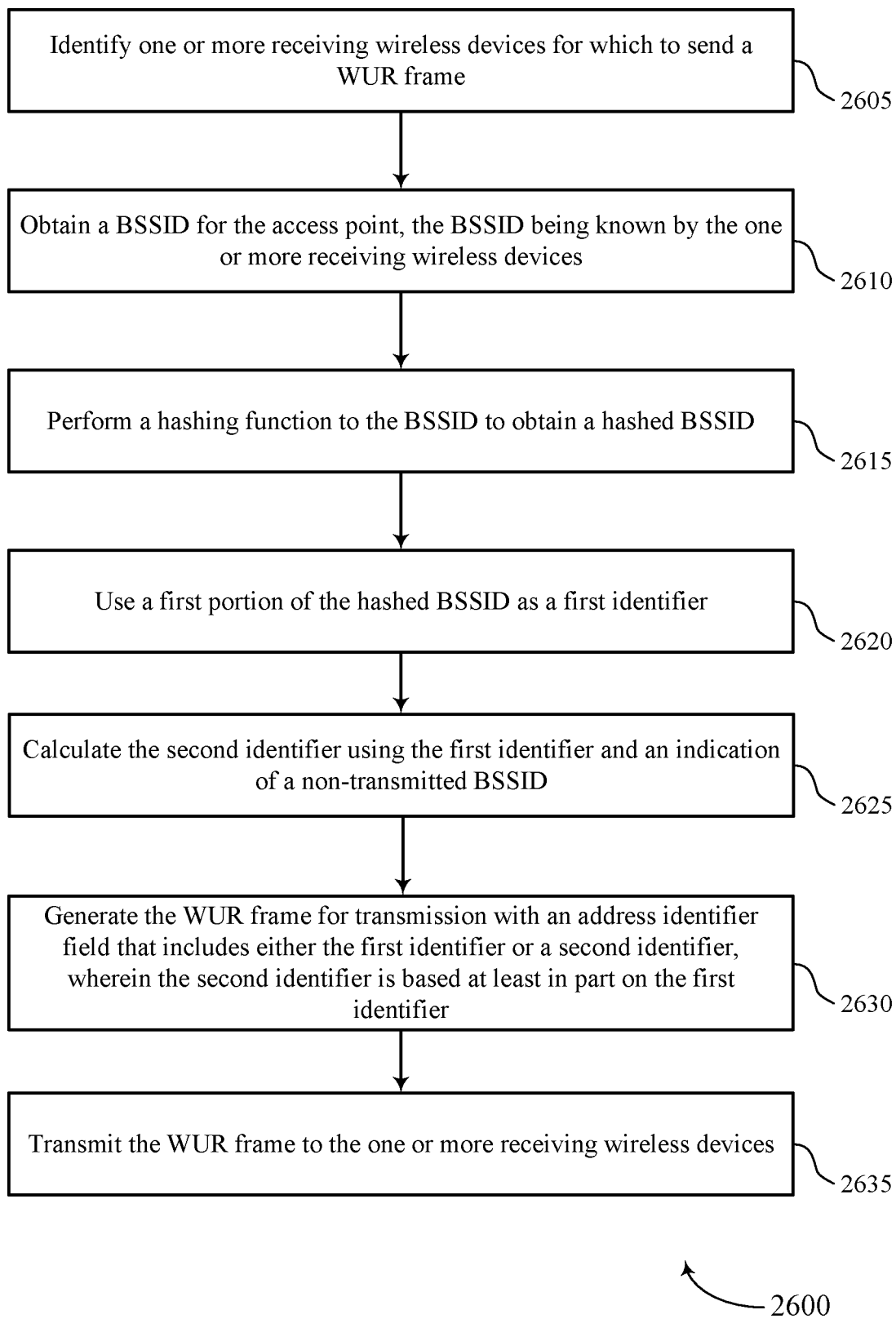

FIG. 26 shows a flowchart illustrating a method 2600 that supports addressing for WUR frames in WUR device communications in accordance with aspects of the present disclosure. The operations of method 2600 may be implemented by an AP or its components as described herein. For example, the operations of method 2600 may be performed by a WUR addressing manager as described with reference to FIGS. 18 through 21. In some examples, an AP may execute a set of instructions to control the functional elements of the AP to perform the functions described below. Additionally or alternatively, a AP may perform aspects of the functions described below using special-purpose hardware.

At 2605, the AP may identify one or more receiving wireless devices for which to send a WUR frame. The operations of 2605 may be performed according to the methods described herein. In some examples, aspects of the operations of 2605 may be performed by a receiving device manager as described with reference to FIGS. 18 through 21.

At 2610, the AP may obtain a BSSID for the AP that is associated with (or intends to be associated with) the one or more receiving wireless devices, the BSSID being known by the one or more receiving wireless devices. The operations of 2610 may be performed according to the methods described herein. In some examples, aspects of the operations of 2610 may be performed by a BSSID manager as described with reference to FIGS. 18 through 21.

At 2615, the AP may perform a hashing function to the BSSID to obtain a hashed BSSID. The operations of 2615 may be performed according to the methods described herein. In some examples, aspects of the operations of 2615 may be performed by a hashing manager as described with reference to FIGS. 18 through 21.

At 2620, the AP may use a first portion of the hashed BSSID as a first identifier. The operations of 2620 may be performed according to the methods described herein. In some examples, aspects of the operations of 2620 may be performed by a hashing selection manager as described with reference to FIGS. 18 through 21.

At 2625, the AP may calculate the second identifier using the first identifier and an indication of a non-transmitted BSSID. The operations of 2625 may be performed according to the methods described herein. In some examples, aspects of the operations of 2635 may be performed by a non-transmitted BSSID manager as described with reference to FIGS. 18 through 21.

At 2630, the AP may generate the WUR frame for transmission with an address identifier field that includes either the first identifier or a second identifier, wherein the second identifier is based at least in part on the first identifier. For example, the AP may generate the WUR frame for transmission with the second identifier in the address identifier field. The operations of 2630 may be performed according to the methods described herein. In some examples, aspects of the operations of 2630 may be performed by a frame generation manager as described with reference to FIGS. 18 through 21.

At 2635, the AP may transmit the WUR frame to the one or more receiving wireless devices. The operations of 2635 may be performed according to the methods described herein. In some examples, aspects of the operations of 2635 may be performed by a frame transmission manager as described with reference to FIGS. 18 through 21.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at an access point, comprising:
    identifying one or more receiving wireless devices for which to send a wake-up radio (WUR) frame;
    obtaining a basic service set identifier (BSSID) for the access point, the BSSID being known by the one or more receiving wireless devices;
    performing a hashing function to the BSSID to obtain a hashed BSSID;
    using a first portion of the hashed BSSID as a first identifier;
    using a second portion of the hashed BSSID to calculate a cyclic redundancy check (CRC) value;
    generating the WUR frame for transmission with an address identifier field that includes either the first identifier or a second identifier and the CRC value, wherein the second identifier is based at least in part on the first identifier;
    transmitting the WUR frame to the one or more receiving wireless devices; and
    using the second portion of the hashed BSSID as a third identifier, wherein the CRC value is calculated over a set of calculation fields that includes a field with the third identifier.

2. The method of claim 1, wherein performing the hashing function to the BSSID comprises calculating a cyclic redundancy check (CRC) over the BSSID to obtain the hashed BSSID.

3. The method of claim 2, wherein a polynomial associated with the CRC over the BSSID is a same polynomial as a polynomial used for a CRC computation for a transmission over a first radio transceiver different from a second radio transceiver used for transmitting the WUR frame.

4. The method of claim 1, wherein the first portion of the hashed BSSID comprises a least significant bit portion of the hashed BSSID.

5. The method of claim 4, wherein a length of the hashed BSSID is 32 bits and a length of the first portion is 12 bits.

6. The method of claim 1, wherein the set of calculation fields includes the first or second identifier in the address identifier field.

7. The method of claim 1, wherein generating the WUR frame for transmission comprises generating the WUR frame for transmission with the CRC value in a frame check sequence (FCS) field of the WUR frame.

8. The method of claim 1, wherein generating the WUR frame for transmission comprises generating the WUR frame for transmission without the third identifier explicitly included in a field of the WUR frame.

9. The method of claim 1, wherein the second portion of the hashed BSSID comprises a most significant bit portion of the hashed BSSID and a length of the second portion is 16 bits.

10. A method for wireless communications at an access point, comprising:
    identifying one or more receiving wireless devices for which to send a wake-up radio (WUR) frame;
    obtaining a basic service set identifier (BSSID) for the access point, the BSSID being known by the one or more receiving wireless devices;
    performing a hashing function to the BSSID to obtain a hashed BSSID;
    using a first portion of the hashed BSSID as a first identifier;
    using a second portion of the hashed BSSID to calculate a cyclic redundancy check (CRC) value;
    generating the WUR frame for transmission with an address identifier field that includes either the first identifier or a second identifier and the CRC value, wherein the second identifier is based at least in part on the first identifier;
    transmitting the WUR frame to the one or more receiving wireless devices;
    using a second portion of the hashed BSSID as a third identifier; and
    calculating a message integrity check (MIC) over a set of calculation fields that includes a field with the third identifier to obtain a MIC value.

11. The method of claim 1, further comprising:
    calculating the second identifier using the first identifier and an association identifier of a receiving wireless device of the one or more receiving wireless devices.

12. A method for wireless communications at an access point, comprising:
identifying one or more receiving wireless devices for which to send a wake-up radio (WUR) frame;
obtaining a basic service set identifier (BSSID) for the access point, the BSSID being known by the one or more receiving wireless devices;
performing a hashing function to the BSSID to obtain a hashed BSSID;
using a first portion of the hashed BSSID as a first identifier;
using a second portion of the hashed BSSID to calculate a cyclic redundancy check (CRC) value;
generating the WUR frame for transmission with an address identifier field that includes either the first identifier or a second identifier and the CRC value, wherein the second identifier is based at least in part on the first identifier;
transmitting the WUR frame to the one or more receiving wireless devices;
calculating the second identifier using the first identifier and an association identifier of a receiving wireless device of the one or more receiving wireless devices; and
wherein calculating the second identifier comprises performing a modulo operation on a summation of the first identifier and the association identifier of the receiving wireless device.

13. The method of claim 1, further comprising:
calculating the second identifier using the first identifier and a value that is greater than or equal to a number of basic service sets available to the one or more receiving wireless devices.

14. A method for wireless communications at an access point, comprising:
identifying one or more receiving wireless devices for which to send a wake-up radio (WUR) frame;
obtaining a basic service set identifier (BSSID) for the access point, the BSSID being known by the one or more receiving wireless devices;
performing a hashing function to the BSSID to obtain a hashed BSSID;
using a first portion of the hashed BSSID as a first identifier;
using a second portion of the hashed BSSID to calculate a cyclic redundancy check (CRC) value;
generating the WUR frame for transmission with an address identifier field that includes either the first identifier or a second identifier and the CRC value, wherein the second identifier is based at least in part on the first identifier;
transmitting the WUR frame to the one or more receiving wireless devices;
calculating the second identifier using the first identifier and a value that is greater than or equal to a number of basic service sets available to the one or more receiving wireless devices; and
wherein calculating the second identifier comprises performing a modulo operation on a summation of the first identifier and the value.

15. The method of claim 13, wherein the number of basic service sets is a maximum number of basic service sets identified in a traffic indication map.

16. A method for wireless communications at an access point, comprising:
identifying one or more receiving wireless devices for which to send a wake-up radio (WUR) frame;
obtaining a basic service set identifier (BSSID) for the access point, the BSSID being known by the one or more receiving wireless devices;
performing a hashing function to the BSSID to obtain a hashed BSSID;
using a first portion of the hashed BSSID as a first identifier;
using a second portion of the hashed BSSID to calculate a cyclic redundancy check (CRC) value;
generating the WUR frame for transmission with an address identifier field that includes either the first identifier or a second identifier and the CRC value, wherein the second identifier is based at least in part on the first identifier;
transmitting the WUR frame to the one or more receiving wireless devices; and
calculating the second identifier using the first identifier and a value greater than a highest association identifier of a receiving wireless device of the one or more receiving wireless devices.

17. The method of claim 16, wherein calculating the second identifier comprises performing a modulo operation on a summation of the first identifier and the value.

18. The method of claim 1, further comprising:
calculating the second identifier using the first identifier and an indication of a non-transmitted BSSID.

19. The method of claim 1, wherein generating the WUR frame for transmission comprises generating a broadcast WUR frame for transmission with the first identifier in the address identifier field.

20. The method of claim 1, wherein generating the WUR frame for transmission comprises generating a variable-length WUR frame for transmission with the second identifier in the address identifier field and a plurality of identifiers, each identifier of the plurality of identifiers associated a corresponding receiving wireless device of the one or more receiving wireless devices.

21. The method of claim 20, wherein each identifier of the plurality of identifiers is listed in an order within the variable-length WUR frame.

22. An apparatus for wireless communications at an access point, comprising:
a processor,
memory in electronic communication with the processor; and
instructions stored in the memory and executable by the processor to cause the apparatus to:
identify one or more receiving wireless devices for which to send a wake-up radio (WUR) frame;
obtain a basic service set identifier (BSSID) for the access point, the BSSID being known by the one or more receiving wireless devices;
perform a hashing function to the BSSID to obtain a hashed BSSID;
use a first portion of the hashed BSSID as a first identifier;
use a second portion of the hashed BSSID to calculate a cyclic redundancy check (CRC) value;
generate the WUR frame for transmission with an address identifier field that includes either the first identifier or a second identifier and the CRC value, wherein the second identifier is based at least in part on the first identifier;
transmit the WUR frame to the one or more receiving wireless devices; and use the second portion of the hashed BSSID as a third identifier, wherein the CRC value is calculated over a set of calculation fields that includes a field with the third identifier.

23. The apparatus of claim 22, wherein the instructions are further executable by the processor to cause the apparatus to:
calculate a cyclic redundancy check (CRC) over the BSSID to obtain the hashed BSSID.

24. The apparatus of claim 22, wherein the first portion of the hashed BSSID comprises a least significant bit portion of the hashed BSSID comprises.

25. The apparatus of claim 22, wherein the instructions are further executable by the processor to cause the apparatus to:
calculate the second identifier using the first identifier and an association identifier of a receiving wireless device of the one or more receiving wireless devices.

26. The apparatus of claim 22, wherein the instructions are further executable by the processor to cause the apparatus to:
calculate the second identifier using the first identifier and a value that is greater than or equal to a number of basic service sets available to the one or more receiving wireless devices.

27. An apparatus for wireless communications at an access point, comprising:
means for identifying one or more receiving wireless devices for which to send a wake-up radio (WUR) frame;
means for obtaining a basic service set identifier (BSSID) for the access point, the BSSID being known by the one or more receiving wireless devices;
means for performing a hashing function to the BSSID to obtain a hashed BSSID;
means for using a first portion of the hashed BSSID as a first identifier;
means for using a second portion of the hashed BSSID to calculate a cyclic redundancy check (CRC) value;
means for generating the WUR frame for transmission with an address identifier field that includes either the first identifier or a second identifier and the CRC value, wherein the second identifier is based at least in part on the first identifier;
means for transmitting the WUR frame to the one or more receiving wireless devices; and
means for using the second portion of the hashed BSSID as a third identifier, wherein the CRC value is calculated over a set of calculation fields that includes a field with the third identifier.

28. A non-transitory computer-readable medium storing code for wireless communications, the code comprising instructions executable by a processor to:
identify one or more receiving wireless devices for which to send a wake-up radio (WUR) frame;
obtain a basic service set identifier (BSSID) for an access point, the BSSID being known by the one or more receiving wireless devices;
perform a hashing function to the BSSID to obtain a hashed BSSID;
use a first portion of the hashed BSSID as a first identifier;
use a second portion of the hashed BSSID to calculate a cyclic redundancy check (CRC) value;
generate the WUR frame for transmission with an address identifier field that includes either the first identifier or a second identifier and the CRC value, wherein the second identifier is based at least in part on the first identifier;
transmit the WUR frame to the one or more receiving wireless devices; and
using the second portion of the hashed BSSID as a third identifier, wherein the CRC value is calculated over a set of calculation fields that includes a field with the third identifier.

* * * * *